US011020316B2

(12) United States Patent
Park

(10) Patent No.: US 11,020,316 B2
(45) Date of Patent: Jun. 1, 2021

(54) DISPENSING DEVICE, VALVE, CONTAINING APPARATUS HAVING SAME, CONTENTS MOVING APPARATUS AND CONTENTS APPARATUS

(71) Applicant: Kyungdo Park, Seoul (KR)

(72) Inventor: Suhjun Park, Seogwipo-si (KR)

(73) Assignee: Kyungdo Park, Seoul (KR)

( * ) Notice: Subject to any disclaimer, the term of this patent is extended or adjusted under 35 U.S.C. 154(b) by 0 days.

(21) Appl. No.: 15/673,145

(22) Filed: Aug. 9, 2017

(65) Prior Publication Data

US 2017/0333283 A1 Nov. 23, 2017

Related U.S. Application Data

(63) Continuation of application No. PCT/KR2016/001727, filed on Feb. 23, 2016.

(30) Foreign Application Priority Data

Feb. 26, 2015 (KR) .................. 10-2015-0027664
Jun. 22, 2015 (KR) .................. 10-2015-0088754
(Continued)

(51) Int. Cl.
*A61J 1/03* (2006.01)
*F16K 1/18* (2006.01)
(Continued)

(52) U.S. Cl.
CPC .............. *A61J 1/03* (2013.01); *B65D 55/02* (2013.01); *B65D 83/04* (2013.01);
(Continued)

(58) Field of Classification Search
CPC ....... A61J 1/03; B65D 55/02; B65D 83/0409; B65D 83/06; F16K 15/03
See application file for complete search history.

(56) References Cited

U.S. PATENT DOCUMENTS 1,752,527 A * 4/1930 Howard .................. G01F 11/12
222/364
2,023,537 A * 12/1935 Myers .................... G01F 11/261
222/455
(Continued)

FOREIGN PATENT DOCUMENTS

AU 2003267101 4/2005
BE 477193 A 12/1947
(Continued)

OTHER PUBLICATIONS

Examination Report dated Oct. 2, 2019 for Canadian Patent Application No. 2,977,946.
(Continued)

*Primary Examiner* — Gene O Crawford
*Assistant Examiner* — Kelvin L Randall, Jr.
(74) *Attorney, Agent, or Firm* — Ladas & Parry, LLP

(57) ABSTRACT

The present invention relates to a dispensing device, a valve, a containing apparatus having same, a contents moving apparatus, and a contents apparatus, comprising a passing operation unit provided in the housing, for moving and guiding contents, wherein the passing operation unit comprises a contents passing means for moving the contents. Unlike conventional art, the present invention may secure a space for passing contents while preventing reception of contents, which exceeds a demand, by adjusting a passing space and a receiving space, stably induce passing of a demanded amount of contents within a predetermined range, and prevent remaining of contents more than necessary by limiting the space for receiving the contents, thereby enabling adjustment of the amount (number) of contents being received.

16 Claims, 67 Drawing Sheets

(30) Foreign Application Priority Data

| | | | |
|---|---|---|---|
| Jul. 28, 2015 | (KR) | .................... | 10-2015-0106919 |
| Aug. 2, 2015 | (KR) | .................... | 10-2015-0109279 |
| Aug. 11, 2015 | (KR) | .................... | 10-2015-0113006 |
| Feb. 1, 2016 | (KR) | .................... | 10-2016-0012597 |
| Feb. 19, 2016 | (KR) | .................... | 10-2016-0019877 |

(51) Int. Cl.
  *B65D 55/02*  (2006.01)
  *B65D 83/06*  (2006.01)
  *F16K 21/06*  (2006.01)
  *B65D 83/04*  (2006.01)

(52) U.S. Cl.
  CPC ......... *B65D 83/0409* (2013.01); *B65D 83/06* (2013.01); *F16K 1/18* (2013.01); *F16K 21/06* (2013.01)

(56) References Cited

U.S. PATENT DOCUMENTS

| | | | |
|---|---|---|---|
| 2,086,296 A | | 7/1937 | Gilbert |
| 2,102,877 A | * | 12/1937 | Barnett ................. G01F 11/261 222/328 |
| 2,957,503 A | * | 10/1960 | Stifter ................. B65D 83/049 141/321 |
| 3,480,182 A | | 11/1969 | Rigor |
| 3,620,413 A | | 11/1971 | Borsum |
| 3,628,679 A | | 12/1971 | Armour |
| 3,637,109 A | | 1/1972 | Stiffer |
| 3,777,924 A | | 12/1973 | Kayser et al. |
| 3,833,147 A | | 9/1974 | Borsum et al. |
| 3,985,274 A | * | 10/1976 | Lubalin ................. G01F 11/261 222/362 |
| 4,530,447 A | | 7/1985 | Greenspan |
| 4,653,668 A | | 3/1987 | Gibilisco et al. |
| 4,732,387 A | * | 3/1988 | Elinski ................. G07C 15/003 273/144 A |
| 4,782,984 A | | 11/1988 | Su |
| 5,110,008 A | | 5/1992 | Moulding, Jr. et al. |
| 5,219,093 A | * | 6/1993 | Moulding, Jr. ....... A61J 7/0076 221/259 |
| D371,297 S | | 7/1996 | Robbins, III |
| 5,927,558 A | * | 7/1999 | Bruce ..................... G01F 11/24 222/185.1 |
| 6,112,942 A | * | 9/2000 | Deacon .............. B65D 83/0409 221/155 |
| 6,488,174 B1 | | 12/2002 | Cho |
| 8,322,567 B2 | | 12/2012 | Giraud |
| 8,657,155 B2 | | 2/2014 | Dwork et al. |
| 9,505,530 B2 | * | 11/2016 | Downey ................. B65D 25/04 |
| 9,636,279 B2 | | 5/2017 | Song et al. |
| 2002/0166869 A1 | * | 11/2002 | Janes Autonell .. B65D 83/0409 221/263 |
| 2004/0094566 A1 | | 5/2004 | Renaud |
| 2007/0181614 A1 | * | 8/2007 | Rvachov .............. G01F 11/261 222/456 |
| 2008/0290110 A1 | * | 11/2008 | Gelardi ............. B65D 83/0409 221/266 |
| 2012/0228324 A1 | * | 9/2012 | Gatski ..................... G07F 11/10 221/123 |
| 2013/0110283 A1 | | 5/2013 | Baarman et al. |
| 2014/0353327 A1 | | 12/2014 | Bae et al. |
| 2016/0068328 A1 | | 3/2016 | 'T Lam et al. |
| 2016/0107820 A1 | | 4/2016 | Macvittie et al. |
| 2016/0159555 A1 | * | 6/2016 | Park ..................... B65D 83/049 221/175 |
| 2016/0200485 A1 | | 7/2016 | Quinones et al. |
| 2017/0333283 A1 | | 11/2017 | Park |

FOREIGN PATENT DOCUMENTS

| | | |
|---|---|---|
| CN | 2094523 U | 1/1992 |
| CN | 101003315 A | 7/2007 |
| CN | 103086088 | 5/2013 |
| CN | 204264698 U | 4/2015 |
| CN | 105073601 | 11/2015 |
| CN | 204840318 | 12/2015 |
| CN | 107635887 A | 1/2018 |
| DE | 8030162 U1 | 2/1981 |
| EP | 2639181 A2 | 9/2013 |
| EP | 3263484 A1 | 1/2018 |
| GB | 2 345 898 A | 7/2000 |
| JP | 47-009941 | 5/1972 |
| JP | 48-6298 | 1/1973 |
| JP | S57-008526 | 1/1982 |
| JP | 1983113673 | 8/1983 |
| JP | S58202499 | 11/1983 |
| JP | 1985106966 | 7/1985 |
| JP | 5-49648 | 3/1993 |
| JP | 11-100113 | 4/1999 |
| JP | 2002-362652 | 12/2002 |
| JP | 2005280715 A | 10/2005 |
| JP | 2006506287 A | 2/2006 |
| JP | 3130875 U9 | 4/2007 |
| JP | 3942019 B2 | 7/2007 |
| JP | 2007319205 A | 12/2007 |
| JP | 2007319502 A | 12/2007 |
| JP | 2008239204 A | 10/2008 |
| JP | 2009102067 A | 5/2009 |
| JP | 2011-011763 A | 1/2011 |
| JP | 4846454 B2 | 12/2011 |
| JP | 2013-154915 | 8/2013 |
| JP | 2013545681 A1 | 12/2013 |
| JP | 2016-531056 | 10/2016 |
| JP | 2016-504141 | 2/2018 |
| KR | 200315702 Y1 | 6/2003 |
| KR | 200318864 Y1 | 7/2003 |
| KR | 20-0360697 | 8/2004 |
| KR | 200422318 Y1 | 7/2006 |
| KR | 100978528 B1 | 8/2010 |
| KR | 10-0993722 B1 | 11/2010 |
| KR | 1020110002347 A | 7/2011 |
| KR | 1020120096798 A | 8/2012 |
| KR | 101210435 B1 | 12/2012 |
| KR | 101312560 B1 | 9/2013 |
| KR | 1020140119170 A | 10/2014 |
| KR | 2014138187 A | 12/2014 |
| KR | 20140141277 A | 12/2014 |
| KR | 20150106289 A | 9/2015 |
| WO | 2014114943 A1 | 7/2014 |
| WO | 2015030450 A1 | 3/2015 |
| WO | 2015/150240 | 10/2015 |
| WO | WO2016137186 A1 | 9/2016 |

OTHER PUBLICATIONS

Extended European Search Report dated Oct. 17, 2018 relating to European Application No. 16755836.0, 10 pages.
Office Action dated Nov. 5, 2018 relating to Chinese Patent Application No. 201680024081.6, 14 pages.
Office Action dated Apr. 3, 2020 for Brazilian Patent Application No. BR112017018196-7 and its English machine translation by Google Translate.
Decision to Grant dated Jun. 2, 2020 for Japanese Patent Application No. 2017-563903 and its English translation by Global Dossier.
Office Action dated Oct. 8, 2019 for Japanese Patent Application No. 2017-563903 and its English translation by Global Dossier.
Office Action dated Nov. 20, 2018 for Japanese Patent Application No. 2017-563903 and its English translation by Global Dossier.
Office Action dated Jul. 7, 2016 for Korean Patent Application No. 10-2016-0019877 and its English translation by Global Dossier.
Office Action dated May 16, 2017 for Korean Patent Application No. 10-2016-0019877 and its English translation by Global Dossier.
Examination Report dated Sep. 5, 2018 for Australian Patent Application No. 2016224240.
Examination Report dated May 1, 2018 for Canadian Patent Application No. 2,977,946.
Office Action dated Mar. 12, 2020 for Chinese Patent Application No. 201680024081.6 and its English translation by Global Dossier.

(56) References Cited

OTHER PUBLICATIONS

Notice to Grant dated Aug. 6, 2020 for Chinese Patent Application No. 201680024081.6 and its English translation by Global Dossier.
International Preliminary Report on Patentability (Chapter II) for PCT/KR2016/001727 dated Sep. 8, 2016 and its English translation from WIPO.
Written Opinion of the International Searching Authority for PCT/KR2016/001727 dated Jun. 15, 2016 and its English translation from Google Translate.
International Search Report for PCT/KR2016/001727 dated Jun. 15, 2016 and its English translation from WIPO.
International Preliminary Report on Patentability for PCT/KR2017/001023 dated Aug. 7, 2018 and its English translation from WIPO.
Written Opinion of the International Searching Authority for PCT/KR2017/001023 dated May 4, 2017 and its English translation from WIPO.
International Search Report for PCT/KR2017/001023 dated Jan. 31, 2017 and its English translation from WIPO.
Decision to Grant dated Jun. 30, 2020 for Chinese Patent Application No. 201780007684.X and its English translation by Global Dossier.
Office Action dated Mar. 31, 2020 for Chinese Patent Application No. 201780007684.X and its English translation by Global Dossier.
Office Action dated May 20, 2019 for Chinese Patent Application No. 201780007684.X and its English translation by Global Dossier.
Decision to Grant dated Jun. 2, 2020 for Japanese Patent Application No. 2018-540154 and its English translation by Global Dossier.
Office Action dated Jul. 30, 2019 for Japanese Patent Application No. 2018-540154 and its English translation by Global Dossier.
Notice to Grant dated Mar. 29, 2018 for Korean Patent Application No. 10-2017-0012707 and its English translation by Global Dossier.
Office Action dated May 19, 2017 for Korean Patent Application No. 10-2017-0012707 and its English translation by Global Dossier.
Office Action dated Sep. 27, 2017 for Korean Patent Application No. 10-2017-0012707 and its English translation by Global Dossier.
Extended European Search Report dated Oct. 19, 2018 for European Patent Application No. 17747699.1.
Office Action dated Jun. 17, 2020 for U.S. Appl. No. 16/071,375.
Office Action dated Jun. 26, 2019 for Indian Application No. 201747029821.
Office Action dated Jul. 12, 2019 for Chinese Application No. 201680024081.6 and its English translation from Global Dossier.

* cited by examiner

DISPENSING DEVICE, VALVE, CONTAINING APPARATUS HAVING SAME, CONTENTS MOVING APPARATUS AND CONTENTS APPARATUS

CROSS-REFERENCE TO RELATED APPLICATIONS

This application is a continuation of PCT International Application S/N PCT/KR2016/001727 filed on Feb. 23, 2016, which claims benefit of Korean Patent Application S/N KR 10-2015-0027664 filed on Feb. 26, 2015, Korean Patent Application S/N KR 10-2015-0088754 filed on Jun. 22, 2015, Korean Patent Application S/N 10-2015-0106919 filed on Jul. 28, 2015, Korean Patent Application S/N KR 10-2015-0109279 filed on Aug. 2, 2015, and Korean Patent Application S/N KR 10-2015-0113006 filed on Aug. 11, 2015, and Korean Patent Application S/N KR 10-2016-0012597 filed on Feb. 1, 2016, and Korean Patent Application S/N KR 10-2016-0019877 filed on Feb. 19, 2016, each of which is hereby incorporated in its entirety by reference.

TECHNICAL FIELD

Aspects of the present disclosure relate to a dispensing device, a valve, a containing apparatus having the same, a contents moving apparatus and a contents apparatus, and more particularly, to a dispensing device, a valve, a containing apparatus having the same, a contents moving apparatus and a contents apparatus for stably guiding passage of contents within a predetermined range by varying a passing space to secure a passing space for the contents and for limiting passage or reception of contents beyond a demand amount by a passing space and a receiving space being adjusted in conjunction with the passing space being secured.

BACKGROUND

Generally, medicines such as digestive agents, health supplements such as vitamins, and foods such as confectionery are produced in the form of solid, powder, or liquid contents (hereinafter referred to as "contents").

These contents are taken in a fixed amount or a necessary amount to prevent overuse or addiction as well as to maximize their efficacy.

Such contents are sold in a state of being contained in a predetermined storage container. The conventional contents storage container has a structure including a container main body in which a plurality of contents are contained, and a cap which is openably and closably coupled to an inlet of the container main body.

Therefore, to take or ingest the contents, the cap is opened from the container main body, and then the contents contained in the container main body are withdrawn on a palm or a lid to be taken.

The above-described technical configuration is a background art for assisting the understanding of the present invention and does not signify a widely known prior art in the technical field to which the present invention belongs.

A fixed-amount discharge container has been proposed in Korean Unexamined Patent Application Publication No. 10-2012-0096798 (Title of Invention: A cap for discharging constant rate of pills).

The above fixed-amount discharge container is inconvenient to take out contents one at a time or take out a necessary demand amount of contents because the contents are poured out when the user takes out the contents by tilting a containing apparatus such as a container apparatus every time to acquire the contents.

When the remaining amount of the contents in the containing apparatus is small, it is troublesome to use the containing apparatus in such a manner that the containing apparatus is very carefully tilted to withdraw the contents located at a lower portion of the containing apparatus, and it is difficult to access the contents by hand when the contents to be withdrawn are at the lower portion of the containing apparatus.

Accordingly, there has been recently proposed a containing apparatus that allows contents to be taken out one at a time from the containing apparatus, but a pump type containing apparatus, which is devised and currently in use, that has a core configured to support contents in the containing apparatus so that a portion of the contents can come out via a through-hole at an upper portion of the containing apparatus by the core by up-down movement of a containing apparatus body has problems that an operating distance for an operation is large because the entire containing apparatus body including a lid portion should be maximally moved upward and moved downward again, and the entire contents should be lifted and lowered.

Further, such a containing apparatus is provided with various foods, medicines, or articles therein, and an opening-closing apparatus mechanism provided in an ordinary containing apparatus has no other function other than opening and closing functions. Also, because the opening-closing apparatus is opened and used to acquire a certain amount of contents, there is a problem in that the entire contents inside the containing apparatus are inevitably easily exposed, and contaminants infiltrate into the contents or the contents are easily oxidized by contact with air.

Furthermore, to acquire only a fixed amount of the contents, because fingers are put into the containing apparatus to hold the contents, or some of the contents are poured into a palm by tilting the containing apparatus and the remaining contents are contained again in the containing apparatus, there is a problem that the contents are easily exposed to external pollution.

Therefore, there is a need to improve this.

SUMMARY

The present invention has been made to solve the above-described problems, and it is an aspect of the present invention to provide to a dispensing device, a valve, a containing apparatus having the same, a contents moving apparatus and a contents apparatus for stably guiding passage of a fixed amount of contents by varying a passing space to secure a passing space for the contents.

It is an aspect of the present invention to provide a dispensing device, a valve, a containing apparatus having the same, a contents moving apparatus and a contents apparatus for preventing passage of more contents by closing a passing space to an extent that the contents cannot pass therethrough in conjunction with the passing space for the contents being secured and a fixed amount of the contents being passed.

It is an aspect of the present invention to provide a dispensing device, a valve, a containing apparatus having the same, a contents moving apparatus and a contents apparatus for preventing contents from pouring out when a user tilts the containing apparatus or the contents moving apparatus to take out the contents.

It is an aspect of the present invention to provide a dispensing device, a valve, a containing apparatus having the same, a contents moving apparatus and a contents apparatus for stably guiding passage of a fixed amount of contents by including a contents passing means configured to discharge a fixed amount or a necessary amount of contents in the form of solid, powder, or liquid from the containing apparatus or the contents moving apparatus and open a contents passing side of the containing apparatus or the contents moving apparatus.

It is an aspect of the present invention to provide a dispensing device, a valve, a containing apparatus having the same, a contents moving apparatus and a contents apparatus for improving an opening-closing reaction responsiveness by limiting a movement angle of a contents passing means that opens a contents passing side of the containing apparatus or the contents moving apparatus.

It is an aspect of the present invention to provide a dispensing device, a valve, a containing apparatus having the same, a contents moving apparatus and a contents apparatus for limiting a movement angle of a passing movement part connected to an opening member to limit an opening angle when a stopper opens the opening member.

It is an aspect of the present invention to provide a dispensing device, a valve, a containing apparatus having the same, a contents moving apparatus and a contents apparatus having a passing passage part formed to extend between an entry side and a discharge side for contents so that movement of the contents to a passing movement part is guided and a movement amount of the contents moving to the passing movement part is limited.

It is an aspect of the present invention to provide a valve included in a contents moving apparatus with both openable sides to provide the valve configured to guide passage of contents to one side of the contents moving apparatus by being opened due to rotation.

It is an aspect of the present invention to provide a dispensing device, a valve, a containing apparatus having the same, a contents moving apparatus and a contents apparatus having a receiving part separately provided from the contents passing means to resist introduction of more than necessary amount of contents that passed through the contents passing means into a standby containing space so that an amount of contents remaining in the receiving part is a demand amount that a user needs.

It is an aspect of the present invention to provide a dispensing device, a valve, a containing apparatus having the same, a contents moving apparatus and a contents apparatus for varying a passing space and securing a passing space of contents, blocking introduction of more than necessary amount of contents in a step of receiving the contents being passed to stably guide a demand amount of the contents to be received, and adjusting an amount of contents being passed and received.

It is an aspect of the present invention to provide a dispensing device, a valve, a containing apparatus having the same, a contents moving apparatus and a contents apparatus having a contents receiving part provided in an opening-closing apparatus of the containing apparatus so that contents in the form of solid, powder, or liquid can be separately contained, stored, and used.

It is an aspect of the present invention to provide a dispensing device, a valve, a containing apparatus having the same, a contents moving apparatus and a contents apparatus for allowing a user to immediately acquire a demand amount of contents by hand or other receiving apparatus just by a single operation of passing the contents.

It is an aspect of the present invention to provide a dispensing device, a valve, a containing apparatus having the same, a contents moving apparatus and a contents apparatus capable of effectively obtaining only a demand amount of contents by tilting or shaking a containing apparatus when there is no space for a user to insert two fingers to pick up pills, which are contents, by hand because an opening is narrow as in a general containing apparatus that stores medicines such as rectangular pills.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
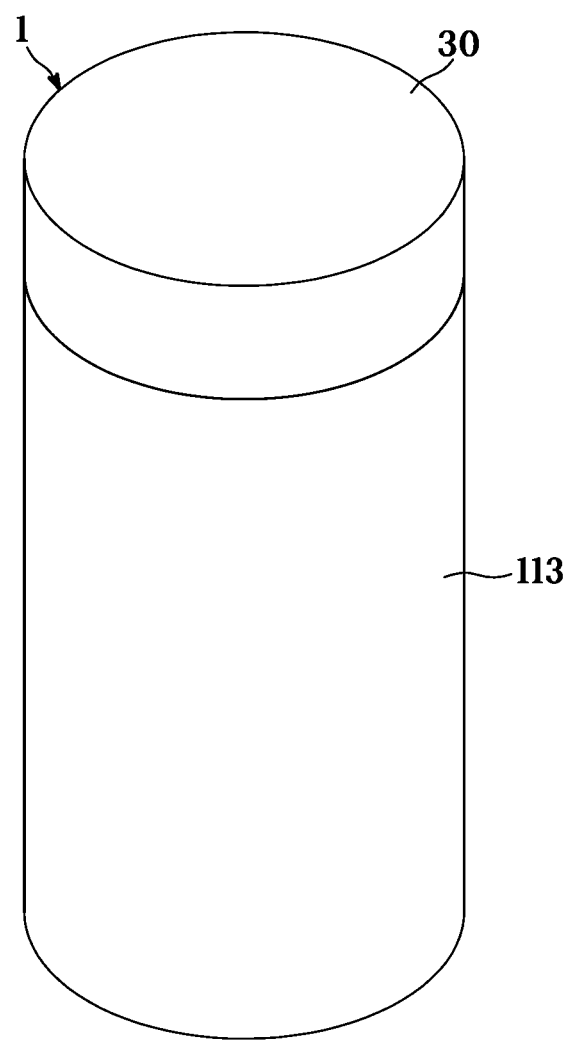
FIG. 1 is a perspective view of a containing apparatus or a contents moving apparatus including a dispensing device according to a first embodiment of the present invention.

According to aspects of the present invention, a dispensing device includes a passing operation part configured to guide movement of contents, and the passing operation part includes a contents passing means configured to allow the contents to move.

The contents passing means may include a passing movement part configured to allow the contents to be passed by opening due to movement.

The passing movement part may include an opening member moving in a passing direction of the contents to form a passing space for the contents.

Passage of the contents may be guided by deformation of the contents passing means.

The passing operation part may include an opening that communicates with a before-passing part in which the contents are located before passing through the passing operation part so that the contents in the before-passing part are moved to the opening, and the contents passing means may move the contents via the opening.

The dispensing device, which is an opening-closing apparatus that is applied to a contents moving apparatus or a containing apparatus and can be opened and closed from a main body of the contents moving apparatus or the containing apparatus, includes a housing with at least one open side, wherein the opening-closing apparatus may include an opening-closing apparatus body and a passing operation part, and the passing operation part may allow a storing part of a contents moving apparatus main body or the containing apparatus main body to at least partially communicate with the opening-closing apparatus so that contents in the storing part moves to the opening-closing apparatus.

In the passing operation part, the contents in the storing part may move to the opening-closing apparatus by deformation of the contents passing means.

The passing movement part may include a movement member, and the movement member may movably connect the opening member.

The dispensing device may include a receiving part configured to receive the contents being passed, and the receiving part may receive the contents being passed and have a shape that resists to limit more than a reception demand amount of contents from remaining therein.

The receiving part may resist reception of contents exceeding a certain amount in a passing direction by coming into contact with the contents being passed and, after the contents pass, limit an amount of remaining contents to the certain amount.

The passing operation part may include a passing passage part formed to extend from a passing discharge side which is a side at which contents come into contact with the contents passing means to a passing entry side which is a side at which the contents enter, and the passing passage part may guide movement of the contents to the contents passing means.

The passing passage part may limit a movement amount of the contents moving to the contents passing means.

The passing movement part may be a balancing part configured to suppress being tilted together with the passing operation part by a slope exceeding the slope of the passing operation part by a force for balancing the weight by the center of gravity of the balancing part when the passing operation part is tilted. Weight balancing action of the balancing part controls the contents to pass through the passing operation part.

The passing operation part may include a fixing member forming an opening to allow the contents to pass therethrough.

Passage of the contents may be guided via the opening according to whether the passing space formed by movement of the opening member is open, and the opening member may be directly or indirectly connected to the fixing member.

The contents passing means may include a movement member, and the movement member may rotatably connect the opening member.

The passing operation part may include a fixing member having the opening to allow the contents to pass therethrough.

The contents passing means may include an opening member connected to the fixing member, and the opening member may move and guide reception of the contents according to whether the opening is opened.

The contents passing means may include a movement member configured to movably connect the opening member.

The contents in the storing part may move to the opening-closing apparatus or move via the opening-closing apparatus by deformation of the contents passing means.

The contents passing means may include a passing movement part that allows contents to pass therethrough by opening due to movement.

The passing movement part may include an opening member configured to form a passing space of contents by moving in a passing direction of the contents.

The opening-closing apparatus may have an opening formed via which the contents moved from the storing part are able to pass to an outside of the opening-closing apparatus or are able to be taken out.

The passing operation part may have an opening, and the opening may be formed to protrude to a predetermined height.

The passing space for the contents may be formed as an unfixed free end of the opening member moves due to at least one of pressure caused by a weight of the contents, shaking of a housing provided with the passing operation part, and a self-weight of the opening member.

The opening member may have one side fixed in a direction of the fixing member and the other side not fixed and being opened by movement and prevent falling of the contents, and a passing space may be formed in the opening.

The fixing member may be disposed at an inner circumferential surface of a through-hole portion which is an inner through-hole space of the dispensing device to which the opening member is connected, or may be a member of the housing included in the dispensing device.

A single opening member or a plurality of opening members may be provided.

The passing movement part may include a blocking member interlocked to the opening member to block at least a portion of the opening so that the contents cannot pass therethrough or only a part of the contents pass therethrough.

When the contents press the opening member, the contents may be introduced as the opening member is tilted back, and the blocking member may prevent contents beyond a predetermined amount from passing the opening by being interlocked to the opening member and blocking at least a portion of the opening.

The blocking member may include a support member abutting the fixing member to maintain a closed state of the opening member.

When the passing operation part is tilted, the shape of the passing movement part may be formed so that rotation due to a self-weight of the passing movement part is not performed before a demand amount of contents come into contact with the opening member or a constituent member of the passing movement part may be coupled to the passing operation part to form a weight or a center of gravity of the balancing part.

The dispensing device may include a movement fixing part disposed at an opening side of the fixing member to rotatably connect the movement member to the fixing member.

The contents passing means may be a passing means disposed in the passing operation part to guide passage of contents corresponding to demand.

The contents passing means may include a stopper to limit an angle of rotation of the opening member.

When the passing operation part is tilted and rotation is about to happen due to the self-weight of the opening member, the rotation of the opening member may be restrained by weights and positions of centers of gravity of two or more of the opening member, the blocking member, and the movement member, and blockage of passage of the contents may be prevented before a demand amount of the contents passes.

When the passing operation part is tilted and rotation is about to happen due to the self-weight of the opening member, the rotation of the opening member may be restrained by weights and positions of centers of gravity of two or more of the opening member and the movement member and the movement member, and blockage of passage of the contents may be prevented before a demand amount of the contents passes.

The passing operation part may include a movement guide part configured to guide introduction of contents into the contents passing means.

The movement guide part may have a guide hole penetrated toward the contents passing means and have an inclined surface formed along an edge of the guide hole.

The opening member may allow the contents to pass therethrough by opening the opening by movement of an unfixed free end thereof.

The through-hole portion may be divided into a contents storing part in which the contents are stored and a dispensing part in which contents stand by to be withdrawn after a demand amount of the contents pass through the contents storing part.

The dispensing device may include a separating plate configured to separate the passing operation part and the storing part between the passing operation part and the storing part in which the contents are stored.

The passing movement part may include an opening member moving in a passing direction of the contents to form a passing space for the contents.

The passing operation part may prevent a reception demand amount of contents moved from the before-passing part from moving to the before-passing part.

A movement angle of the opening member may be limited by one or more of the stopper included in the contents passing means or a cover connected to the housing provided with the passing operation part.

The before-passing part may be a storing part in which contents are stored and include a standby containing part for contents to stand by to be withdrawn, the storing part and the standby containing part may partially communicate with each other via the opening formed in the passing operation part, and contents in the storing part may move to the standby containing part via the opening.

The movement member may be integrally disposed with the opening member or disposed to be separable from the opening member.

The movement member may be connected to the movement fixing part to hinge-connect the opening member that is to be moved in a self-weight direction or a pressing direction of the contents.

The opening member may have one side fixed in the direction of the fixing member and the other side not fixed and capable of opening and closing the opening by movement.

The receiving part may include an introducing member configured to allow introduction of the contents into the receiving part and prevent introduction of the contents into portions other than the receiving part.

An upper surface of the passing operation part may serve to support the contents, and the contents received by the receiving part may be concentrated in an inner area of a standby step included in the upper surface.

The passing movement part may further include a movement control member for balance of a center of gravity of the passing movement part.

The dispensing device may include a cover connected to the housing provided with the passing operation part to receive contents received via the dispensing device, and the cover may be separably coupled to the housing.

The movement member may have a guide plate member at a circumferential surface so that limiting the contents is guided before the contents are introduced into the opening member by the guide plate member, and passing responsiveness is improved by the opening member being opened due to the contents pressing the guide plate member, a side plate member may be included at an entry side surface of the opening, the side plate member may guide the contents to be introduced into the opening member along the blocking member, the inner surface or the side plate member of the opening may include a support block to maintain a state in which the opening is blocked by the opening member, and the blocking member may include a support member coming into contact with the fixing member to maintain a closed state of the opening member.

The dispensing device may include a movement guide part configured to guide introduction of the contents into the passing operation part, and the movement guide part may have a guide hole penetrated toward the passing operation part and have an inclined surface to guide introduction of the contents.

The fixing member may have an inclined surface formed to extend to guide reception of contents.

The opening member may be connected to a restoring member configured to assist in closing the opening by returning after the contents pass by the opening being opened.

The movement control member may be configured to maintain the balance of the balancing part to suppress rotation to occur or decrease when the passing operation part is tilted, and the opening member may be prevented from tilting by a slope exceeding the slope of the passing operation part by a force for balancing the weight by the center of gravity of the balancing part and maintaining the center-of-gravity position in the direction of gravity being generated by weights of the opening member and the movement control member or weights of the opening member, the movement control member and one or more separate members moving together with the opening member.

The receiving part may include a resistive upper plate member configured to resist at an upper portion in a passing direction by coming into contact with the contents being passed.

The receiving member may include a resistive side plate member configured to resist at a side surface with respect to the passing direction by coming into contact with the contents being passed.

The receiving part may include a partitioning member configured to partition a space of the receiving part, and the partitioning member may limit an amount of contents received in the receiving part by adjusting a contents receiving space of the partitioned receiving part.

The passing operation part may include a blocking member disposed at the opening to block movement of contents, and the blocking member may block movement of the contents to the storing part when the opening is opened or prevent introduction of the contents into a portion other than the contents receiving space when the contents pass through the contents passing means.

When a length of one end of a single content passing through the passing passage part is different from a length of the other end thereof, a passage minimal inner diameter, which is a minimal length inner diameter of an inner space of the passing passage part may be less than or equal to two times a content maximal outer diameter in a unitary direction, which is a maximal outer diameter length of a single content in a unitary direction, so that two or more contents cannot simultaneously enter or pass through the passing passage part, and the contents may be able to enter or pass through the passing passage part only one at a time.

When the length of one end of a single content passing through the passing passage part is different from a length of the other end thereof, the passing passage part may guide the contents to pass through the passing passage part in a longitudinal direction of the contents.

The contents passing means may include an opening member moving in a passing direction of the contents to form a passing space for the contents and include a blocking member interlocked to the opening member to close at least a portion of the opening which is open, and the blocking member blocks at least a portion of the opening in conjunction with the opening member moving in contact with the contents and blocks to prevent more than a demand amount of contents from being introduced into the opening when a single content passes through a front portion of the passing passage part, another single content is adjacent behind the content that passed through the front portion and enters the passing passage part such that the contents behind the contents of the demand amount is blocked by the blocking member for entry into the opening.

A movement guide part configured to introduce the contents into the passing passage part may be disposed at a lower portion of the passing passage part, at least a portion of the movement guide part may be formed as an inclined surface, and the contents may be guided to where the passing passage part is located.

When the passing operation part is tilted, the contents may move over the inclined surface in the direction of gravity of the movement guide part.

The movement guide part may include an air vent part having one or more through-hole formed, and although ventilation is performed via the through-holes included in the air vent part, the contents may not be able to pass through the through-holes because the sizes of the through-holes included in the air vent part are smaller than a size of a single content.

The balancing part may include an opening member moving in a passing direction of contents to form a passing space for the contents and include a movement increase control member configured to break balance in a moving direction of the balancing part and increase movement force of the balancing part when the contents come into contact with the opening member, the weight of the contents are transmitted to the opening member, and movement of the balancing part is performed.

A non-storing space part that is separated from the storing part, which is a storing space for the contents, may be partitioned by one or more of the passing operation part including the air vent part and the movement guide part, when a preservative is placed in the non-storing space part, components of the preservative may move to the storing part for the contents via the through-holes of the air vent part through air, and the preservative in the non-storing space part may be separately disposed from the storing part so that passing movement of the contents is not interfered.

Deformation of the contents passing means that occurs when at least a portion of a constituent member of the contents passing means rotates and is deformed may be prevented from occurring before contact with contents or may be delayed until a close time point before the contact by the self-weight and the movement part center of gravity of the passing movement part, and the deformation of the contents passing means may not occur before contact with the contents due to the self-weight of the contents and occurs due to rotational movement caused by the self-weight of the passing movement part and the content which have come into contact with the passing movement part after the contact with the contents due to the self-weight of the contents.

The opening member may be configured to be bent, and an opening member bending part at which the opening member is bent may be linearly broken or curved.

The opening member may be bent by an angle equal to or larger than a right angle to secure a space between the opening member and the blocking member, when the contents is in a long form, a demand amount of contents that entered the space between the opening member and the blocking member in a longitudinal direction may push the opening member so that the opening member rotates together with the blocking member, the rotating blocking member may not interfere with the demand amount of contents that pushed the opening member, and the blocking member may block excess contents when contents beyond a demand amount enter the passing operation part.

The blocking member may be configured to be bent, and a blocking member bending part at which the blocking member is bent may be linearly broken or curved.

The dispensing device may include a balancing part configured to control movement of the passing movement part by a self-weight of the passing movement part, the balancing part may include one or more of a movement control member, an opening member, a blocking member, and a movement member, and the balancing part may control movement due to the self-weight of the passing movement part by a balancing action through weights and positions of one or more of the movement control member, the opening member, the blocking member, and the movement member.

The dispensing device may include a balancing part configured to control movement of the contents passing means by a self-weight of the contents passing means, the balancing part may include one or more of a movement control member, an opening member, a blocking member, and a movement member, and the balancing part may control deformation due to the self-weight of the contents passing means by weights and positions of one or more of the movement control member, the opening member, the blocking member, and the movement member.

The movement control member may control one or more of a movement distance and a movement angle due to a self-weight of the opening member.

When the passing operation part is tilted, the movement control member may control the blocking member to not block passage of a demand amount of contents by rotation due to a self-weight of the opening member or a member moving together with the opening member before the demand amount of contents push the opening member, and corresponding to a weight of the opening member or a weight of one or more members moving together with the opening member, the movement control member may be configured to have a weight and a position for controlling movement due to a self-weight of the passing movement part or the balancing part including the opening member.

When the passing operation part is tilted, by weights of the opening member and the movement control member, the opening member, or a weight of a separate member moving together with the movement control member and the opening member, weight balancing may be performed by the center of gravity of the balancing part, the opening member may not be tilted more than the passing operation part, and the opening member may maintain a position and a slope in the passing operation part.

When the passing operation part is tilted, a force for allowing the opening member and the movement control member to maintain positions in the direction of gravity by weight balancing may be acted.

The dispensing device may include a resistive member included in the passing operation part, and the resistive member may limit passage of contents passing through an inside of the passing operation part.

The dispensing device may include a resistive member included in the passing operation part, and the resistive member may resist and limit passage of contents passing through the inside of the passing operation part.

The dispensing device may include a housing with at least one open side, the passing operation part may be included in the housing, and the contents passing means may guide passage of the contents to one side of the housing by opening due to movement in a contents moving direction.

The movement member has a deformed shape to be resisted by the contents passing means and stop at a predetermined position when moving or includes a movement member protrusion which protrudes from the movement member.

Passage of contents may be guided by deformation of the contents passing means which occurs due to tilting or shaking of the passing operation part.

The dispensing device may include a movement guide part configured to guide movement of contents when the passing operation part is tilted, and contents may be guided along a surface of the movement guide part to pass therethrough by a self-weight or inertia of the contents while the movement guide part is tilted.

The movement guide part may be a housing or a guide member connected to the housing.

The movement guide part may extend a guide member so that contents being moved are concentrated.

The contents passing means may include a passing movement part configured to pass contents by movement, and when the passing operation part is tilted or moves, the passing movement part may move due to one or more of a self-weight of the passing movement part, an inertia of the passing movement part, and a force of the contents pressing the passing movement part.

The passing movement part may include an opening member moving in the same direction as contents being passed to allow passage of the contents.

The passing movement part may include a blocking member, separate from the opening member, moving in a direction of the opening member and configured to block at least a portion of an opening to prevent passage of contents therethrough or allow only a portion of the contents to pass therethrough.

The passing movement part may include a passing compartment part disposed between the opening member and the blocking member, and contents of a compartment part containable amount may be contained in the passing compartment part so that movement of the contained contents is guided.

The compartment part containable amount contained by the passing compartment part may be equal to or larger than a demand amount of contents passing through the contents passing means in the passing compartment part, the passing compartment part may include a passing resistance part configured to resist passage of contents contained in the passing compartment part through the passing compartment part, and when the compartment part containable amount contained in the passing compartment part exceeds the demand amount, the passing resistance part may resist so that the excess contents beyond the demand amount do not pass through the passing compartment part.

In the passing movement part, a movement part center-of-gravity position of the passing movement part and a movement part center-of-rotation position, which is a center of rotation of the passing movement part, may be different from each other.

When the movement part center-of-gravity position of the passing movement part is disposed in an opposite direction of an external passing direction of the dispensing device, which is behind the movement part center-of-rotation position of the passing movement part, and the passing operation part is tilted or shaken, rotation of the passing movement part may be restrained or delayed due to a difference between the movement part center-of-gravity position and the movement part center-of-rotation position.

The passing operation part may form an opening for allowing contents to pass therethrough, and when the passing operation part is tilted or moves, the passing movement part may not perform rotation which results in opening the opening so that contents may pass therethrough or rotation of the passing movement part may be suppressed by the self-weight of only the passing movement part.

Before the contents resist the passing movement part and open the opening, the passing movement part may not open the opening to an extent in which contents may pass therethrough by the self-weight of the passing movement part.

The passing movement part may be interlocked to the opening member and move in a direction of the opening member and include a containing member configured to contain a demand amount of contents and move together with the opening member.

The passing movement part may include a passing compartment part disposed between the opening member and the containing member, and contents of the compartment part containable amount may be contained in the passing compartment part to guide movement of the contained contents.

The passing movement part may include a bottom part for accommodating the contents, and the bottom part may support a lower portion in the direction of gravity of the contents in the passing movement part when the passing operation part is tilted.

The bottom part may include a bottom-height changing member that is higher than or protrudes from the bottom part, when contents come into contact with the bottom-height changing member, the position of the contents that are supported at the bottom part and passing through the passing movement part by resistance is lifted in a height direction of the bottom-height changing member.

Due to a change in positions of contents which are passing through the passing movement part, a space of an opening that is open to allow the contents to pass therethrough may be narrowed, and due to the narrowed opening space, contents beyond the capacity may be prevented from passing through the passing movement part.

The bottom part may be disposed between an opening member and a containing member interlocked to the opening member to contain a demand amount of contents and move.

The length of the bottom part may be equal to or larger than a length of an end in a longitudinal direction of contents and accommodate a long-side length of the contents.

The opening member may move to be opened due to a self-weight or a pressing force of contents and may guide passage of the contents.

The passing movement part may include a stopper configured to limit an angle of rotation of the opening member.

The passing movement part may move to be open due to a self-weight of the passing movement part or a pressing force of contents and may guide passage of the contents via a passing space formed by the passing movement part being opened.

Deformation of the contents passing means may operate forward, which is an opening direction of the dispensing device, and the contents passing means may guide passage of the contents in a direction of opening thereof by a passing space formed due to the deformation of the contents passing means in an open state in which there is no opening-closing apparatus or a cover that allows a housing provided with the contents passing means to be opened or closed at the passing operation part side of the housing.

The contents passing means may guide passage of contents only by the deformation of the contents passing means due to resistance with the contents without coming into contact with or being resisted by an opening-closing apparatus at the passing operation part of the housing provided with the contents passing means or a member fixed to the opening-closing apparatus.

The passing movement part may guide passage of contents due to resistance with the contents in a state in which the housing provided with the passing movement part is open in a contents passing direction of the contents passing means.

The passing movement part may move corresponding to movement of contents due to gravity action and open the passing operation part so that the contents pass therethrough, and the contents may pass through the contents passing means just by gravity action caused by tilting, flipping, or shaking of the passing operation part provided with the passing movement part.

Contents may pass through the passing movement part by rotation of the passing movement part.

By the rotation of the passing movement part, passage of contents beyond a necessary amount may be blocked after the contents pass through the passing movement part.

Rotation of the passing movement part that allows the contents to pass therethrough may be performed by gravitational motion of the contents due to tilting, flipping, or shaking of the passing operation part or transmission of movement force of the contents to the passing movement part.

The rotation of the passing movement part may be performed by movement force caused by the contents pressing the contents pressing means by the self-weight of the contents.

Passage of contents may be guided by deformation of the contents passing means, and the deformation of the contents passing means may be deformation due to movement of the passing movement part.

The contents may pass through the contents passing means by sliding in contact with a surface disposed in the housing or the passing means.

Deformation of the contents passing means due to rotation by the center of gravity of the passing movement part that occurs during rotation generated by at least a portion of a member of the passing movement part rotating may be prevented from occurring before contact with contents or may be delayed until a close time point before the contact.

Deformation of the contents passing means due to rotation caused by a self-weight of the passing movement part may not occur before contact with the contents due to a self-weight of the contents, and the deformation of the contents passing means may occur upon contact with the contents due to the self-weight of the contents.

When the passing operation part is tilted or shaken, the passing movement part may rotate in the direction of gravity about a hinge shaft of the passing operation part due to a self-weight of at least one portion of the passing movement part, and the passing movement part that has rotated in the direction of gravity may form a passing space of contents.

When the passing movement part rotates about a shaft of the housing, rotation of the passing movement part may be performed in contact with an inner surface of the housing or may be performed in contact with a shaft member of a movement fixing part.

The passing passage part may have a shape that resists to prevent the excess contents beyond the demand amount from completely passing through the passing passage part when contents beyond the demand amount enter the passing passage part.

The passing passage part may have a resistive member or a resistive shape that resists to prevent the excess contents beyond the demand amount or the entire contents including the demand amount from passing through the passing passage part when contents beyond the demand amount enter the passing passage part, and may prevent the contents beyond the demand amount from passing through the contents passing means.

The resistive member or the resistive shape of the passing passage part may come into contact with or resist the contents that enter the passing passage part to interfere with passage of contents beyond the demand amount.

The opening member may be rotatably provided.

The contents passing means may open and close an opening by deformation of the contents passing means.

Passage of the contents through the opening member may be facilitated by positions of the contents being lifted.

The bottom part may include a bottom-height changing member configured to change the height of the bottom part, the bottom part may protrude partially or entirely, and when contents move in contact with the bottom-height changing member, the bottom-height changing member may move in a moving direction of the contents along the bottom part due to resistance against the bottom part by the self-weight of the contents, the center of gravity of the passing movement part may move in the passing direction of the contents, and the passing movement part may move in the passing direction of the contents.

The bottom part may allow passage of the contents by moving in the same direction as the contents being passed due to resistance caused by contact between the contents and the bottom part, and the passing movement part may include an opening member or be moved just by movement of the bottom part without a separate opening member in the passing movement part.

The bottom part or the bottom-height changing member included in the bottom part may include one or more of a friction surface, a friction material, and a curved shape.

Contents passed by the contents passing means may be at least one of solid, powder, and liquid contents.

The solid may be at least one of a solid medicine, a food, an apparatus, a tool, a material, a food material, an industrial material, and a general material, and the power may be at least one of a powder medicine, a food, an apparatus, a tool, a material, a food material, an industrial material, and a general material.

The passing movement part may further include a movement increase control member, the movement increase control member may be configured in a protruding shape as a curved surface on the bottom part, when contents move in contact with a surface of the movement increase control member, the movement increase control member may move in the moving direction of the contents along the bottom part by the resistance due to the self-weight of the contents, the center of gravity of the balancing part may be biased in the passing direction of the contents, and a force of the passing movement part moving in the passing direction of the contents may be increased, and the movement increase control member may increases movement of the passing movement part in the passing direction of the contents and allow the contents to pass through the passing operation part.

The movement guide part may have a height guiding member formed at an entry side of contents, the height guide member may divide a height difference generated during movement of the contents to the contents passing means into a plurality of stages or may be configured as an inclined surface, and the height guiding member may guide the contents in the storing part to be stably moved to the contents passing means by guiding the movement of the contents in such a manner that the height difference does not block the movement of the contents.

The dispensing device may include a detecting part configured to detect passage of contents when the contents pass through the contents passing means.

The detecting part may detect or measure one or more of an amount of the contents being passed, a date, day, and time of the passage of the contents.

The contents measurement by the detecting part may be a measurement using an electronic sensor or a mechanical operation.

The dispensing device may include a display part configured to display data detected or measured by the detecting part or whether contents passed through the passing operation part by operation of the contents passing means to be recognized by a user using one or more sensing methods of a visual sense, an auditory sense, and tactile sense.

The dispensing device may include a communicating part configured to transmit the data detected or measured by the detecting part.

The detecting part may include one or more sensor types of a touch sensor, an acceleration sensor, an angular velocity sensor, a gravity sensor, a geomagnetic sensor, a gyroscope sensor, a proximity sensor, a motion sensor, an electronic compass, a magnetometer sensor, and a gesture sensor.

The dispensing device may include a controller configured to limit contents moving operation of the contents passing means when the detecting part detects a fixed amount of the contents passing through the contents passing means within a predetermined period or at a predetermined time or detects contents beyond the fixed amount passing through the contents passing means.

The display part may display using one or more of a number, a letter, a symbol, braille, light emission, lighting, and color.

Whether the contents passed or the amount of the contents being passed detected by the detecting part may be determined, and whether the contents passed or the amount of contents being passed determined above or one or more data of a date, day, and time of the passage of the contents in addition to the whether the contents passed or the amount of contents being passed determined above may be displayed on the display part.

Whether the contents passed or the amount of the contents being passed detected by the detecting part may be determined, and whether the contents passed or the amount of contents being passed determined above or one or more data of a date, day, and time of the passage of the contents in addition to the whether the contents passed or the amount of contents being passed determined above may be transmitted in the vicinity or remotely via the communicating part.

The dispensing device may include a locking part configured to prevent passage of more contents through the dispensing device when the detecting part detects contents passed through the contents passing means and it is determined that a designated amount of contents passed through the contents passing means.

The locking part may be disposed in the dispensing device to block movement of the contents passing means or block a movement path of the contents in the passing operation part.

A display on the display part may be one or more of a number, a letter, a symbol, and a signal using a liquid crystal display (LCD) or a light emitting diode (LED).

When regulation is required in cases of a medication that requires to be taken in a limited dose or a food that requires restricted intake of normal people, the locking part may maintain a locked state at a designated time or before a situation ends.

The blocking of the movement of the contents passing means may be performed by coming into contact with and resisting a movement portion of the contents passing means, and the blocking of the movement path in the passing operation part may be performed by blocking or resisting contents by the passing passage part disposed at a passing entry side and a passing discharge side for the contents.

One or more of a number, a letter, and a symbol may be displayed on a surface of the contents or inside the contents so that the displays on the contents that passed through the contents passing means or the contents that did not pass through the contents passing means may be observed.

In addition, according to aspects of the present invention, a valve, which is a dispensing device that is disposed in a contents moving apparatus through which contents move and guides passage of the contents, includes a passing operation part configured to allow the contents to pass therethrough, wherein the passing operation part may be connected to a before-passing part located before the contents pass through the passing operation part, the passing operation part may include a contents passing means configured to allow the contents to move from the before-passing part, and the contents passing means may control movement of the contents in the contents moving apparatus.

The passing operation part may prevent a demand amount of contents moved from the before-passing part via the contents passing means in the contents moving apparatus from moving back to the before-passing part.

The passing operation part may include an opening configured to allow contents pass therethrough and move the contents via the opening, and the contents in the before-passing part may move via the opening by deformation of the contents passing means.

Further, according to aspects of the present invention, a valve, which is a dispensing device that is disposed in a movement part through which contents move and guides passage of the contents, includes a passing operation part configured to allow the contents to pass therethrough, and the passing operation part may include a contents passing means configured to allow the contents to move.

The contents passing means may include a passing movement part configured to allow the contents to pass therethrough by movement.

In the passing operation part, passage of contents may be guided by deformation of the contents passing means that occur due to tilting or shaking of the passing operation part.

The valve may include a movement guide part configured to guide movement of contents when the passing operation part is tilted, and contents may be guided along a surface of the movement guide part to pass therethrough by a self-weight or inertia of the contents while the movement guide part is tilted.

The passing movement part may move due to one or more of a self-weight of the passing movement part, an inertia of the passing movement part, and a force of the contents pressing the passing movement part when the passing operation part is tilted or moves.

The passing movement part may include an opening member moving in the same direction as contents being passed to allow passage of the contents.

The passing movement part may include a blocking member, separate from the opening member, moving by being interlocked to the opening member to block at least a portion of an opening to prevent passage of contents therethrough or allow only a portion of the contents to pass therethrough.

The passing movement part may include a passing compartment part disposed between the opening member and the blocking member, and contents of a compartment part containable amount may be contained in the passing compartment part so that movement of the contained contents is guided.

In the passing movement part, a movement part center-of-gravity position of the passing movement part and a movement part center-of-rotation position, which is a center of rotation of the passing movement part, may be different from each other.

The passing operation part may form an opening for allowing contents to pass therethrough, and when the passing operation part is tilted or moves, the passing movement part may not perform rotation which results in opening the opening so that contents may pass therethrough or rotation of the passing movement part may be suppressed by the self-weight of only the passing movement part.

Before the contents resist the passing movement part and open the opening, the passing movement part may not open the opening to an extent in which contents may pass therethrough by the self-weight of the passing movement part.

The passing movement part may include a containing member interlocked to the opening member to move in a direction of the opening member and configured to contain a demand amount of contents together with the opening member and move.

The passing movement part may include a passing compartment part disposed between the opening member and the containing member, and contents of a compartment part containable amount may be contained in the passing compartment part so that movement of the contained contents is guided.

The passing movement part may include a bottom part for accommodating the contents, and the bottom part may be disposed between the opening member and the containing member interlocked to the opening member to contain a demand amount of contents and move.

The opening member may move to be opened due to a self-weight or a pressing force of contents and may guide passage of the contents.

According to aspects of the present invention, a contents moving apparatus includes a dispensing device disposed in the contents moving apparatus for holding contents to guide passage of the contents; and a housing with at least one open side, wherein the dispensing device includes a passing operation part for allowing the contents to pass therethrough, and the passing operation part includes a contents passing means for allowing the contents to move.

The contents passing means may include a passing movement part configured to form a passing space for the contents by movement.

In the passing operation part, contents may move by deformation of the contents passing means that occur due to tilting or shaking of the passing operation part.

The contents moving apparatus may include a movement guide part configured to guide movement of contents when the passing operation part is tilted, and contents may be guided along a surface of the movement guide part to pass therethrough by a self-weight or inertia of the contents while the movement guide part is tilted.

The passing movement part may move due to one or more of a self-weight of the passing movement part, an inertia of the passing movement part, and a force of the contents pressing the passing movement part when the passing operation part is tilted or moves.

The passing movement part may include an opening member moving in the same direction as contents being passed to allow passage of the contents.

The passing movement part may include a blocking member, separate from the opening member, moving by being interlocked to the opening member to block at least a portion of an opening to prevent passage of contents therethrough or allow only a portion of the contents to pass therethrough.

The passing movement part may include a passing compartment part disposed between the opening member and the blocking member, and contents of a compartment part containable amount may be contained in the passing compartment part so that movement of the contained contents is guided.

In the passing movement part, a movement part center-of-gravity position of the passing movement part and a movement part center-of-rotation position, which is a center of rotation of the passing movement part, may be different from each other.

The passing operation part may form an opening for allowing contents to pass therethrough, and when the passing operation part is tilted or moves, the passing movement part may not perform rotation which results in opening the opening so that contents may pass therethrough or rotation of the passing movement part may be suppressed by the self-weight of only the passing movement part.

Before the contents resist the passing movement part and open the opening, the passing movement part may not open the opening to an extent in which contents may pass therethrough by the self-weight of the passing movement part.

The passing movement part may include a containing member extending from the opening member to move in the same direction as the opening member and interlocked to the opening member to contain a demand amount of contents and move.

The passing movement part may include a passing compartment part disposed between the opening member and the containing member, and contents of a compartment part containable amount may be contained in the passing compartment part so that movement of the contained contents is guided.

The passing movement part may include a bottom part for accommodating the contents, and the bottom part may support a lower portion in the direction of gravity of the contents in the passing movement part.

The passing movement part may include an opening member moving in the same direction as contents being passed and configured to allow passage of the contents, and the bottom part may be disposed between the opening member and the containing member interlocked to the opening member to contain a demand amount of contents and move.

The bottom part may have a length for containing a maximum length of contents.

The opening member may move to be opened due to a self-weight or a pressing force of contents and may guide passage of the contents.

Further, according to aspects of the present invention, a containing apparatus includes a dispensing device disposed in the containing apparatus for holding contents to guide passage of the contents; and a housing with at least one open side, wherein the dispensing device includes a passing operation part for allowing the contents to pass therethrough, and the passing operation part includes a contents passing means for allowing the contents to move.

Further, according to aspects of the present invention, a contents apparatus includes a dispensing device including contents and configured to guide passage of the contents; and a housing with at least one side open, wherein the dispensing device includes a passing operation part for allowing the contents to pass therethrough, and the passing operation part includes a contents passing means for allowing the contents to move.

One or more of a number, a letter, and a symbol may be displayed on a surface of the contents or inside the contents so that the displays on the contents that passed through the contents passing means or the contents that did not pass through the contents passing means may be observed.

The contents apparatus may be one or more of a game apparatus, a board game apparatus, a toy apparatus, and a learning apparatus.

As described above, unlike the prior art, by a dispensing device, a valve, a containing apparatus having the same, a contents moving apparatus and a contents apparatus according to an embodiment of the present invention, a fixed amount or a necessary amount of contents in the form of solid, powder, or liquid can be discharged from an apparatus, and an opening member is included to block a contents passing side of the containing apparatus, the contents moving apparatus, and the contents apparatus so that passage of a demand amount of contents can be stably guided.

Aspects of the present invention can improve an opening-closing reaction responsiveness by limiting a movement angle of an opening member configured to open the contents passing side of the containing apparatus, the contents moving apparatus, and the contents apparatus.

Aspects of the present invention can stably guide passage of a fixed amount of contents by varying a passing space to secure a receiving part of the contents.

Aspects of the present invention can prevent passage of more contents by closing a passing space to an extent that the contents cannot pass therethrough in conjunction with the passing space for the contents being secured and a fixed amount of the contents being passed.

Aspects of the present invention can control movement due to a self-weight by a balancing action through a weight and a center-of-gravity position of a passing movement part to prevent closure of a passing space before a necessary amount of contents pass therethrough and allow the necessary amount of the contents to pass therethrough.

Hereinafter, embodiments of a dispensing device, a valve, a containing apparatus having the same, a contents moving apparatus and a contents apparatus according to the present invention will be described with reference to the accompanying drawings. In this process, thicknesses of lines or sizes of elements illustrated in the drawings may be exaggerated for clarity and convenience of description. Also, terms described below are terms defined in consideration of functions in the present invention and may be changed according to an intention or a practice of an a worker or an operator. Therefore, such terms should be defined on the basis of the contents throughout the present specification.

Figure 2:
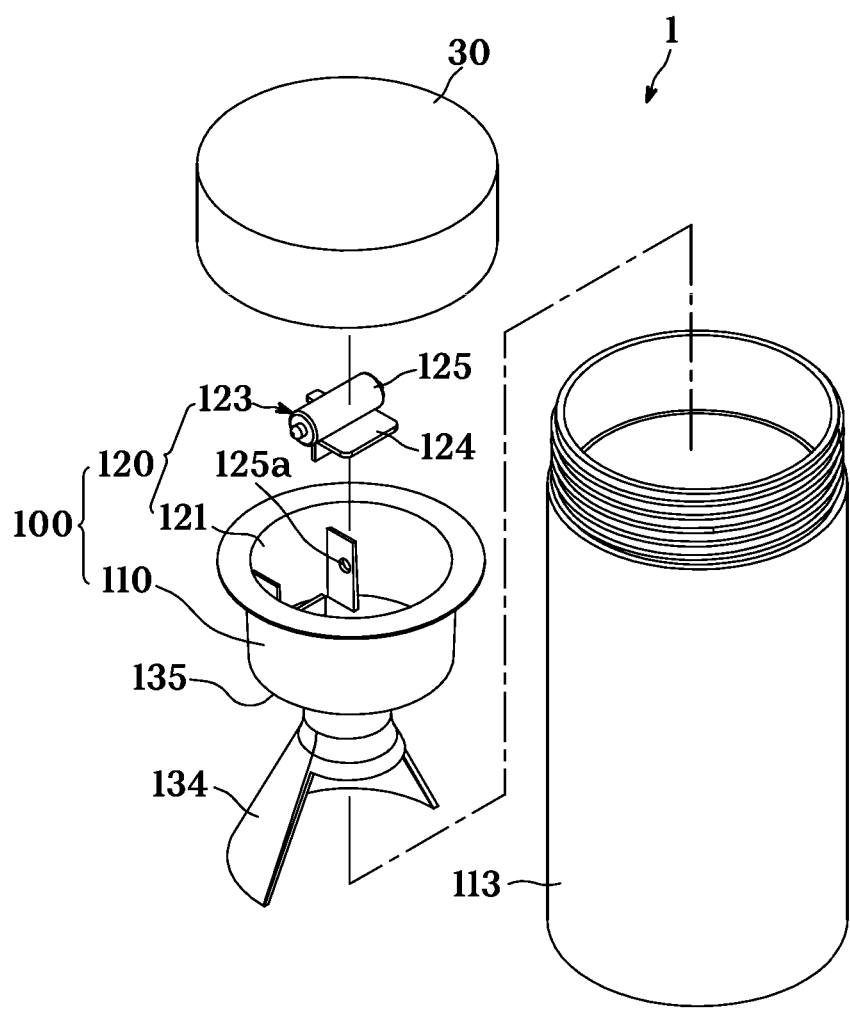
FIG. 2 is an exploded perspective view of the containing apparatus or the contents moving apparatus including the dispensing device according to the first embodiment of the present invention.

FIG. 1 is a perspective view of a containing apparatus or a contents moving apparatus including a dispensing device according to a first embodiment of the present invention, and FIG. 2 is an exploded perspective view of the containing apparatus or the contents moving apparatus including the dispensing device according to the first embodiment of the present invention.

Figure 3:
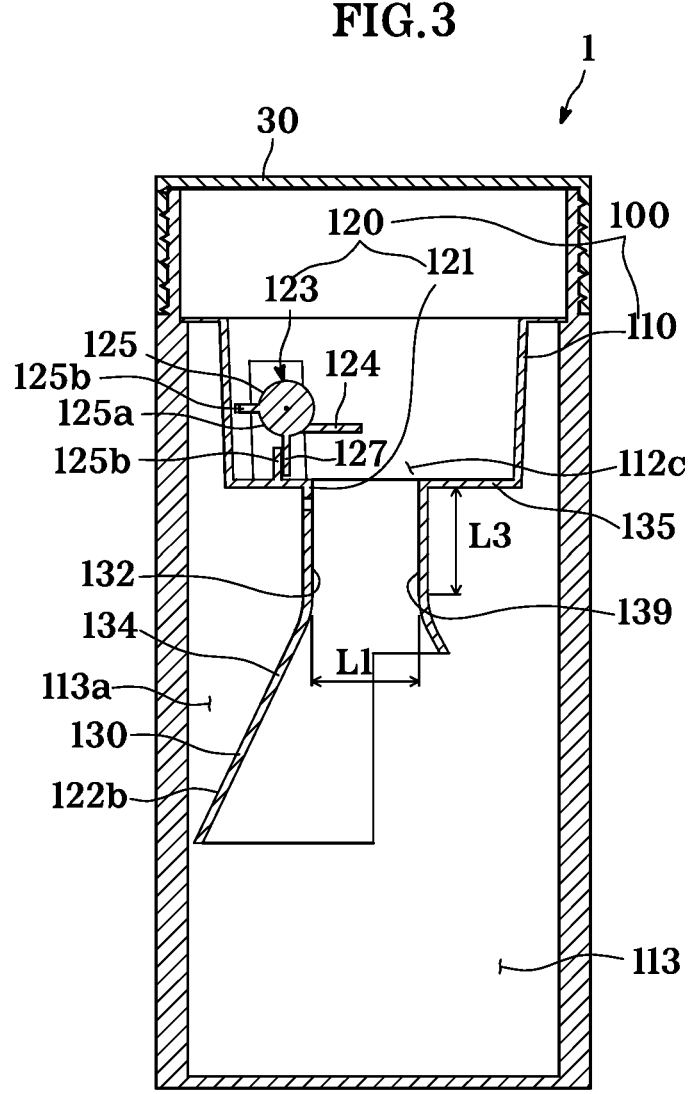
FIG. 3 is a cross-sectional view of the containing apparatus or the contents moving apparatus including the dispensing device according to the first embodiment of the present invention.
Figure 4:
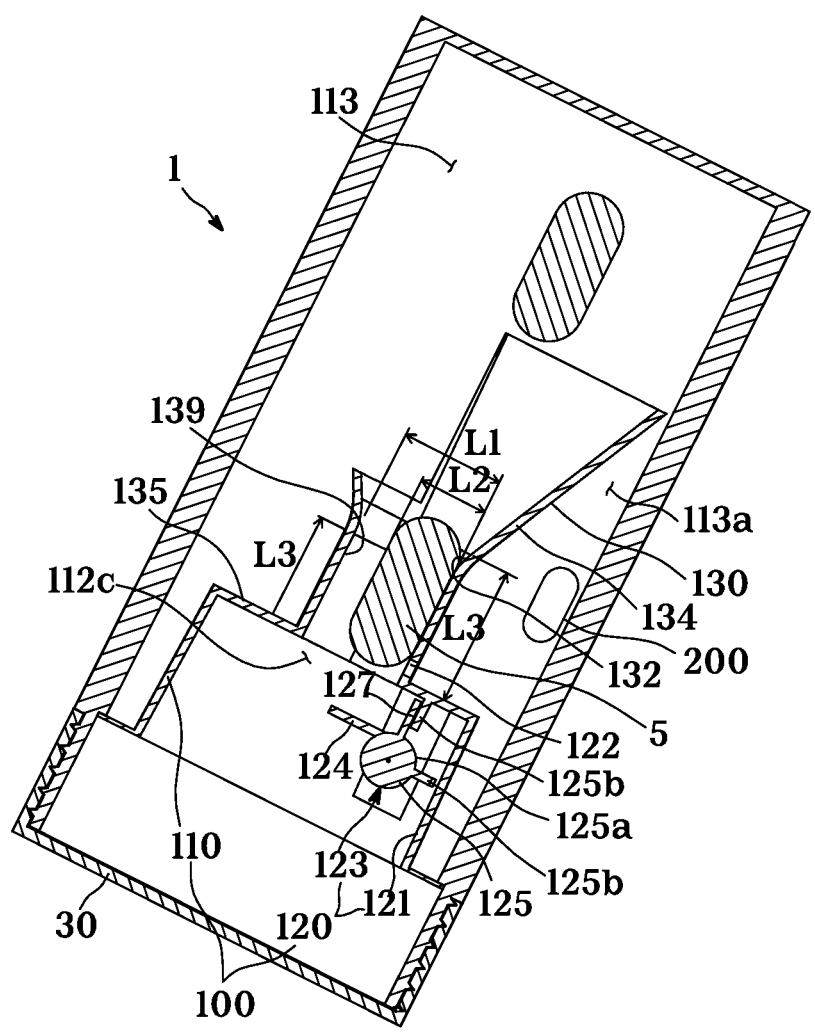
FIG. 4 is a cross-sectional view illustrating a use state of the containing apparatus or the contents moving apparatus including the dispensing device according to the first embodiment of the present invention.

FIG. 3 is a cross-sectional view of the containing apparatus or the contents moving apparatus including the dispensing device according to the first embodiment of the present invention, and FIG. 4 is a cross-sectional view illustrating a use state of the containing apparatus or the contents moving apparatus including the dispensing device according to the first embodiment of the present invention.

As illustrated in FIGS. 1 to 4, the contents moving apparatus or a containing apparatus 1 including a dispensing device according to the first embodiment of the present invention includes a storing part 113, a housing 110, and a passing operation part 120.

Particularly, the passing operation part 120 includes a separating plate 135 and a passing passage part 139.

The separating plate 135 is disposed inside the housing 110 to partition the storing part 113 of the contents moving apparatus or the containing apparatus 1 and a contents passing side, and the passing passage part 139 extends between a passing entry side and a passing discharge side for contents.

In the present embodiment, the housing 110 is formed in the storing part 113 located inside a main body of the contents moving apparatus or the containing apparatus.

Particularly, the passing passage part 139 serves to guide movement of the contents to a contents passing means 123.

Further, the passing passage part 139 serves to limit a movement amount of the contents moving to the contents passing means 123.

Specifically, when a length of one end of a single content passing through the passing passage part 139 is different from a length of the other end thereof, a passage minimal inner diameter L1, which is a minimal length inner diameter of an inner space of the passing passage part 139 is less than or equal to two times a content maximal outer diameter L2, which is a maximal outer diameter length of a single content, so that two or more contents cannot simultaneously enter or pass through the passing passage part 139, and the contents can enter or pass through the passing passage part 139 only one at a time.

When the length of one end of a single content passing through the passing passage part 139 is different from a length of the other end thereof, the passing passage part 139 guides the contents to pass through the passing passage part 139 in a long end length direction L3.

The contents passing means 123 includes a blocking member 127 interlocked to an opening member 124 to close an opening 122 which is open. When a single content passes through a front portion of the passing passage part 139, another single content is adjacent behind the content that passed through the front portion and passes through a rear portion of the passing passage part 139, and the content that passed through the rear portion moves and comes into contact with the blocking member 127 so that the blocking member 127 blocks at least a portion of the opening 122 and prevents contents beyond a fixed amount from being introduced into the opening 122.

A movement guide part 130 configured to introduce the contents into the passing passage part 139 is disposed at a lower portion of the passing passage part 139.

Particularly, at least a portion of the movement guide part 130 is formed as an inclined surface 134, and the contents are guided to where the passing passage part 139 is located.

Consequently, when the housing 110 including the passing operation part 120 is tilted, the contents move over the inclined surface 134 in the direction of gravity of the movement guide part 130.

Also, one or more of the movement guide part 130 and the separating plate 135 includes an air vent part 122b having one or more through-holes formed, and, although ventilation is performed via the through-holes included in the air vent part 122b, the contents may not be able to pass through the through-holes because the sizes of the through-holes included in the air vent part 122b are smaller than a size of a single content Further, a non-storing space part 113a that is separated from the storing part 113, which is a storing space for contents, may be partitioned by one or more of the passing operation part 120 including the air vent part 122b, the separating plate 135, and the movement guide part 130. When a preservative 200 is placed in the non-storing space part 113a, components of the preservative 200 may move to the storing part 113 via the air vent part 122b of the passing operation part 120 through air, and the preservative 200 in the non-storing space part 113a may be separately disposed from the storing part 113 so that passing movement of the contents is not interfered.

Also, at least a portion of the inclined surface 134 of the movement guide part 130 is formed as a curved surface, and when the contents move, the contents are guided toward the passing operation part 120, which is a direction in which the curved surface narrows, via the curved surface.

Also, the movement guide part 130 may have a guide hole 132 penetrated toward the contents passing means 123 and form the inclined surface 134 along an edge of the guide hole 132.

Also, a movement angle of the opening member 124 may be limited by one or more of a stopper 129 disposed in the contents passing means 123 and a cover 30 connected to the housing 110 including the passing operation part 120.

The contents containing apparatus 1 including the dispensing device may be a container apparatus.

Figure 5:
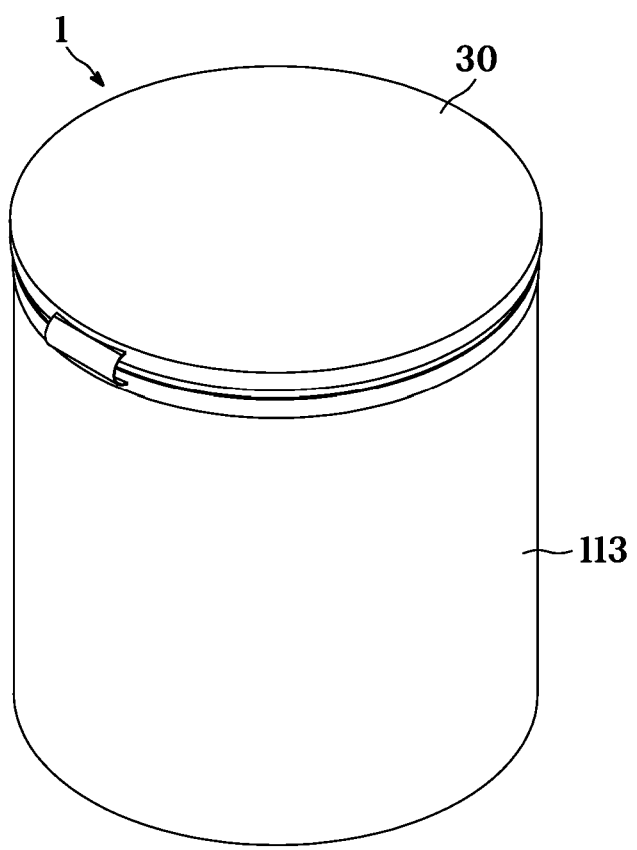
FIG. 5 is a perspective view of a containing apparatus or a contents moving apparatus including a dispensing device according to a second embodiment of the present invention.
Figure 6:
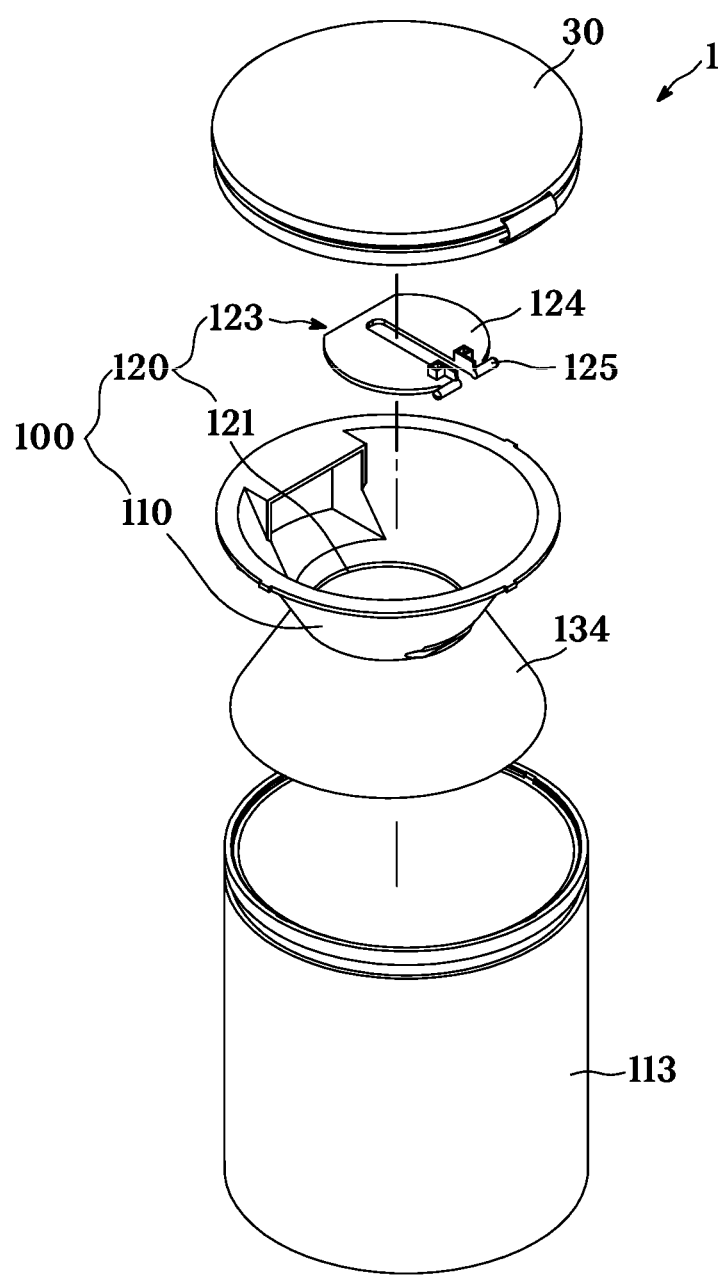
FIG. 6 is an exploded perspective view of the containing apparatus or the contents moving apparatus including the dispensing device according to the second embodiment of the present invention.

FIG. 5 is a perspective view of a containing apparatus or a contents moving apparatus including a dispensing device according to a second embodiment of the present invention, and FIG. 6 is an exploded perspective view of the containing apparatus or the contents moving apparatus including the dispensing device according to the second embodiment of the present invention.

Figure 7:
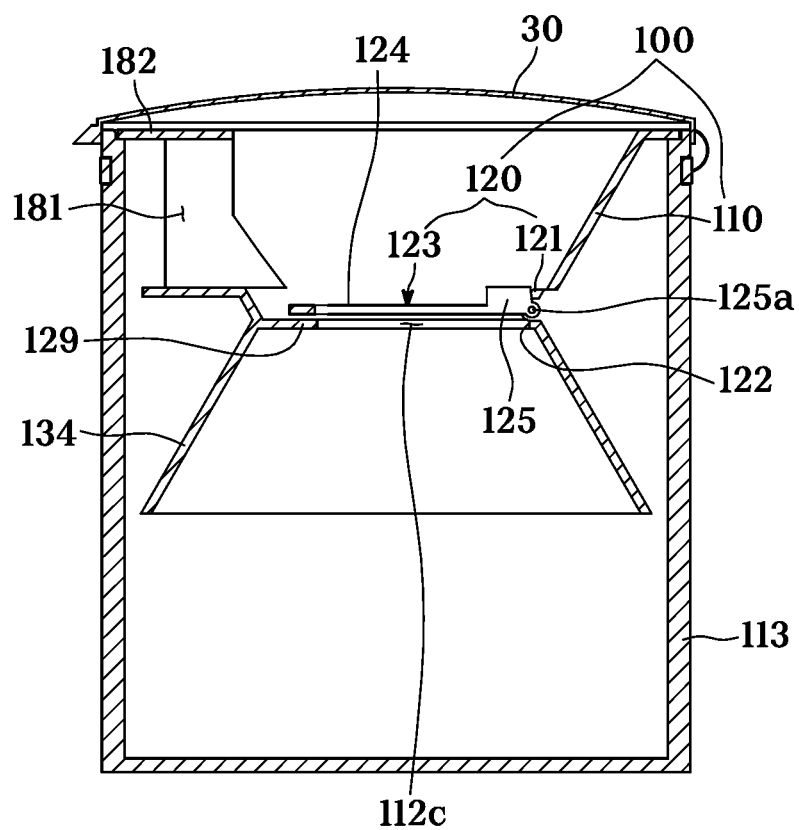
FIG. 7 is a cross-sectional view of the containing apparatus or the contents moving apparatus including the dispensing device according to the second embodiment of the present invention.
Figure 8:
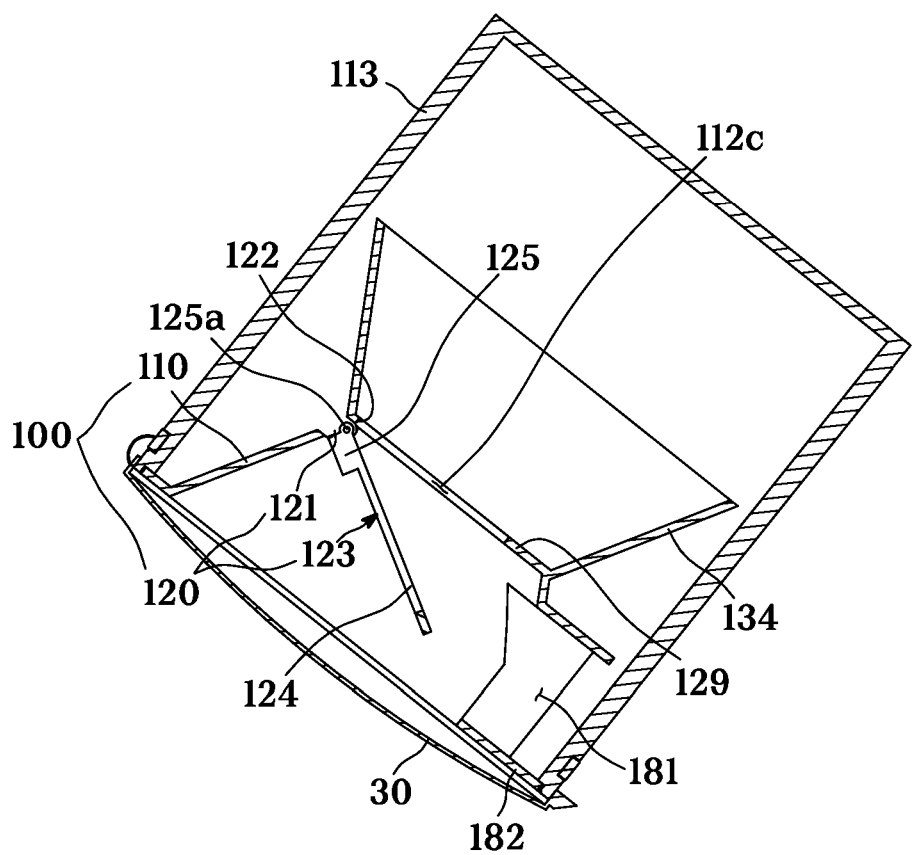
FIG. 8 is a cross-sectional view illustrating a use state of the containing apparatus or the contents moving apparatus including the dispensing device according to the second embodiment of the present invention.

FIG. 7 is a cross-sectional view of the containing apparatus or the contents moving apparatus including the dispensing device according to the second embodiment of the present invention, and FIG. 8 is a cross-sectional view illustrating a use state of the containing apparatus or the contents moving apparatus including the dispensing device according to the second embodiment of the present invention.

As in FIGS. 5 to 8, a contents moving apparatus or the containing apparatus 1 having a dispensing device 100 according to the second embodiment of the present invention includes the storing part 113, the housing 110, a receiving part 181, and the passing operation part 120.

Refer to the above description of the first embodiment for descriptions of the housing 110 and the storing part 113, the receiving part 181 and the passing operation part 120.

In the present embodiment, the housing 110 is formed in the storing part 113 located inside a main body of the contents moving apparatus or the containing apparatus.

The contents passing means 123 includes a fixing member 121, which is an inner wall of the housing 110, and the fixing member 121 forms the opening 122. A passing space 112c for guiding passage of contents is formed in the opening 122.

At least a portion of the fixing member 121 is formed as the inclined surface 134. Consequently, when the housing 110 is inclined, the contents move over the inclined surface 134 in the direction of gravity of the fixing member 121.

The contents that passed through the passing space 112c are contained in the receiving part 181. Particularly, a resistive upper plate member 182 is disposed at an edge of the contents passing side of the housing 110 so that a demand amount of the contents is received by the receiving part 181.

Further, to maintain a state in which the opening member 124 blocks the opening 122 while the housing 110 is upright, the stopper 129 is disposed at the other side inner surface of the fixing member 121 which corresponds to an inner surface of the opening 122.

Refer to the above description for description of undescribed reference numerals.

Figure 9:
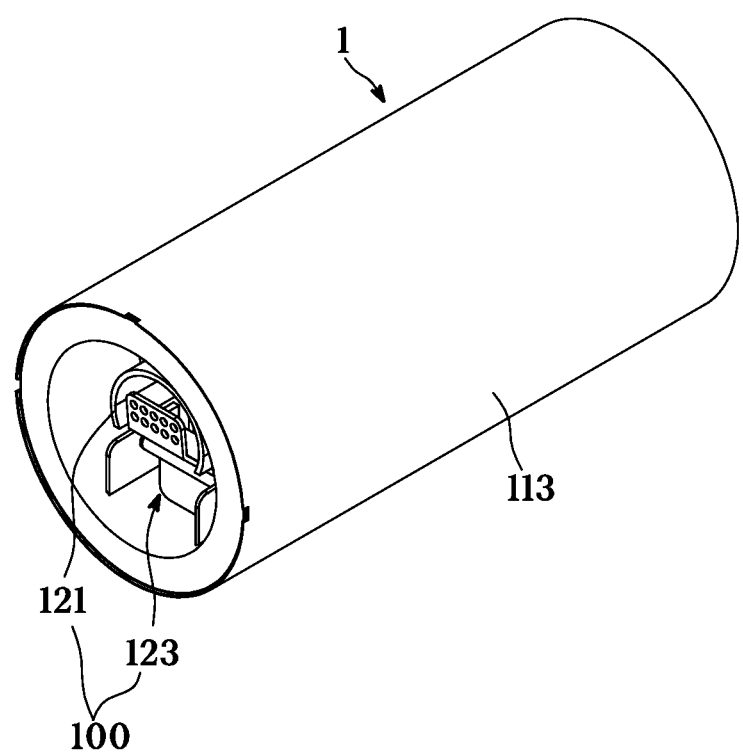
FIG. 9 is a perspective view of a containing apparatus or a contents moving apparatus including a valve according to a third embodiment of the present invention.
Figure 10:
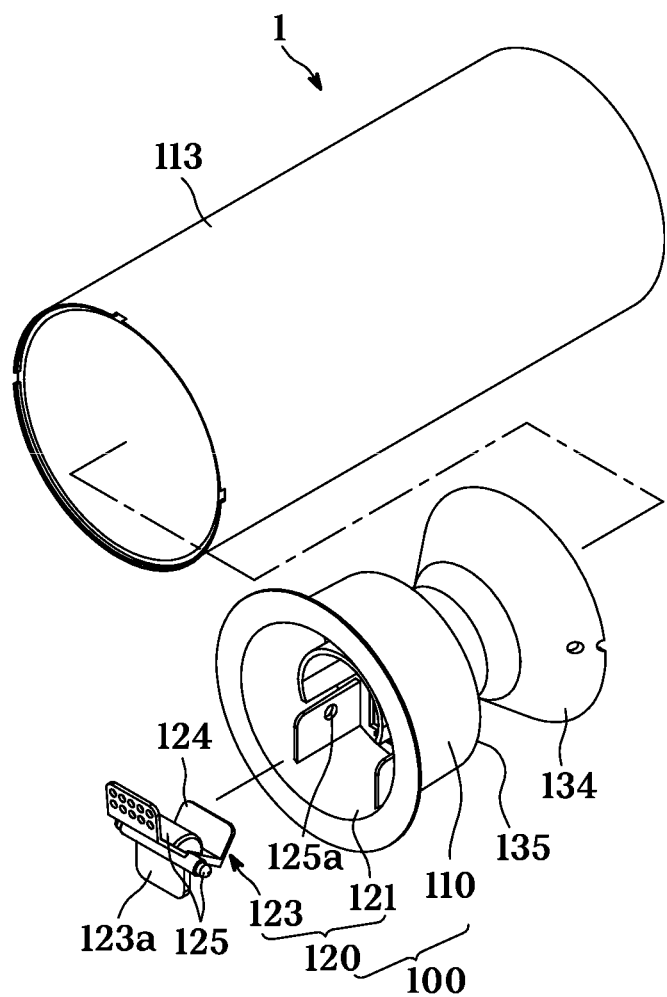
FIG. 10 is an exploded perspective view of the containing apparatus or the contents moving apparatus including the valve according to the third embodiment of the present invention.
Figure 11:
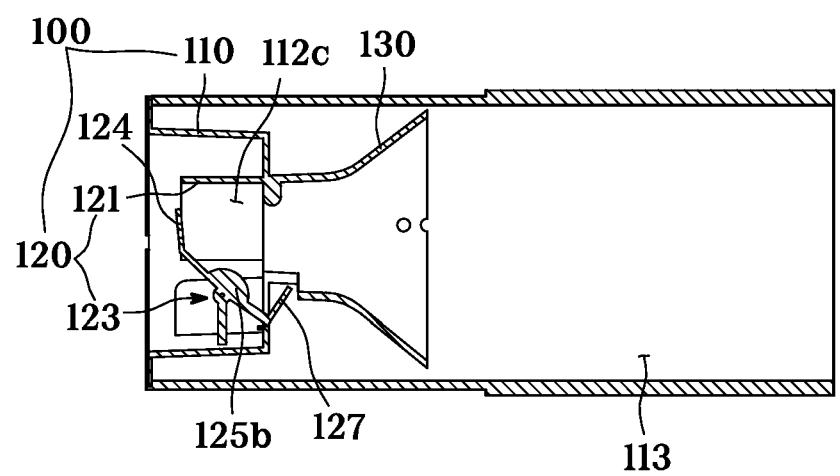
FIGS. 11 and 12 are cross-sectional views illustrating a use state of the containing apparatus or the contents moving apparatus including the valve according to the third embodiment of the present invention.
Figure 12:
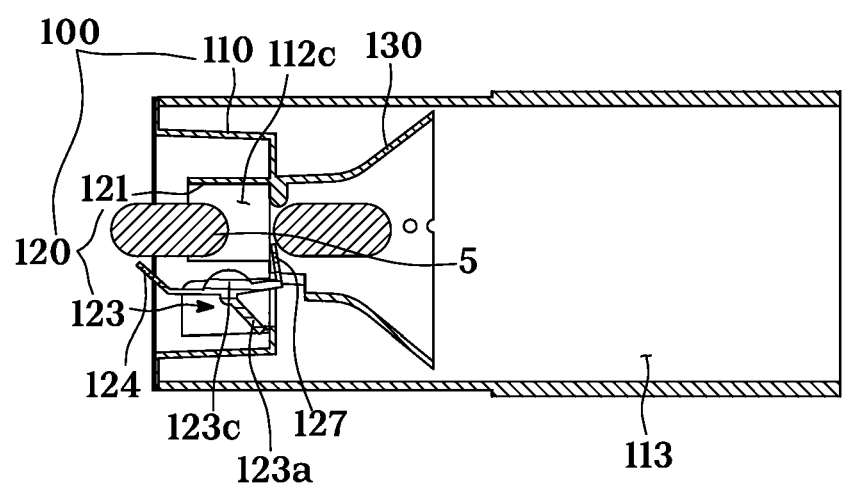

FIG. 9 is a perspective view of a containing apparatus or a contents moving apparatus including a valve according to a third embodiment of the present invention, FIG. 10 is an exploded perspective view of the containing apparatus or the contents moving apparatus including the valve according to the third embodiment of the present invention, and FIGS. 11 and 12 are cross-sectional views illustrating a use state of the containing apparatus or the contents moving apparatus including the valve according to the third embodiment of the present invention.

As in FIGS. 9 to 12, a valve 100 according to the third embodiment of the present invention may be embodied by being manufactured in a pipe shape by opening both sides of the storing part 113 in the first embodiment, the second embodiment, and a fifth embodiment below.

That is, the valve 100 is disposed in a contents moving apparatus 1 through which contents move or a contents moving apparatus or the containing apparatus 1 having the contents stored therein, and the contents passing means 123 controls movement of the contents in the contents moving apparatus 1.

Refer to the above description for descriptions of the housing 110 and the passing operation part 120.

Also, the valve 100 is a dispensing device disposed in the contents moving apparatus 110 through which the contents move and configured to guide passage of the contents and includes the passing operation part 120 configured to pass the contents.

Also, the passing operation part 120 includes the opening 122 communicating with a before-passing part 113 located before the contents pass the passing operation part 120, the passing operation part 120 includes the contents passing means 123 formed at the opening 122 to pass the contents, and the contents passing means 123 serves to control movement of the contents in the contents moving apparatus 110.

Further, the passing operation part 120 moves the contents via the opening 122 and allows the contents in the before-passing part 113 to move via the opening 122 due to deformation of the contents passing means 123.

The passing operation part 120 serves to prevent a demand amount of contents moved from the before-passing part 113, which is a space before passing through the contents passing means 123, to an after-passing space, which is a space after passing through the contents passing means 123, in the housing 110 from moving back to the contents before-passing part 113.

Contents passed via the valve 100 may be one or more of solid, powder, and liquid contents.

The contents moving apparatus 1 including the dispensing device may be a contents moving pipe.

Refer to the above description for undescribed reference numerals.

Figure 13:
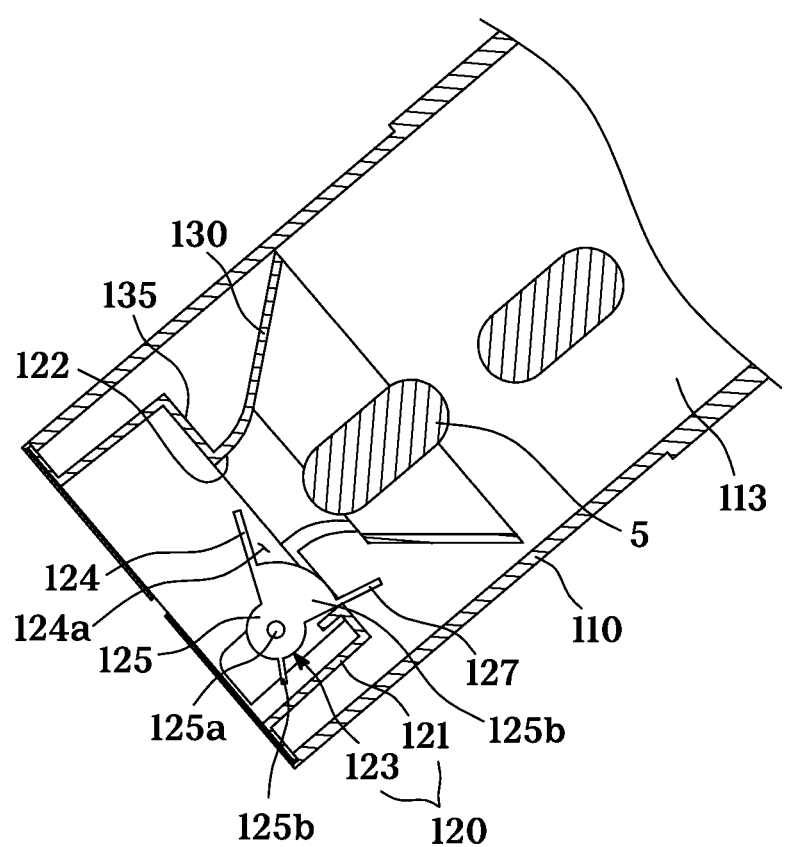
FIGS. 13 to 15 are cross-sectional views illustrating a use state of a containing apparatus or a contents moving apparatus including a dispensing device according to a fourth embodiment of the present invention.
Figure 14:
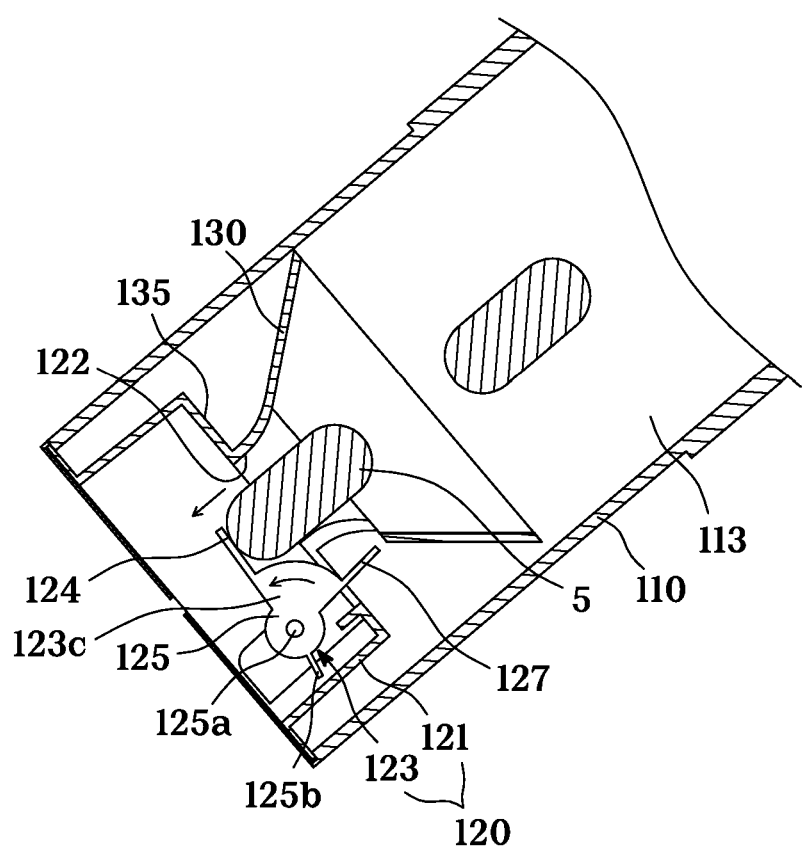
Figure 15:
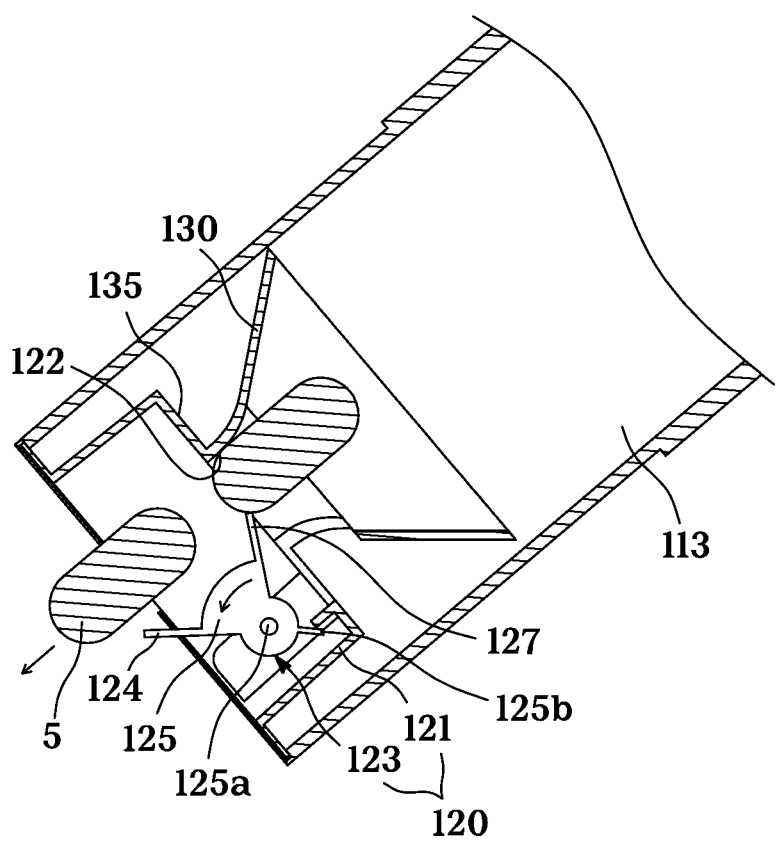

FIGS. 13 to 15 are cross-sectional views illustrating a use state of a containing apparatus or a contents moving apparatus including a dispensing device according to a fourth embodiment of the present invention.

As in FIGS. 13 to 15, a contents moving apparatus or the containing apparatus 1 having the dispensing device 100 according to the fourth embodiment of the present invention includes the storing part 113, the housing 110, and the passing operation part 120.

In the present embodiment, the housing 110 is formed in the storing part 113 located inside the main body of the contents moving apparatus or the containing apparatus.

The movement guide part 130 is disposed by extending from the housing 110, and the contents passing means 123 configured to allow a demand amount of the contents passing through the movement guide part 130 to pass therethrough is disposed. Here, the contents are contents, such as solid, powder, and liquid, capable of passing through the contents passing means 123.

Particularly, when the contents move in contact with an outer curved surface of a movement member 125 or an outer surface of the opening member 124 in a passing direction of the contents or an opposite direction of the passing direction, the contents move by being resisted in a circumferential outer direction of a movement fixing part 125a.

Here, passage of contents beyond a demand amount is prevented by an effective passing space of the opening 122 being narrowed due to movement of the contents in the circumferential outer direction of the movement fixing part 125a.

Further, because contents move by being pushed in an axial opposite direction along an outer surface, which is the curved surface of the movement member 125, an effective passing space through which other contents pass together is not present.

Here, a configuration of a protrusion formed by a curved surface or the like along the outer surface of the movement member 125 to reduce the effective passing space through which other contents pass together is a bottom-height changing member 147. The bottom-height changing member 147 serves to narrow a space of the opening 122, that is opened so that the contents pass therethough, by relatively lifting a height of a bottom of the movement member 125 with which the contents come into contact while passing.

Also, when a weight or a center of gravity of a passing movement part 140 including at least the opening member 124 or a balancing part 123b is tilted due to the housing provided with the passing operation part 120 being tilted, the shape of the passing movement part 140 may be formed or a constituent member of the passing movement part 140 may be coupled and formed so that rotation is not performed due to a self-weight of the passing movement part 140 before required contents come into contact with the opening member 124.

For this, rotation of the opening member 124 is restrained by weights or centers of gravity of two or more of the opening member 124, the blocking member 127, a movement control member 123*a*, the movement member 125, and a movement member protrusion 125*b* so that the blocking member 127 interlocked to the opening member 124 does not rotate before a demand amount of contents passes, and passage of the contents via the opening 122 is not blocked before the demand amount of the contents passes.

Here, by a force attempting to maintain balance using the center of gravity of the passing movement part 140 when the contents moving apparatus or the containing apparatus 1 is tilted, the passing movement part 140 exceeds a slope of the contents moving apparatus or the containing apparatus 1 and becomes a balancing part 123*b* which is not inclined any more. Particularly, for balance of the center of gravity of the passing movement part 140, the passing movement part 140 may include a separate movement control member 123*a*.

The movement control member 123*a* may prevent the opening member 124 from being inclined by a slope that exceeds the slope of the passing operation part 120, by a force attempting to maintain a center-of-gravity position in the direction of gravity by balancing weight by the center of gravity of the balancing part 123*b* by weights of the opening member 124 and the movement control member 123*a*, or the opening member 12, or a weight of a separate member moving together with the movement control member 123*a* and the opening member 124.

That is, when the passing operation part 120 is tilted together with the contents moving apparatus or the containing apparatus 1, because the balancing part 123*b* or the passing movement part 140 have a balanced weight by the center of gravity of the balancing part 123*b* or the passing movement part 140, the balancing part 123*b* or the passing movement part 140 is not tilted more than the tilt of the passing operation part 120, and a position and a slope thereof in the passing operation part 120 may be maintained.

Also, as in the drawings, when there is no separate opening-closing apparatus or cover or an opening-closing apparatus or a cover is open, a demand amount of contents in the main body of the contents moving apparatus or the containing apparatus may pass to the outside.

The contents moving apparatus or the containing apparatus 1 forms the storing part 113 and a receiving part 115.

The storing part 113 serves to hold and store a content 5. Also, the storing part 13 has one open side to be able to hold the content 5 or allow the content 5 to pass therethrough. Various shapes and various materials may be applied to the storing part 113.

Further, the receiving part 115 is formed at a withdrawal (extraction) side of the content 5 stored in the storing part 113. The storing part 113 and the receiving part 115 are divided on the basis of the passing operation part 120.

Also, the housing 110 includes the movement guide part 130 therein and includes the passing operation part 120 that allows a demand amount of the content 5 passing through the movement guide part 130 to pass therethrough.

The passing operation part 120 includes the fixing member 121 and the contents passing means 123.

The fixing member 121 is disposed at an inner surface of the housing 110. Thus, the fixing member 121 partitions the inside of the housing 110 into the storing part 113 and the receiving part 115.

Also, the fixing member 121 has the opening 122 formed therethrough. The opening 122 serves to allow withdrawal of the content 5 by connecting a standby containing part 115 of the housing 110 to the storing part 113.

Also, the contents passing means 123 serves to guide passage of a demand amount of the content 5 at a time via the opening 122. In the case of the present embodiment, the contents passing means 123 is disposed at an inside of the opening 122, which is an entire open space of an inner wall of the housing 110, to allow passage of a demand amount of the content 5 at a time by a self-weight or a pressing force of the content 5.

The contents passing means 123 includes the opening member 124, a passing compartment part 124*a*, the movement member 125, the movement fixing part 125*a*, the blocking member 127, and the stopper 129.

The opening member 124 is disposed along an inner surface or an edge of the opening 122. Also, in an initial state in which the contents moving apparatus or the containing apparatus 1 is upright, the opening member 124 closes the opening 122 to prevent arbitrary passage of the content 5 and introduction of foreign matter from the outside. Further, in a use state in which the contents moving apparatus or the containing apparatus 1 is lied down or is oppositely upright, the opening member 124 is tilted back by the self-weight or the pressing force of the content 5 so that the content 5 pass therethrough.

That is, each movement member 125 connected to the opening member 124 has one side rotatably connected to the movement fixing part 125*a*. Therefore, when the housing 110 is tilted or shaken for passage of the content 5, other sides of the opening members 24 are spaced apart from each other and a passing space is secured. Consequently, the content 5 passes therethrough from the storing part 113 of the housing 110.

Also, the blocking member 127 is interlocked to the opening member 124 and serves to close the opening 122 which is open.

When a single content 5 or a fixed amount of the content 5 passes through the contents passing means 123 due to opening of the opening member 124, a the blocking member 127 serves to block passage of a flowing content 5 via the contents passing means 123.

Here, the passing compartment part 124*a* is a space between the opening member 124 and the blocking member 127 and serves to allow entry of a set amount of the content 5 to pass or a single pill of the content 5.

Further, the stopper 129 extends from the movement member 125 to prevent further movement of the opening member 124 and maintain a state in which the blocking member 127 completely blocks the opening 122.

Also, the movement guide part 130 includes the separating plate 135. The separating plate 135 is disposed at the inside of the housing 110 to partition the storing part 113 of the contents moving apparatus or the containing apparatus 1 from a passing side of the content 5, and the passing passage part 139 extends between a passing entry side and a passing discharge side of the content 5.

The contents containing apparatus 1 having the dispensing device may be a container apparatus.

Refer to the above description for undescribed reference numerals.

Figure 16:
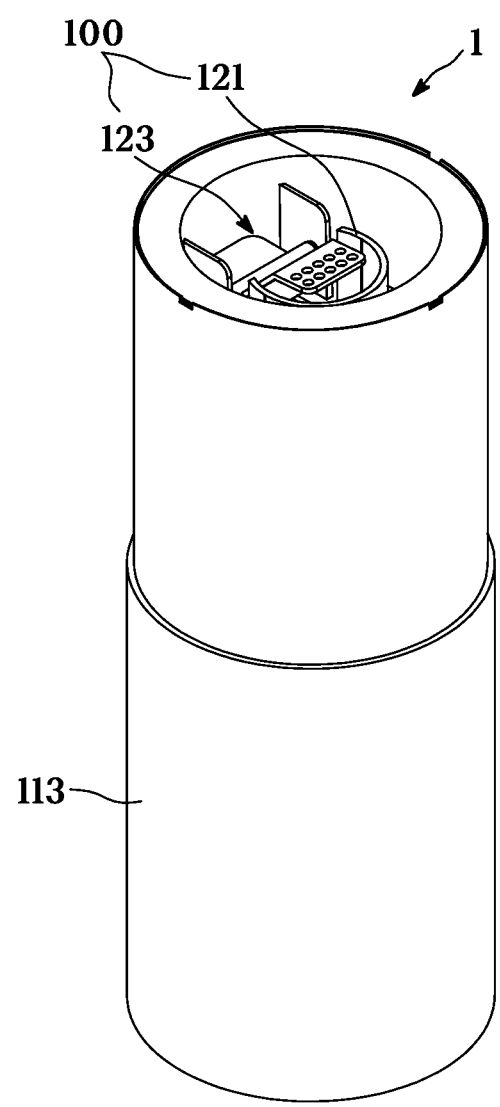
FIG. 16 is a perspective view of a containing apparatus or a contents moving apparatus including a dispensing device according to a fifth embodiment of the present invention.
Figure 17:
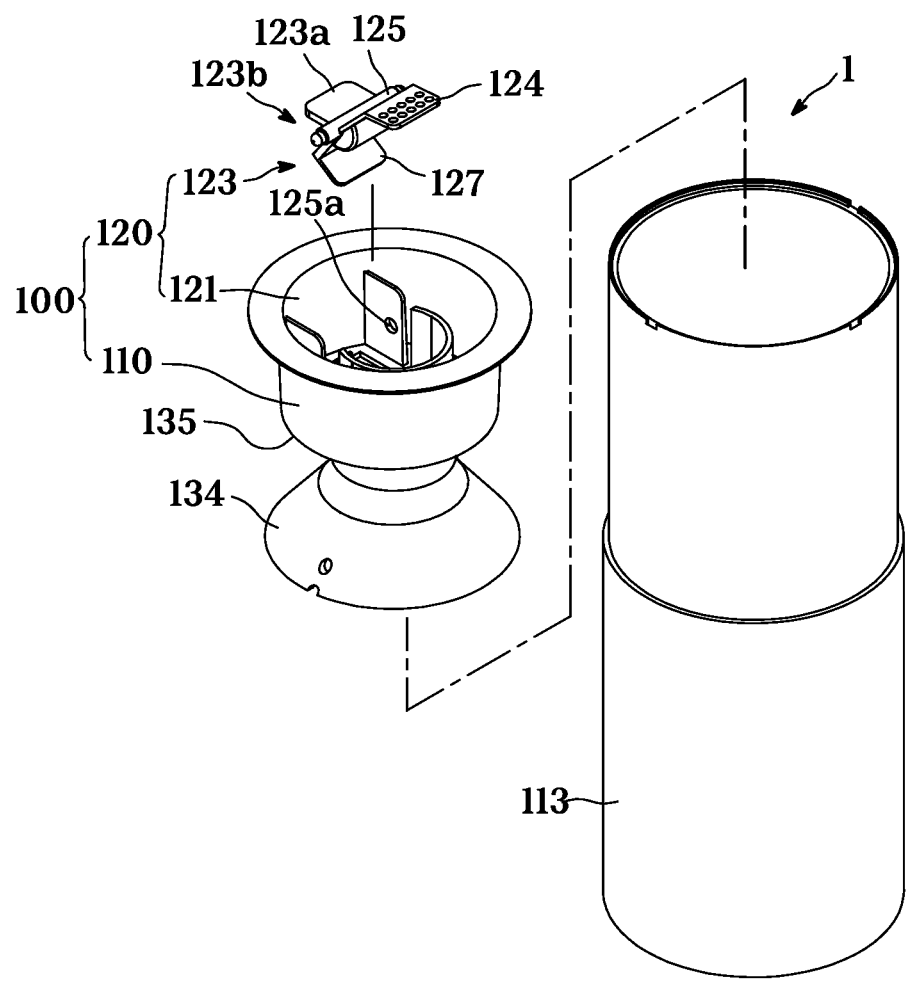
FIG. 17 is an exploded perspective view of the containing apparatus or the contents moving apparatus including the dispensing device according to the fifth embodiment of the present invention.
Figure 18:
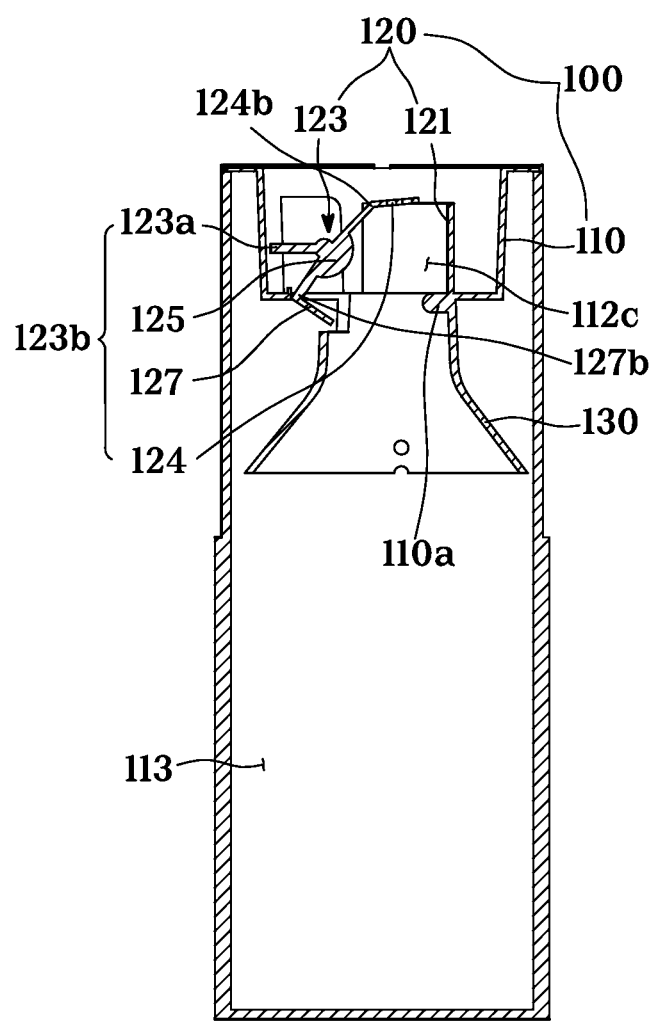
FIG. 18 is a cross-sectional view of the containing apparatus or the contents moving apparatus including the dispensing device according to the fifth embodiment of the present invention.

FIG. 16 is a perspective view of a containing apparatus or a contents moving apparatus including a dispensing device according to the fifth embodiment of the present invention, FIG. 17 is an exploded perspective view of the containing apparatus or the contents moving apparatus including the dispensing device according to the fifth embodiment of the present invention, and FIG. 18 is a cross-sectional view of the containing apparatus or the contents moving apparatus including the dispensing device according to the fifth embodiment of the present invention.

Figure 19:
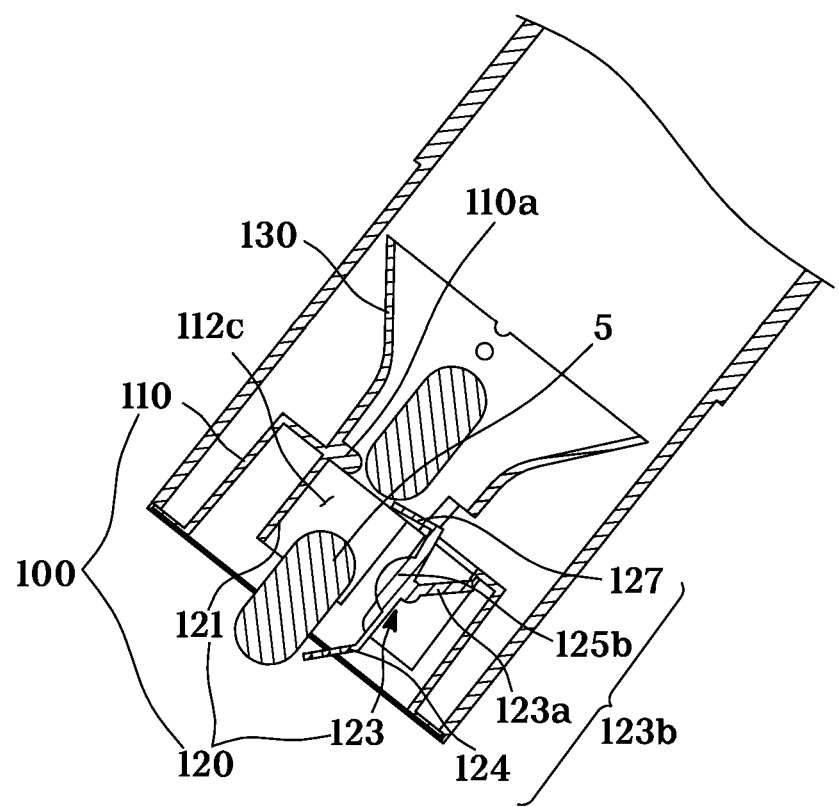
FIGS. 19 and 20 are cross-sectional views illustrating a use state of the containing apparatus or the contents moving apparatus including the dispensing device according to the fifth embodiment of the present invention.
Figure 20:
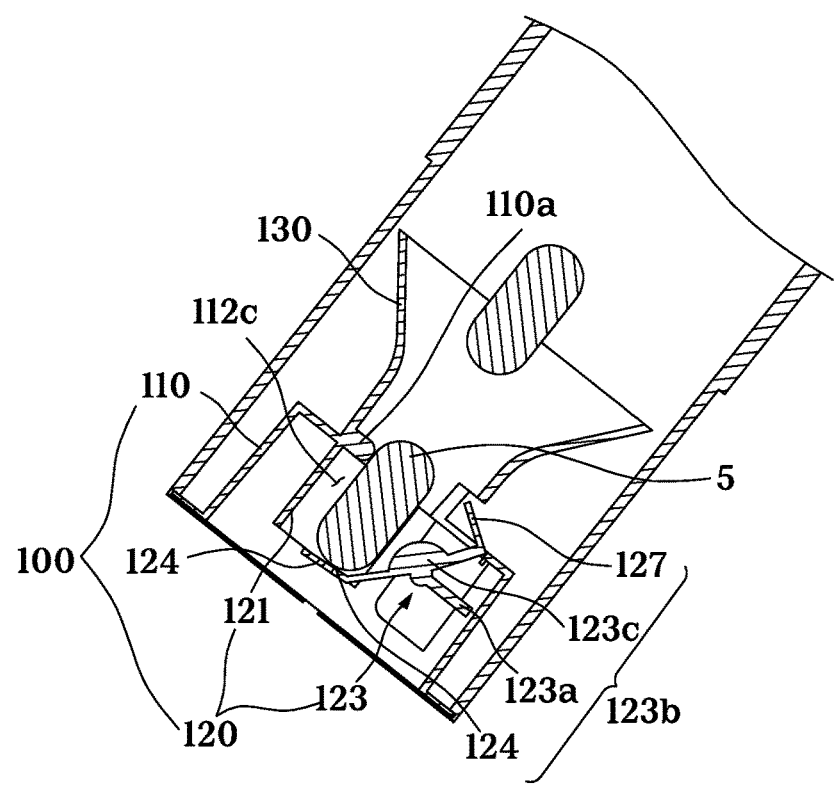

FIGS. 19 and 20 are cross-sectional views illustrating a use state of the containing apparatus or the contents moving apparatus including the dispensing device according to the fifth embodiment of the present invention.

As in FIGS. 16 to 20, a contents moving apparatus or the containing apparatus 1 having the dispensing device 100 according to the fifth embodiment of the present invention includes the storing part 113, the housing 110, and the passing operation part 120.

Refer to above description for descriptions of the housing 110, the storing part 113, and the passing operation part 120.

Also, the opening member 124 may be bent, and an opening member bending part at which the opening member 124 is bent may be linearly broken or formed as a curved surface.

The opening member 124 may be bent by an angle equal to or larger than a right angle to secure a space between the opening member 124 and the blocking member 127, when the contents is in a long form, a demand amount of the content 5 that entered the space between the opening member 124 and the blocking member 127 in a longitudinal direction may push the opening member 124 so that the opening member 124 moves together with the blocking member 127.

Here, the blocking member 127, that moves, does not interfere with the demand amount of the content 5 pushing the opening member 124, and the blocking member 127 blocks excess contents when the content 5 beyond the demand amount enters the passing operation part 120. Here, the content is solid, powder, or liquid content whose passage through the content passing means 123 can be partially or entirely resisted by the blocking member 127.

When the blocking member 127 is include as in the present embodiment, a user can immediately acquire a demand amount of the content 5 by hand or other receiving apparatus just by a single operation of passing the content. This is possible by the blocking member 127 automatically blocking passage of the content beyond the demand amount.

Particularly, in a case of a general contents moving apparatus or the containing apparatus 1 for storing medicine such as a rectangular pill, there is no space for a user to insert two fingers to pick up pills, which are contents, with fingers because an opening is narrow. Here, by the contents moving apparatus or the containing apparatus 1 as in the present embodiment, a demand amount of contents can be effectively obtained just by tilting or shaking the contents moving apparatus, the containing apparatus 1, or the passing operation part 120 without a separate device such as an opening-closing apparatus or a cover.

An angle of an opening member bending part 124b at which the opening member 124 is bent may be gentle to facilitate passage of contents to the outside of the contents moving apparatus or the containing apparatus. Bending by various other angles is also possible.

The blocking member 127 may be bent, and a blocking member bending part 127b of the blocking member 127 may be linearly broken or formed as a curved surface.

An angle of the blocking member bending part 127b at which the blocking member 127 is bent may be steep and be close to the right angle so that contents beyond a demand amount cannot enter the passing operation part 120. Bending by various other angles is also possible.

The balancing part 123b configured to control movement of the contents passing means 123 due to the self-weight of the contents passing means 123 is included, the balancing part 123b include one or more of the movement control member 123a, the opening member 124, the blocking member 127, and the movement member 125, a center of gravity of the entire balancing part 123b is determined by weights and positions of one or more of the movement control member 123a, the opening member 124, the blocking member 127, and the movement member 125, and movement due to the self-weight of the contents passing means 123 occurs in this way.

The movement control member 123a may control one or more of a movement distance and a movement angle of the opening member 124.

When the contents moving apparatus, the containing apparatus 1, or the passing operation part 120 is upright or tilted, the movement control member 123a may control the blocking member 127 to not block passage of a demand amount of the content 5 by rotation due to a self-weight of the opening member 124 or a member moving together with the opening member 124 before the demand amount of the content 5 push the opening member 124.

By corresponding to a weight of the opening member 124 or a weight of one or more members moving together with the opening member 124, the movement control member 123a is configured to have a weight and a position for controlling movement due to a self-weight of the passing movement part 140 or the balancing part 123b including the opening member 12.

When the contents moving apparatus, the containing apparatus 1, or the passing operation part 120 is tilted, by weights of the opening member 124 and the movement control member 123a, the opening member 124, or a weight of a separate member rotating together with the movement control member 123a and the opening member 124, weight balancing may be performed by the center of gravity of the passing movement part 140 or the balancing part 123b, and the movement control member 123a may maintain a position of the opening member 124. A single movement control member 123a or a plurality of movement control members 123a may be provided at the balancing part 123b, and the movement control member 123a may have various shapes.

Further, when the contents moving apparatus, the containing apparatus 1, or the passing operation part 120 is upright or tilted, weights are balanced between a constituent member of the balancing part 123b including the opening member 124 and the movement control member 123a, and the balancing part 123b may maintain its posture or position in the direction of gravity.

The movement control member 123a serves to maintain balance of the balancing part 123b when a container is tilted and serves to maintain balance so that rotation is suppressed to occur or decrease.

The balancing part 123b may further include a movement increase control member 123c which is, unlike the movement control member 123a, configured to break balance in a moving direction of the balancing part 123b and increase movement force of the balancing part 123b when the contents come into contact with the opening member 124, the weight of the contents are transmitted to the opening member 124, and movement of the balancing part 123b is performed.

By adjusting a center of gravity using the movement control member 123a, an initial state position due to the self-weight of the balancing part 123b, such as when the contents moving apparatus or the containing apparatus 1 is upright as in an initial state before tilting, may allow the blocking member 127 to block or open the opening 122.

The blocking member 127 may be a separate member moving together with the opening member 12, or when the movement control member 123*a* is not included, the blocking member 127 may serve as the movement control member 123*a*.

A resistive member 110*a* disposed in the passing operation part 120 is included, and the resistive member 110*a* limits passage of contents passing through an inside of the passing operation part 120.

The resistive member 110*a* disposed in the passing operation part 120 may be included, the resistive member 110*a* may limit passage of contents passing through the inside of the passing operation part 120, and the resistive member 110*a* may resist passage of the contents in conjunction with the blocking member 127.

The resistive member 110*a* may protrude inward in the passing operation part 120 so that entry of contents beyond a demand amount is difficult. Also, the resistive member 110*a* may more effectively block entry of contents beyond the demand amount in conjunction with the blocking member 127 that moves.

The contents moving apparatus or the containing apparatus 1 having the dispensing device may be a container apparatus.

Refer to the above description for undescribed reference numerals.

Figure 21:
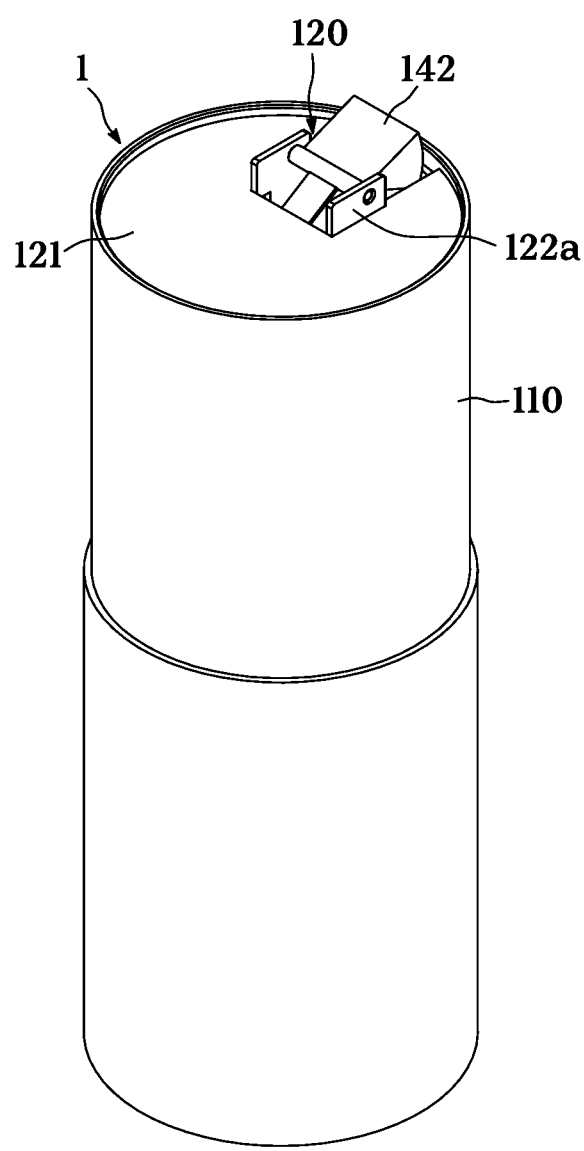
FIG. 21 is a perspective view of a containing apparatus or a contents moving apparatus including a dispensing device according to a sixth embodiment of the present invention.
Figure 22:
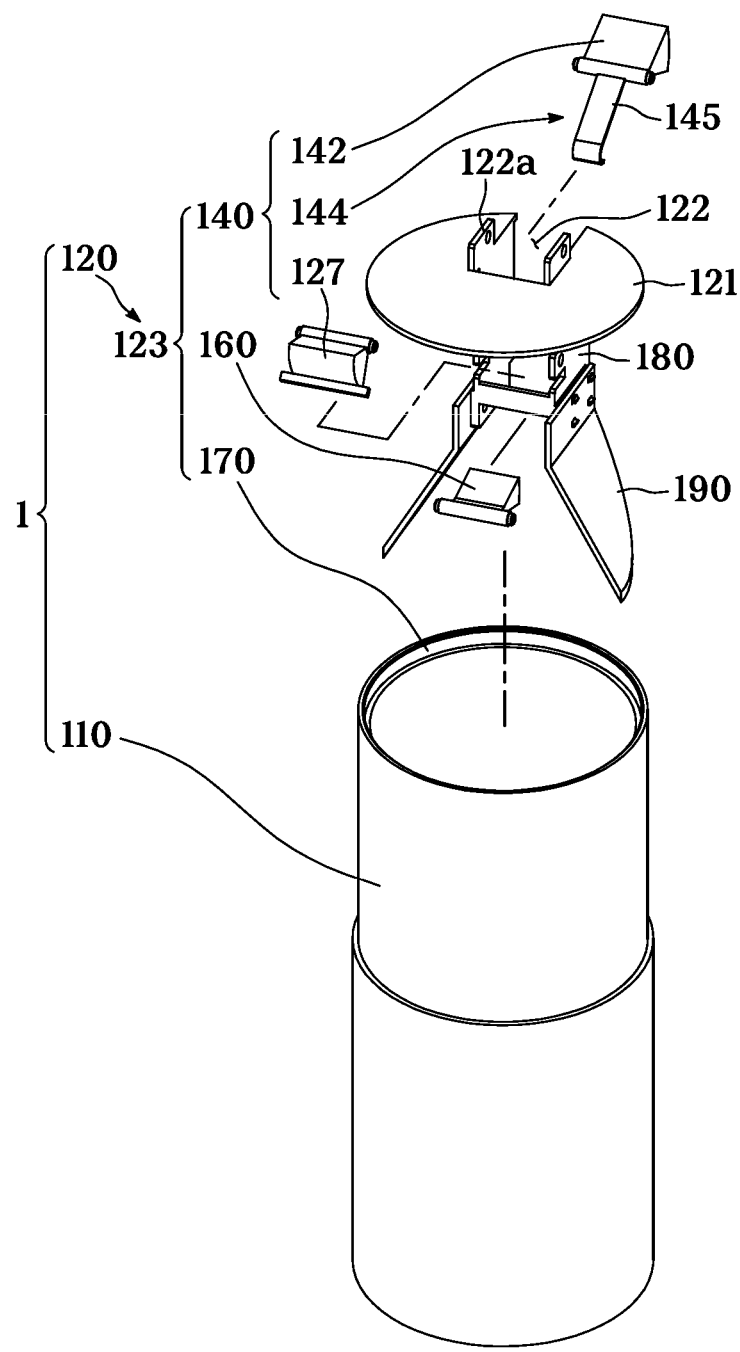
FIG. 22 is an exploded perspective view of the containing apparatus or the contents moving apparatus including the dispensing device according to the sixth embodiment of the present invention.
Figure 23:
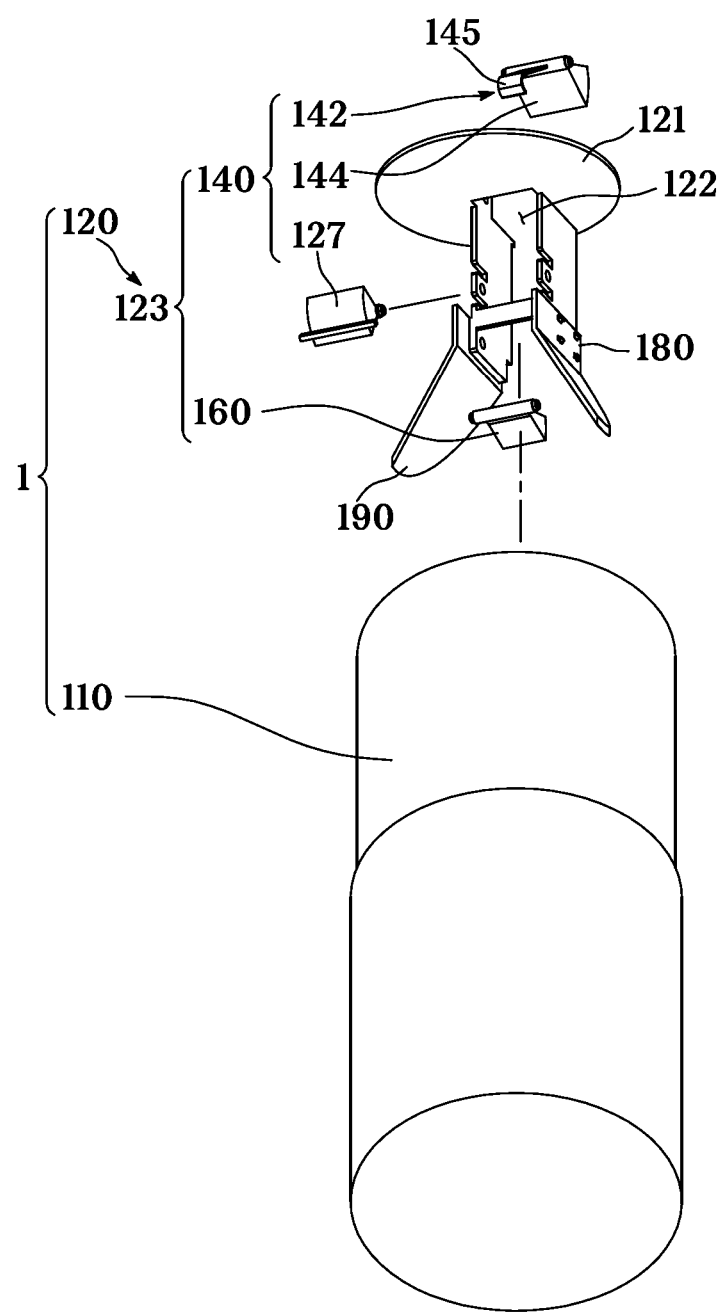
FIG. 23 is a bottom exploded perspective view of the containing apparatus or the contents moving apparatus including the dispensing device according to the sixth embodiment of the present invention.

FIG. 21 is a perspective view of a containing apparatus or a contents moving apparatus including a dispensing device according to a sixth embodiment of the present invention, FIG. 22 is an exploded perspective view of the containing apparatus or the contents moving apparatus including the dispensing device according to the sixth embodiment of the present invention, and FIG. 23 is a bottom exploded perspective view of the containing apparatus or the contents moving apparatus including the dispensing device according to the sixth embodiment of the present invention.

Figure 24:
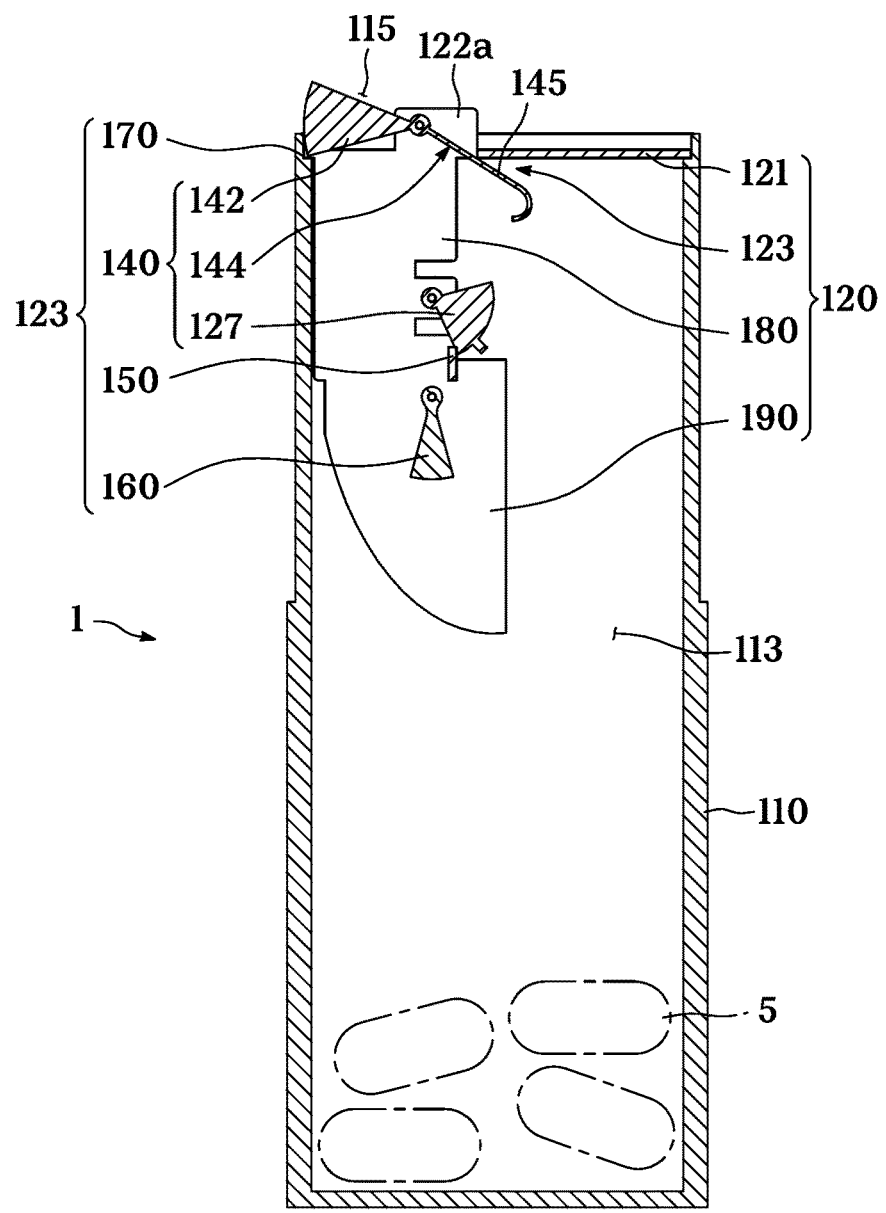
FIG. 24 is a cross-sectional view of the containing apparatus or the contents moving apparatus including the dispensing device according to the sixth embodiment of the present invention.
Figure 25:
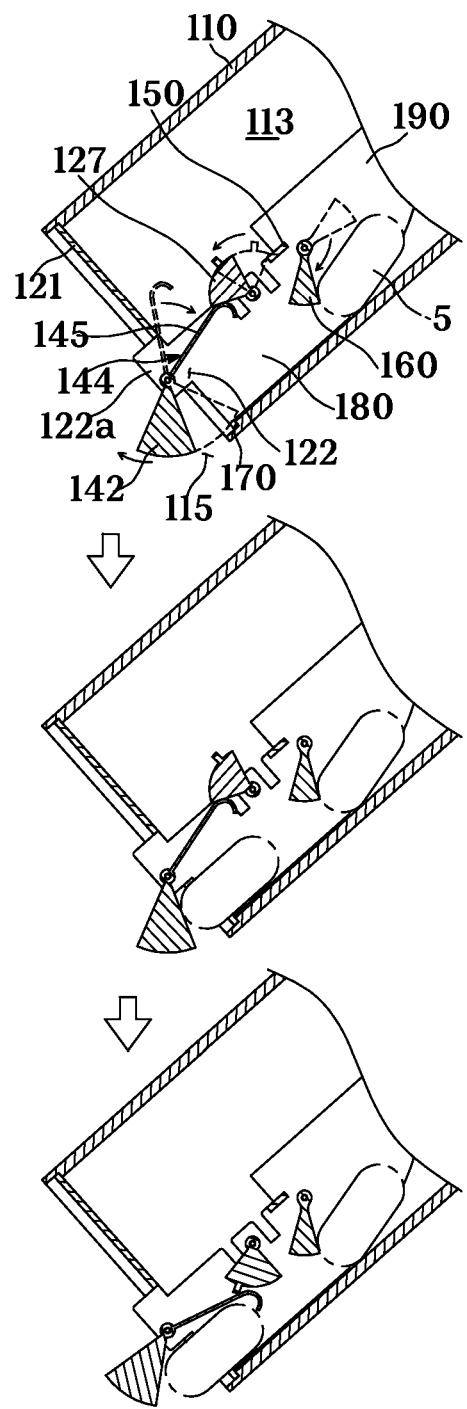
FIG. 25 is a cross-sectional view illustrating a use state of the containing apparatus or the contents moving apparatus including the dispensing device according to the sixth embodiment of the present invention.

FIG. 24 is a cross-sectional view of the containing apparatus or the contents moving apparatus including the dispensing device according to the sixth embodiment of the present invention, and FIG. 25 is a cross-sectional view illustrating a use state of the containing apparatus or the contents moving apparatus including the dispensing device according to the sixth embodiment of the present invention.

As illustrated in FIGS. 21 to 25, a contents moving apparatus or the containing apparatus 1 having a dispensing device according to the sixth embodiment includes the housing 110 and the passing operation part 120.

Also, the housing 110 is divided into the storing part 113 and the receiving part 115 on the basis of the passing operation part 120. For convenience, the receiving part 115 is assumed as being outside of an open side of the contents moving apparatus or the containing apparatus 1.

The storing part 113 refers to an inner space of the housing 110 for holding and storing the content 5 such as a pill.

Also, the receiving part 115 refers to one side of the housing 110 which is open so that the content 5 can be inserted and pass therethrough.

Various shapes and various materials may be applied to the storing part 113 an the receiving part 115.

Particularly, the housing 110 may be separably coupled to the passing side of the content 5 of the storing part 113 or be integrally provided with the storing part 113. An outer shape of the housing 110 may be formed in various ways, and various materials may be applied thereto.

Further, the housing 110 forms the passing operation part 120 therein.

The passing operation part 120 is disposed in the housing 110 to guide movement of a fixed amount or a demand amount of the content 5 held in the storing part 113 at a time. Here, "fixed amount" refers to the amount or the number moving differently from each other within the same number or amount and an error range. "Demand amount" is an amount (number) required by a user and belongs to the range of "fixed amount."

Although not illustrated, the housing may have a cover disposed at an upper side. The cover receives the content 5 moving via the passing operation part 120.

Also, the passing operation part 120 allows movement of the content 5 by deformation of the contents passing means 123 that occurs due to tilting or shaking of the housing 110 or the passing operation part 120, and includes the fixing member 121, the contents passing means 123, a movement guide part 180, and a guide member 190.

The fixing member 121 is disposed at the inside of the housing 110. Here, a position at which the fixing member 121 is formed in the housing 110 is not limited.

Also, the fixing member 121 has the opening 122 formed therethrough. The opening 122 serves to allow withdrawal of the content 5 by connecting the receiving part 115 of the housing 110 to the storing part 113. Here, the number and a diameter of the opening 122 is not limited. That is, the passing operation part 120 forms the opening 122 communicating with the storing part 113, which is a space before the content 5 passes through the passing operation part 120.

Particularly, the opening 122 may have various shapes such as a circular shape and a polygonal shape on a plane and may be applied as a hole.

Also, the fixing member 121 may be integrally configured with the housing 110, integrally manufactured inside the housing 110, or separably coupled to the housing 110. Further, the fixing member 121 may be changed to have various other shapes.

When a separate fixing member 121 attached to or protruding from the housing 110 is not present, an inner wall of the housing 110 may form the fixing member 121, and the opening 122 may be formed in an inner space of the housing 110.

The contents passing means 123 serves to guide passage of a demand amount of the content 5 via the opening 122. That is, the contents passing means 123 serves to pass a demand amount or a fixed amount of the content 5 by coming into contact with the opening 122.

Also, the movement guide part 180 extends toward the storing part 113 from the inner surface of the housing 110 or the fixing member 121. For convenience, the movement guide part 180 is illustrated as extending from the fixing member 121 toward the storing part 113. Here, the movement guide part 180 extends from the fixing member 121 corresponding to the edge of the opening 122.

Therefore, when the housing 110 or the passing operation part 120 is tilted, the movement guide part 180 serves to intensively guide movement of the content 5 to the opening 122. Particularly, while the movement guide part 180 is tilted, the content 5 moves by being guided along a surface of the movement guide part 180 by a self-weight or inertia.

Particularly, although the movement guide part 180 may be a guide member connected to the housing 110, the movement guide part 180 may also be an inner surface itself of the housing 110.

Further, the movement guide part 180 may have the shape of a pair of plates to allow the content 5 of the storing part 113 to intensively move to the opening 122 along a wall surface of the housing 110, or may have the shape of a duct extending from the fixing member 121 along the edge of the opening 122. For convenience, the movement guide part 180 is illustrated as a pair of plates parallel to each other. The movement guide part 180 may be changed to have various other shapes.

Also, the guide member 190 extends from the movement guide part 180 toward a bottom surface of the housing 110 to allow the content 5 of the storing part 113 to be concentrated to the movement guide part 180. Particularly, the guide member 190 may extend to gradually be spaced apart from an edge or an end of the movement guide part 180. The guide member 190 may be formed in various other shapes.

Further, the movement guide part 180 and the guide member 190 may be integrally manufactured.

The contents passing means 123 serves to move a single content 5 (one pill) or a set amount of the content 5 at a time toward the receiving part 115 and is disposed at the inside of the opening 122 and the movement guide part 180.

Here, the contents passing means 123 includes the passing movement part 140, a support member 150, a delaying member 160, and a closure support member 170.

The passing movement part 140 is rotatably disposed at the fixing member 121 corresponding to the inner surface of the opening 122, allows withdrawal of the content 5 by opening the opening 122, and blocks withdrawal of the content 5 by blocking the opening 122.

Particularly, the passing movement part 140 moves due to one or more of tilting of the housing 110 or the passing operation part 120, a self-weight, a self-weight of the content 5, and a pressing force and inertia of the content 5. That is, when the housing 110 or the passing operation part 120 is tilted or is oppositely stood upright, the passing movement part 140 moves due to the self-weight and the pressing force of the content 5 to be withdrawn and opens the opening 122.

Also, the passing movement part 140 includes an opening member 142, a passing maintenance part 144, and the blocking member 127.

Particularly, the opening member 124 serves to open the opening 122, and a single opening member 142 or a plurality of opening members 142 may be provided.

The opening member 142 serves to open or close the opening 122 by a self-weight and a pressing force of the content 5.

Particularly, when the housing 110 or the passing operation part 120 is tilted, the passing movement part 140 prevents opening of the opening 122 by a center of gravity or only by a self-weight to an extent that the content 5 can pass therethrough. Accordingly, before the content 5 resists the passing movement part 140 and opens the opening 122, the passing movement part 140 prevents the opening 122 from opening to the extent that the content 5 can pass therethrough.

That is, the opening member 142 moves in the same direction as the content 5 passing through the opening 122 and serves to allow passage of the content 5.

Here, a bracket 122a extends in the fixing member 121 so that the opening member 142 is easily separably assembled to the fixing member 121. The opening member 142 and the bracket 122a may be changed to have various other shapes. Particularly, the opening member 142 is formed so that movement responsiveness is rapid when the housing 110 or the passing operation part 120 is stood upright or tilted.

Also, the passing maintenance part 144 is operated to maintain a state in which the opening member 142 opens the opening 122 through which the content 5 pass. This is to allow a single content 5 or a set amount of the content 5 to pass via the opening 122 at a time.

In other words, the passing maintenance part 144 serves to restrain a state in which the opening member 142 opens the opening 122.

The passing maintenance part 144 extends from the opening member 142. Therefore, the opening member 142 and the passing maintenance part 144 move in the same direction with respect to a portion pivoted to the bracket 122a. That is, the opening 122 is opened as the opening member 142 and the passing maintenance part 144 move in one direction. Conversely, the opening 122 is closed as the opening member 142 and the passing maintenance part 144 move in the other direction.

Here, the passing maintenance part 144 includes a restraining member 145. The restraining member 145 extends from the opening member 142 and moves in the same direction as the opening member 142.

Particularly, as the restraining member 145 is locked to an inside of the fixing member 121, movement of the opening member 142 in an opposite direction of the withdrawal of the content 5 is prevented even when the housing 110 is stood upright.

That is, the restraining member 145 is locked to the inside of the housing 110 when the housing 110 is stood upright to maintain a state in which the blocking member 127 closes the opening 122.

Also, the blocking member 127 moves separately from the opening member 142 in an opposite direction of the opening member 142 and serves to close the opening 122 so that the content 5 cannot pass therethrough or only a portion of the content 5 can pass therethrough.

That is, the blocking member 127 is movably disposed in the movement guide part 180, and a center of gravity of the blocking member 127 is set so that the blocking member 127 moves in the opposite direction of the opening member 142 when the housing 110 or the passing operation part 120 is tilted.

Specifically, when the housing 110 or the passing operation part 120 is tilted, in conjunction with movement of the opening member 142 and the restraining member 145 of the passing maintenance part 144, the blocking member 127 moves in the other direction. Therefore, the opening 122 is opened, and the blocking member 127 presses the restraining member 145. Consequently, the opening member 142 maintains a state in which the opening 122 is open.

Conversely, when the housing 110 is stood upright as an initial state, in conjunction with the blocking member 127 moving in one direction, the opening member 142 and the restraining member 145 move in the other direction. Therefore, the opening 122 is closed as the restraining member 145 which is unbound from blocking member 127 and the opening member 142 move in the other direction. Here, the restraining member 145 and the opening member 142 move in the other direction until the restraining member 145 comes into contact with the fixing member 121 and the opening member 142 blocks the opening 122.

The blocking member 127 may be changed to have various other shapes.

Particularly, the blocking member 127 should be initialized to move in the other direction in conjunction with rotation of the restraining member 145 in one direction.

Therefore, the contents passing means 123 includes the support member 150. The support member 150 serves to control a rotating direction of the blocking member 127.

That is, the support member 150 protrudes from an inner surface of the movement guide part 180 and supports the blocking member 127 to maintain an initial state of the blocking member 127 so that responsiveness of blocking the content 5 by movement is improved when the housing 110 or the passing operation part 120 is tilted for passage of the content 5. The support member 150 may be changed to have various other shapes.

Also, the delaying member 160 included in the contents passing means 123 is movably disposed inside the movement guide part 180. Here, the delaying member 160 is disposed in the movement guide part 180 to move in the same direction as the opening member 142 and serves to delay a time at which a content 5 that moves after a content 5 passes through the opening member 142 of the contents passing means 123. That is, when a leading content 5 passes through the opening member 142, movement of a following content 5 is delayed due to being resisted by the delaying member 160. Therefore, a single content 5 or a fixed amount of the content 5 can be withdrawn at a time.

Here, the delaying member 160 is installed at the inner surface of the movement guide part 180 to move the content 5 while delaying movement of a following content 5. The delaying member 160 may be changed to have various other shapes.

Also, a closure support member 170 included in the contents passing means 123 supports the opening member 142 to maintain a state in which the opening member 142 blocks the opening 122. Although the closure support member 170 may be separately disposed unlike the blocking member 127, the closure support member 170 is illustrated as being identical to the blocking member 127 for convenience.

Hereinafter, an effect of the contents moving apparatus or the containing apparatus having the dispensing device according to the sixth embodiment of the present invention will be described.

When a user changes the contents moving apparatus, the containing apparatus 1, or the passing operation part 120, which are in initial states, to be in a use state by tilting the contents moving apparatus, the containing apparatus 1, or the passing operation part 120 or making the contents moving apparatus, the containing apparatus 1, or the passing operation part 120 to stand upright, the opening member 142 moves in one direction due to a self-weight and a pushing force of the content 5, and the restraining member 145 moves in one direction as the opening member 142. The blocking member 127 is moves in the other direction, which is an opposite direction of the opening member 142. Here, the restraining member 145 presses the blocking member 127 to prevent the blocking member 127 from being restored to an initial position. Therefore, the opening member 142 maintains a state of opening the opening 122. Accordingly, the leading content 5 pressing the opening member 142 is withdrawn.

Particularly, the delaying member 160 moves in the same direction as the opening member 142 and serves to decrease a movement speed of the following content 5.

Here, "initial state" is a state in which the contents moving apparatus or the containing apparatus 1 are stood upright in a forward direction and is a state in which, by the restraining member 145 being locked in contact with the inside of the fixing member 121, the opening member 142 blocks the opening 122, the blocking member 127 is supported by the support member 150, and the delaying member 160 faces the storing part 113 due to a self-weight.

When a user restores the contents moving apparatus or the containing apparatus 1 to stand upright in the forward direction, the opening member 142 moves in the other direction due to a self-weight, the restraining member 145 moves in the other direction as the opening member 142, and the blocking member 127 moves in one direction, which is the opposite direction of the opening member 142, thereby being initialized.

Refer to the above description for undescribed reference numerals.

Figure 26:
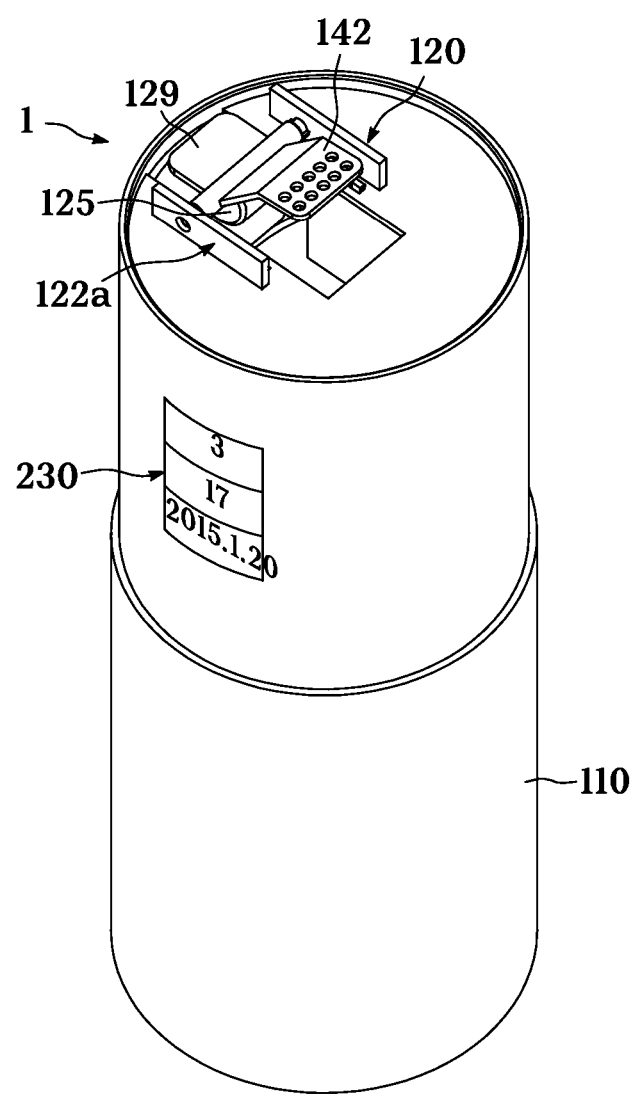
FIG. 26 is a perspective view of a containing apparatus or a contents moving apparatus including a dispensing device according to a seventh embodiment of the present invention.
Figure 27:
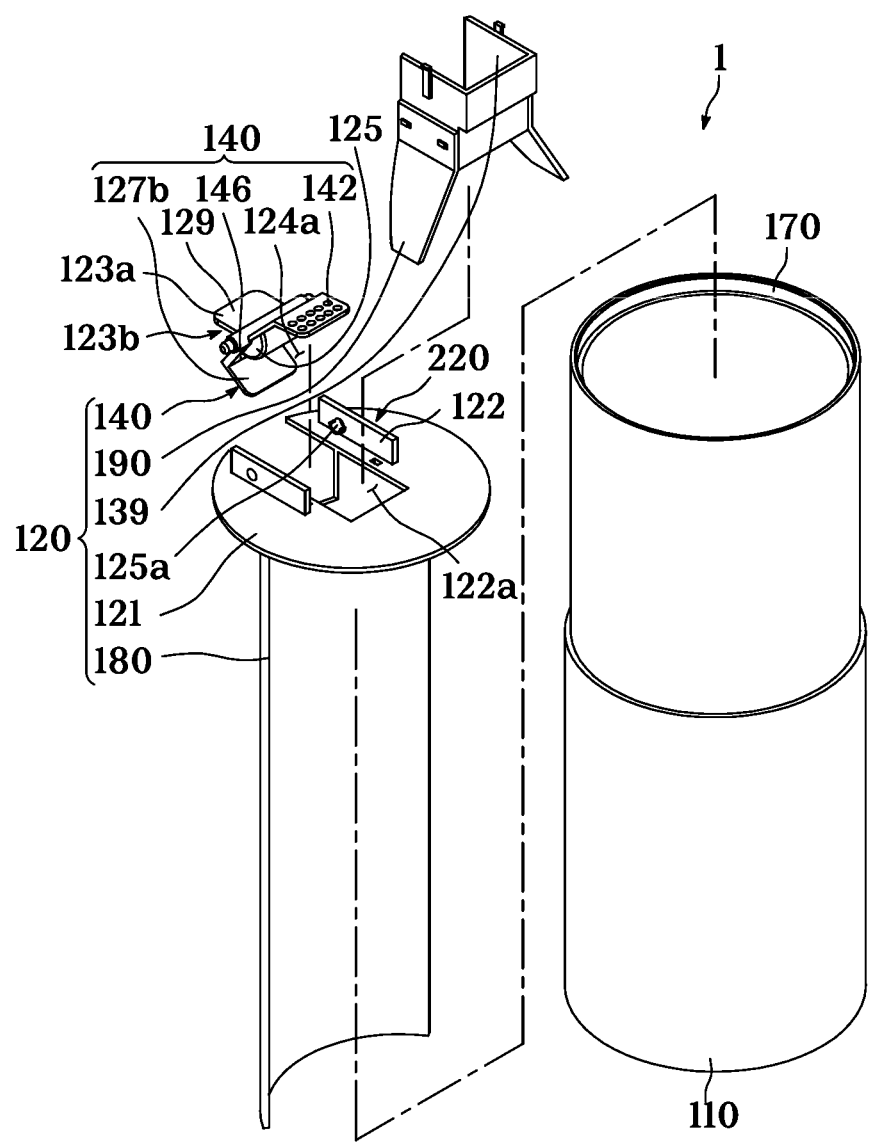
FIG. 27 is an exploded perspective view of the containing apparatus or the contents moving apparatus including the dispensing device according to the seventh embodiment of the present invention.
Figure 28:
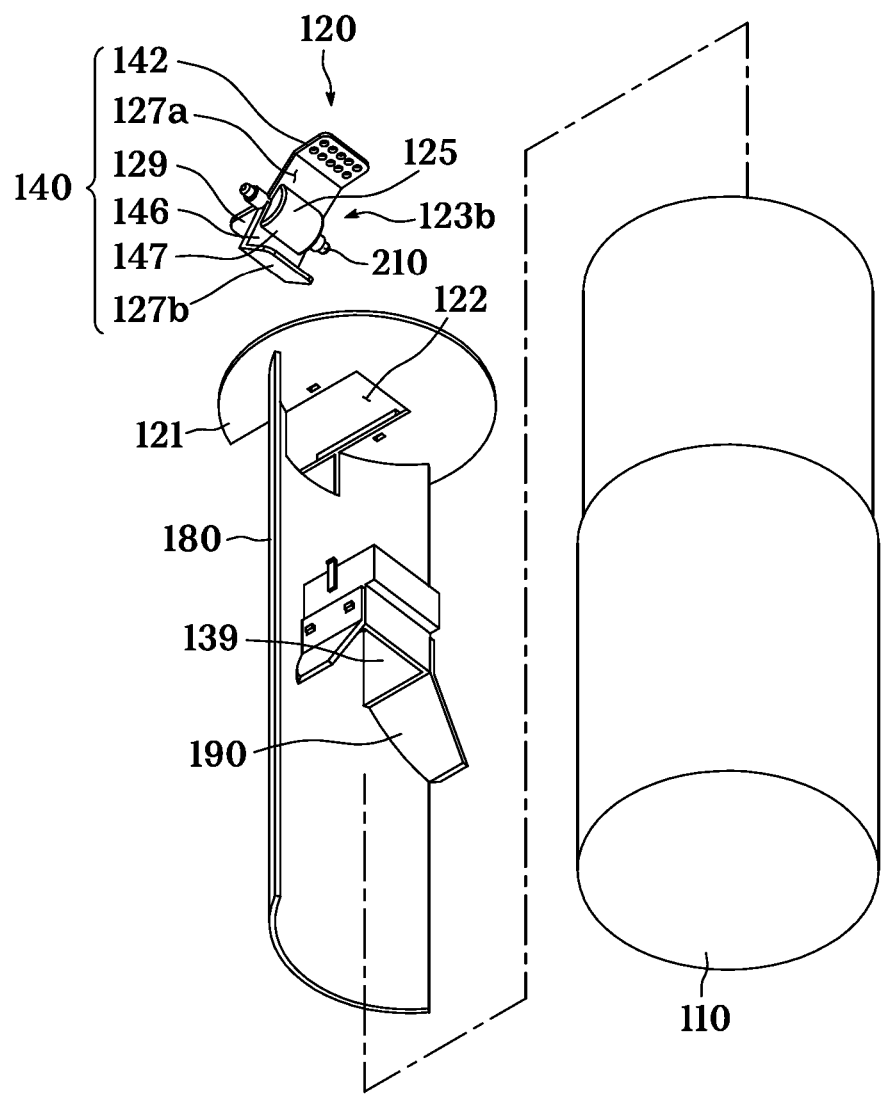
FIG. 28 is a bottom exploded perspective view of the containing apparatus or the contents moving apparatus including the dispensing device according to the seventh embodiment of the present invention.

FIG. 26 is a perspective view of a containing apparatus or a contents moving apparatus including a dispensing device according to a seventh embodiment of the present invention, FIG. 27 is an exploded perspective view of the containing apparatus or the contents moving apparatus including the dispensing device according to the seventh embodiment of the present invention, and FIG. 28 is a bottom exploded perspective view of the containing apparatus or the contents moving apparatus including the dispensing device according to the seventh embodiment of the present invention.

Figure 29:
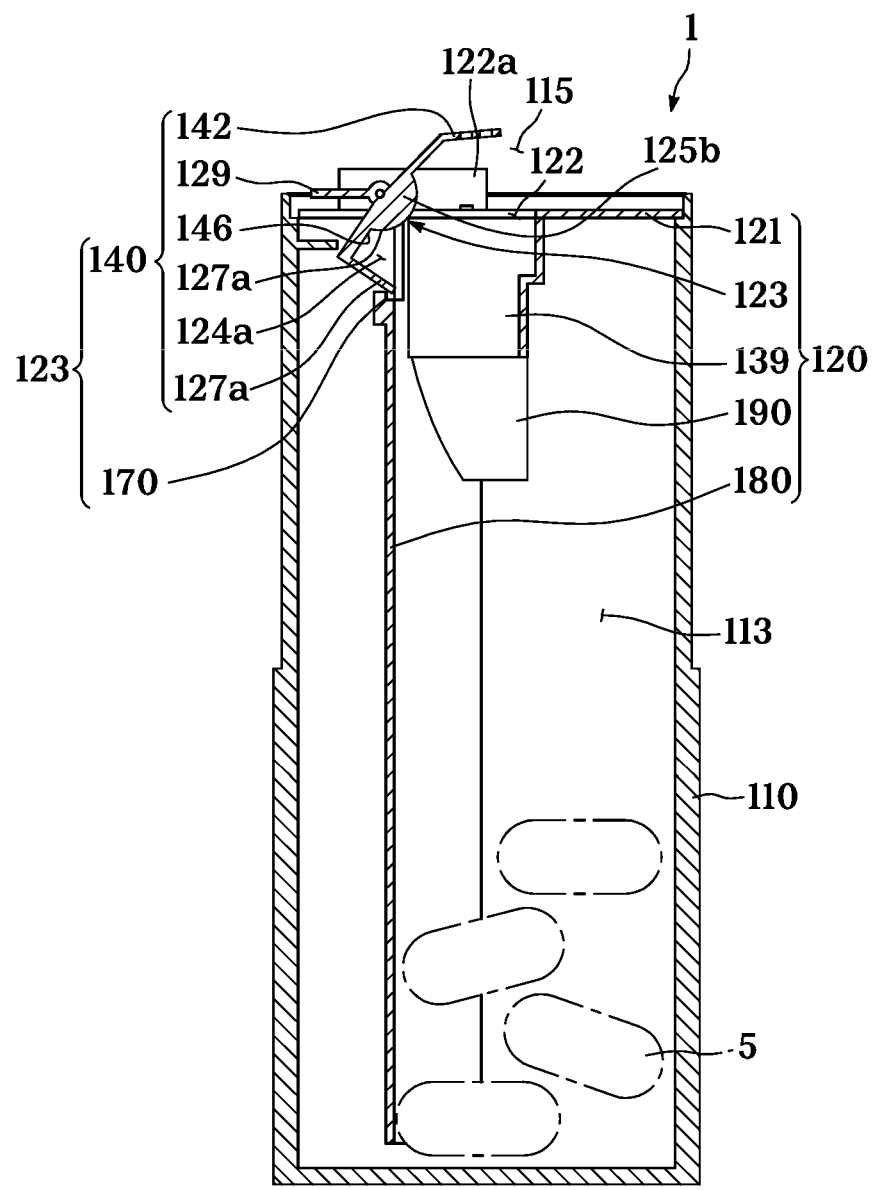
FIG. 29 is a cross-sectional view of the containing apparatus or the contents moving apparatus including the dispensing device according to the seventh embodiment of the present invention.
Figure 30:
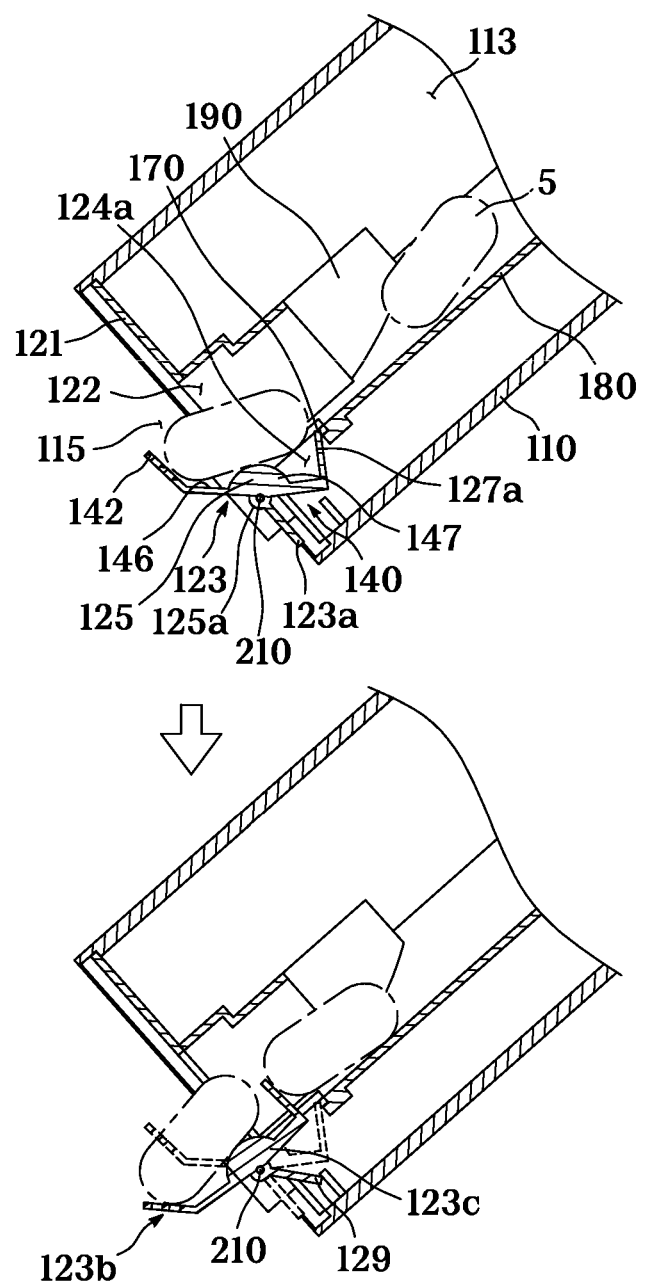
FIG. 30 is a cross-sectional view illustrating a use state of the containing apparatus or the contents moving apparatus including the dispensing device according to the seventh embodiment of the present invention.

FIG. 29 is a cross-sectional view of the containing apparatus or the contents moving apparatus including the dispensing device according to the seventh embodiment of the present invention, and FIG. 30 is a cross-sectional view illustrating a use state of the containing apparatus or the contents moving apparatus including the dispensing device according to the seventh embodiment of the present invention.

As in FIGS. 26 to 30, a contents moving apparatus or the containing apparatus 1 having a dispensing device according to the seventh embodiment of the present invention includes the housing 110 and the passing operation part 120.

Refer to the above description for the description of the housing 110.

The passing operation part 120 moves a single content 5 (one pill) or a fixed amount of the content 5 at a time, and the content 5 moves due to deformation of the contents passing means 123 which occurs due to tilting or shaking of the housing 110 or the passing operation part 120.

Here, the passing operation part 120 includes the fixing member 121, the contents passing means 123, the movement guide part 180, and the guide member 190.

The fixing member 121 is disposed at the inside of the housing 110. Here, a position at which the fixing member 121 is formed in the housing 110 is not limited.

Also, the fixing member 121 has the opening 122 formed therethrough. The opening 122 serves to allow withdrawal of the content 5 by connecting the receiving part 115 of the housing 110 to the storing part 113.

Also, the contents passing means 123 serves to move a single content 5 (one pill) or a set amount of the content 5 at a time toward the receiving part 115 and is disposed at the inside of the opening 122 and the movement guide part 180.

Further, the movement guide part 180 serves to guide movement of the content 5 when the housing 110 or the passing operation part 120 is tilted.

Here, the movement guide part 180 serves to guide movement of the content 5 by guiding along a surface of the movement guide part 180 due to a self-weight or an inertia of the content 5 while the movement guide part 180 is tilted. Although the movement guide part 180 may be fixed in contact with the inner surface of the housing 110, the movement guide part 180 extends from the fixing member 121 to correspond to the opening 122.

Particularly, the movement guide part 180 may be the inner surface itself of the housing 110 or may be a separate guide member disposed inside the housing 110.

The movement guide part 180 may be changed to have various other shapes.

Also, the guide member 190 extends from the movement guide part 180 to allow the content 5 stored in the storing part 113 to intensively move toward the opening 122. Here, the guide member 190 may be formed in various other shapes.

The contents passing means 123 includes the passing movement part 140 and the closure support member 170.

The passing movement part 140 is movably disposed in the fixing member 121 corresponding to the inner surface of the opening 122 and serves to allow withdrawal of the content 5 by opening the opening 122 and block the withdrawal of the content 5 by blocking the opening 122.

Particularly, the passing movement part 140 moves due to one or more of tilting of the housing 110 or the passing operation part 120, a self-weight, a self-weight of the content 5, and a pressing force and inertia of the content 5. That is, when the housing 110 or the passing operation part 120 is tilted or is oppositely stood upright, the passing movement part 140 moves due to the self-weight and the pressing force of the content 5 to be withdrawn and opens the opening 122.

Also, the passing movement part 140 includes one or more of the opening member 142, a containing member 127a, a passing compartment part 124a, a bottom part 146, the movement control member 123a, the movement increase control member 123c, and the stopper 129.

Particularly, the opening member 142 serves to open the opening 122, and a single opening member 142 or a plurality of opening members 142 may be provided.

The opening member 142 serves to open or close the opening 122 by a self-weight and a pressing force of the content 5. In other words, the opening member 142 moves in the same direction as the contents 5 passing through the opening 122 and serves to allow passage of the content 5.

Here, the bracket 122a extends in the fixing member 121 so that the opening member 142 is easily separably assembled to the fixing member 121. The opening member 142 and the bracket 122a may be changed to have various other shapes. Particularly, the opening member 142 is formed so that movement responsiveness is rapid when the housing 110 or the passing operation part 120 is stood upright or tilted.

Also, the containing member 127a extends from the opening member 142, moves in the same direction as the opening member 142, and serves to contain a fixed amount of the content 5 by being interlocked to the opening member 142. The containing member 127a may be changed to have various other shapes.

When the housing 110 or the passing operation part 120 is tilted, the content 5 in the storing part 113 passes through the containing member 127a by being interlocked to movement of the opening member 142 and the containing member 127a in one direction.

Also, the containing member 127a may move further to block introduction of a following content 5, a leading content 5 may pass through the opening member 142, or the content 5 located on the opening member 142 may be taken out.

Conversely, when the housing 110 is stood upright as in the initial state, the opening member 142 and the containing member 127a move in the other direction, and the opening member 142 blocks the opening 122.

The passing compartment part 124a is an area between the opening member 142 and the containing member 127a, particularly, an area (space) over the opening member 142 and the containing member 127a, and contains a fixed amount of the content 5 or the content 5 less than the fixed amount that passed through the containing member 127a. Passage of the content 5 contained in the passing compartment part 124a is guided via the opening member 142. Here, a length of the passing compartment part 124a is may be similar to or slightly longer than a length of the content 5.

Further, the bottom part 146 is formed between the opening member 142 and the containing member 127a to contain the content 5 passing through the containing member 127a and serves to support a lower portion of the content 5 in the passing movement part 140. Accordingly, the bottom part 146 may connect the containing member 127a and the opening member 142 and may be formed in the shape of a flat plate.

Particularly, a length of the bottom part 146 is equal to or larger than a length of an end in a long-side direction of the content 5 to accommodate a longitudinal length of the content 5.

Also, the stopper 129 serves to limit an angle of rotation of the opening member 142. By extending from a center of rotation of the passing movement part 140 and being locked to the movement guide part 180, the guide member 190, or the inner surface of the housing 110, the stopper 129 prevents the opening member 142 from moving further after the opening 122 is completely opened.

The stopper 129 may be changed to have various other shapes.

The closure support member 170 included in the contents passing means 123 is formed at the fixing member 121, the movement guide part 180, or the guide member 190 to support the opening member 142 so that a state in which the opening member 142 blocks the opening 122 is maintained. Particularly, the closure support member 170 may be formed at the movement guide part 180 to support the stopper 129.

The dispensing device includes the passing operation part 120 configured to guide movement of contents, and the passing operation part 120 includes the contents passing means 123 that allows the contents to move. The contents passing means 123 includes the passing movement part 140 configured to form a passing space of contents by movement.

The passing movement part 140 includes the opening member 142 moving in the same direction as the contents passing through the opening 122 and configured to allow passage of the contents. The opening member 142 may move to be opened due to a self-weight or a pressing force of the contents and guide passage of the contents.

Here, to prevent passage of contents from being blocked because of rotation due to the self-weight of the opening member 142 being performed before the contents pass through the opening member 142 as the passing operation part 120 is tilted, when the passing operation part 120 is tilted and rotation is about to happen due to the self-weight of the opening member 142, the rotation of the opening member 142 may be restrained by weights and positions of centers of gravity of two or more of the opening member 142, the blocking member 127, and the movement member 125 so that blockage of passage of the contents is prevented before a demand amount of the contents passes, and the opening member 142 rotates together with the passage of the contents. Here, the passing movement part 140 includes the balancing part 123b configured to maintain balance by preventing the passing movement part 140 from tilting more than the slope of the contents moving apparatus or the containing apparatus 1 when the contents moving apparatus or the containing apparatus 1 is tilted. Particularly, the movement control member 123a may be included in the passing movement part 140 to balance the center of gravity of the passing movement part 140.

The movement member 125 may have the movement control member 123a connected thereto or include the movement control member 123a.

The passing operation part 120 may allow contents to move due to deformation of the contents passing means 123 that occurs due to tilting or shaking of the passing operation part 120. When the passing operation part 120 is tilted, the contents may move over the inclined surface in the direction of gravity of the movement guide part 180.

The movement guide part 180 configured to guide movement of contents when the passing operation part 120 is tilted is included, and the movement guide part 180 may pass contents by guiding along a surface of the movement guide part 180 due to a self-weight or an inertia of the contents while the movement guide part 180 is tilted.

The passing movement part 140 may move due to one or more of a self-weight of the passing movement part 140, an inertia of the passing movement part 140, and a force of the contents pressing the passing movement part 140 when the passing operation part 120 is tilted or moves.

The passing movement part 140 may include the blocking member 127, separate from the opening member 142, moving in the same direction as the opening member 142 to block the opening 122 to prevent passage of contents therethrough or allow only a portion of the contents to pass therethrough.

The passing movement part 140 may include the passing compartment part 124a disposed between the opening member 142 and the blocking member 127, and contents of a compartment part containable amount may be contained in the passing compartment part 124a so that movement of the contained contents is guided. The compartment part containable amount contained in the passing compartment part 124a may be equal to or larger than a demand amount of contents passing through the contents passing means 123, the passing compartment part 124a may include a passing resistance part configured to resist passage of contents contained in the passing compartment part 124a through the passing compartment part 124a, and when the compartment part containable amount contained in the passing compartment part 124a exceeds the demand amount, the passing resistance part may resist so that the excess contents beyond the demand amount do not pass through the passing compartment part 124a.

In the passing movement part 140, a position of a movement part center-of-gravity 215 of the passing movement part 140 and a position of a movement part center-of-rotation 210, which is a center of rotation of the passing movement part 140, may be different from each other. When the position of the movement part center-of-gravity 215 of the passing movement part 140 is disposed in an opposite direction of an external passing direction of the dispensing device, which is behind the position of the movement part center-of-rotation 210 of the passing movement part 140, and the passing operation part 120 is tilted or shaken, rotation of the passing movement part 140 may be restrained or delayed due to a difference between the position of the movement part center-of-gravity 215 and the position of the movement part center-of-rotation 210.

Consequently, when the passing operation part 120 is tilted or shaken, the passing movement part 140 may not perform rotation which results in opening the opening 122 so that contents may pass therethrough or rotation of the passing movement part 140 may be suppressed by the self-weight of only the passing movement part 140. Before the contents resist the passing movement part 140 and open the opening 122, the passing movement part 140 may not open the opening 122 to an extent in which contents may pass therethrough by the self-weight of the passing movement part 140.

In this way, deformation of the contents passing means 123 that occurs when at least a portion of a constituent member of the contents passing means 123 rotates and is deformed may be prevented from occurring before contact with contents or may be delayed until a close time point before the contact by the self-weight and the movement part center-of-gravity 215 of the passing movement part 140.

Consequently, the deformation of the contents passing means 123 may not occur before contact with the contents due to the self-weight of the contents and may occur as rotation due to the self-weight of the passing movement part 140 occurs together with the contact with the contents due to the self-weight of the contents.

The passing movement part 140 may include the containing member 127a extending from the opening member 142 and configured to move in the same direction as the opening member 142 and contain a demand amount of the contents and move by being interlocked to the opening member 142. The passing movement part 140 may include the passing compartment part 124a disposed between the opening member 142 and the containing member 127a, and contents of the compartment part containable amount may be contained in the passing compartment part 124a to guide movement of the contained contents.

The passing movement part 140 may include the bottom part 146 for containing the contents, and the bottom part 146 may support a lower portion in the direction of gravity of the contents in the passing movement part 140.

A position of contents passing by being supported by the bottom part 146 may be lifted in an opposite direction of the direction of gravity by the bottom-height changing member 147, which is a lifted or protruding portion of the bottom part 146. Here, a space of the opening 122 that is opened so that the contents pass therethrough may be narrowed. Due to the narrowed space of the opening 122, movement of contents beyond a containable amount from the passing compartment part 124a may be resisted, and the contents beyond the containable amount may not move to the passing movement part 140. Also, passage of the contents via the opening member may be facilitated by the lifted position of the contents.

Here, the bottom-height changing member 147 may serve as the movement increase control member 123c.

As in the present embodiment, in the case in which the bottom part 146 includes the bottom-height changing member 147 and the bottom part 146 is formed in a curved shape, when contents move in contact with a surface of the bottom-height changing member 147, the bottom part 146 moves in the moving direction of the contents due to resistance caused by the self-weight of the contents, and the passing movement part 140 may move in a passing direction of the contents.

Here, when the bottom part 146 allows passage of the contents by moving in the same direction as the contents being passed due to resistance caused by contact between the contents and the bottom part 146, the passing movement part 140 may include the opening member 142 or be moved just by movement of the bottom part 146 without a separate opening member 142 in the passing movement part 140.

The bottom part 146 or the bottom-height changing member 147 included in the bottom part 146 may have various friction materials or a curved shape.

The bottom part 146 may be disposed between the opening member 142 and the containing member 127a configured to contain a demand amount of contents and move by being interlocked to the opening member 142. The bottom part 146 may have a length for containing a longitudinal length of a rectangular content.

The contents passing means 123 may guide passage of contents while there is no opening-closing apparatus or a cover that allows the housing 110 to be opened and closed at the passing operation part 120 of the housing 110 provided with the contents passing means 123, or the opening-closing apparatus or the cover is open.

The contents passing means 123 may guide passage of contents while not in contact with or not being resisted by the opening-closing apparatus at the passing operation part 120 of the housing 110 provided with the contents passing means 123 or a member fixed to the opening-closing apparatus.

The contents passing means 123 may guide passage of contents while the housing 110 provided with the contents passing means 123 is open in a passing direction of contents via the contents passing means 123.

Contents may pass through the contents passing means 123 just by tilting, flipping, or shaking of the passing operation part 120 provided with the contents passing means 123.

Contents may pass through the contents passing means 123 by rotation and deformation of the contents passing means 123. Passage of the excess contents beyond necessary contents may be blocked by rotation and deformation of the contents passing means 123. The rotation and deformation of the contents passing means 123 can be performed just by the passing operation part 120 being tilted, flipped, or shaken. The rotation and deformation of the contents passing means 123 may be performed by the contents passing means 123 being pressed due to the self-weight of the contents.

Deformation of the contents passing means 123 may be deformation due to movement of a movement part.

The contents may pass through the contents passing means 123 by sliding in contact with a surface disposed in the housing 110 or the passing means.

A detecting part configured to detect passage of contents when the contents pass through the contents passing means 123 may be included. The detecting part may detect or measure one or more of an amount of the contents being passed, a date, day, and time of the passage of the contents.

The contents measurement by the detecting part may be a measurement using an electronic sensor or a mechanical operation. The detecting part may measure physical movement of the contents passing means 123 using a mechanical measurement method. The detecting part may include one or more sensor types of a touch sensor, an acceleration sensor, an angular velocity sensor, a gravity sensor, a geomagnetic sensor, a gyroscope sensor, a proximity sensor, a motion sensor, an electronic compass, a magnetometer sensor, and a gesture sensor.

Also, a display part configured to display data detected or measured by the detecting part or whether contents passed through the passing operation part 120 by operation of the contents passing means 123 to be recognized by a user using one or more sensing methods of a visual sense, an auditory sense, and tactile sense is included. The display part may display using one or more of a number, a letter, a symbol, braille, light emission, lighting, and color.

A controller configured to limit contents moving operation of the contents passing means 123 when the detecting part detects a fixed amount of the contents passing through the contents passing means 123 within a predetermined period or at a predetermined time or detects contents beyond the fixed amount passing through the contents passing means 123 is included.

The detecting part configured to detect passage of contents when the contents pass through the contents passing means 123 may be included, whether the contents passed or the amount of the contents being passed detected by the detecting part may be determined, and whether the contents passed or the amount of contents being passed determined above or one or more data of a date, day, and time of the passage of the contents in addition to the whether the contents passed or the amount of contents being passed determined above may be displayed on the display part. A display on the display part may be one or more of a number, a letter, a symbol, and a signal using a liquid crystal display (LCD) or a light emitting diode (LED).

A communicating part configured to transmit the data detected or measured by the detecting part may be included. Whether the contents passed or the amount of the contents being passed detected by the detecting part may be determined, and whether the contents passed or the amount of contents being passed determined above or one or more data of a date, day, and time of the passage of the contents in addition to the whether the contents passed or the amount of contents being passed determined above may be transmitted in the vicinity or remotely via the communicating part.

A locking part configured to prevent passage of more contents through the dispensing device when the detecting part detects contents passed through the contents passing means 123 and it is determined that a designated amount of contents passed through the contents passing means 123 may be included. The locking part is disposed in the dispensing device to block movement of the contents passing means 123 or block a movement path of the contents in the passing operation part 120.

The blocking of the movement of the contents passing means 123 may be performed by coming into contact with and resisting a movement portion of the contents passing means, and the blocking of the movement path in the passing operation part 120 may be performed by blocking or resisting contents by the passing passage part 139 disposed at a passing entry side and a passing discharge side for the contents. When regulation is required in cases of a medication that requires to be taken in a limited dose by patients or a food that requires restricted intake of normal people, the locking part may maintain a locked state at a designated time or before a situation ends.

Also, one or more of a number, a letter, and a symbol may be displayed on a surface of the contents or inside the contents so that the displays on the contents that passed through the contents passing means 123 or the contents that did not pass through the contents passing means 123 may be observed.

When the passing operation part 120 is tilted or shaken, the contents passing means 123 may rotate in the direction of gravity about a vertical shaft of the passing operation part 120 due to the self-weight of the contents passing means 123 or a self-weight of at least one portion of the passing operation part 120 connected to the contents passing means 123, and the contents passing means 123 that moved in the direction of gravity may form a passing space of contents.

When the contents passing means 123 rotates about a shaft of the housing 110, rotation of the contents passing means 123 may be performed in contact with an inner surface of the housing 110 or may be performed in contact with a shaft member the housing 110.

The passing passage part 139 may have a shape that resists to prevent the excess contents beyond the demand amount from completely passing through the passing passage part 139 when contents beyond the demand amount enter the passing passage part 139.

The passing passage part 139 may have a resistive member or a resistive shape that resists to prevent the excess contents beyond the demand amount or the entire contents including the demand amount from passing through the passing passage part 139 when contents beyond the demand amount enter the passing passage part 139, and may prevent the contents beyond the demand amount from passing through the contents passing means 123. The resistive member or the resistive shape of the passing passage part 139 may come into contact with or resist the contents that enter the passing passage part 139 to interfere with passage of contents beyond the demand amount.

The opening member 142 may be rotatably provided, and the contents passing means 123 may open and close the opening 122 by deformation of the contents passing means 123.

Contents passed by the contents passing means 123 may be at least one of solid, powder, and liquid contents. The solid may be at least one of a solid medicine, a food, an apparatus, a tool, a material, a food material, an industrial material, and a general material, and the power may be at least one of a powder medicine, a food, an apparatus, a tool, a material, a food material, an industrial material, and a general material.

Hereinafter, an effect of the contents moving apparatus or the containing apparatus 1 having the dispensing device according to the seventh embodiment of the present invention will be described.

In an initial state in which the contents moving apparatus or the containing apparatus 1 is upright or does not have the content 5 passing therethrough, the opening member 142 is supported by the closure support member 170 while being rotated in one direction due to self-weight. Here, the containing member 127a keeps the opening 122 open.

Particularly, an almost intermediate portion of the bottom part 146 in the axial direction is movably connected to the bracket 122a.

Also, when the contents moving apparatus, the containing apparatus 1 or the passing operation part 120 is tilted or flipped upside down and has the content 5 passing therethrough, a single content 5 or a set amount of the content 5 passes through the containing member 127a along the guide member 190 and the movement guide part 180 and comes into contact with the bottom part 146.

Then, the opening member 142 moves in the other direction and opens the opening 122 until the stopper 129 comes into contact with the movement guide part 180 or the guide member 190.

Here, no more content 5 is withdrawn because the containing member 127a blocks the opening 1220.

Refer to the above description for undescribed reference numerals.

Figure 31:
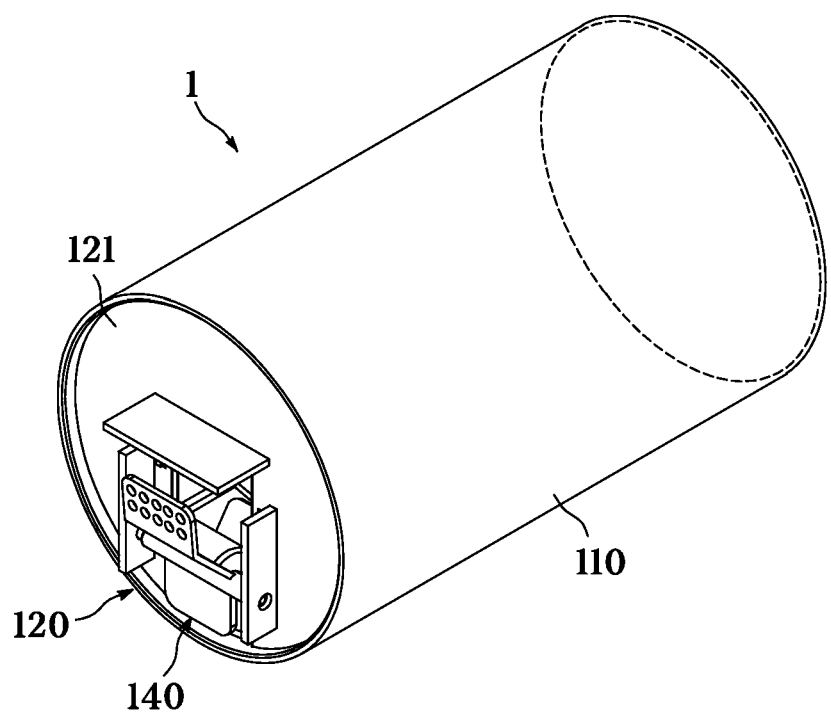
FIG. 31 is a perspective view of a contents moving apparatus including a valve according to an eighth embodiment of the present invention.
Figure 32:
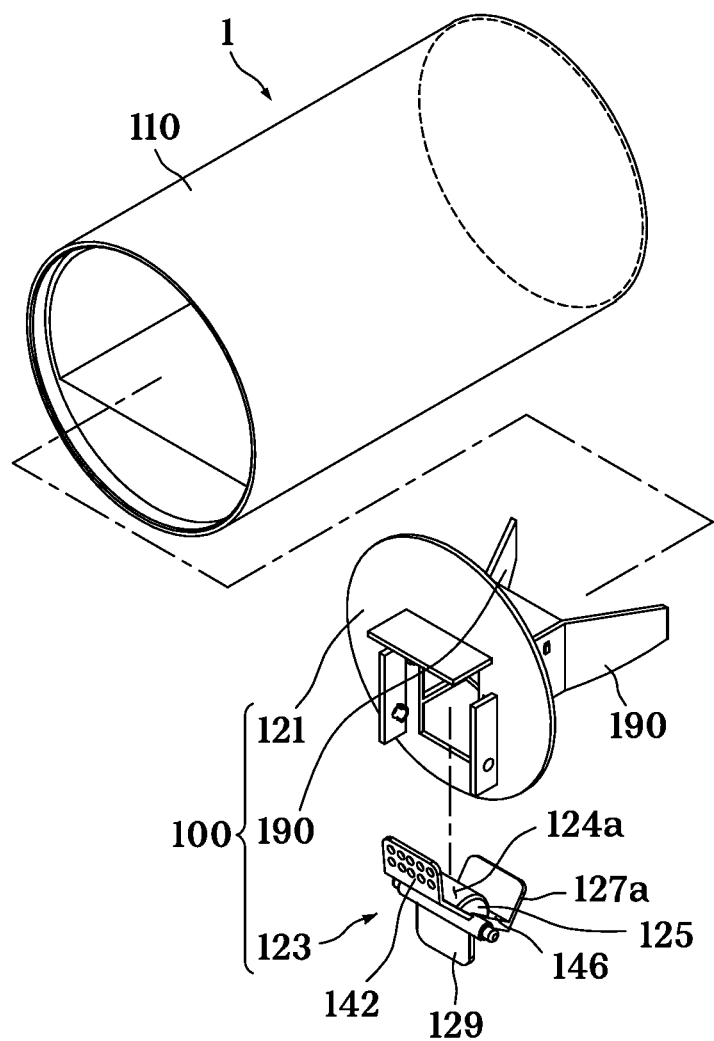
FIG. 32 is an exploded perspective view of the contents moving apparatus including the valve according to the eighth embodiment of the present invention.
Figure 33:
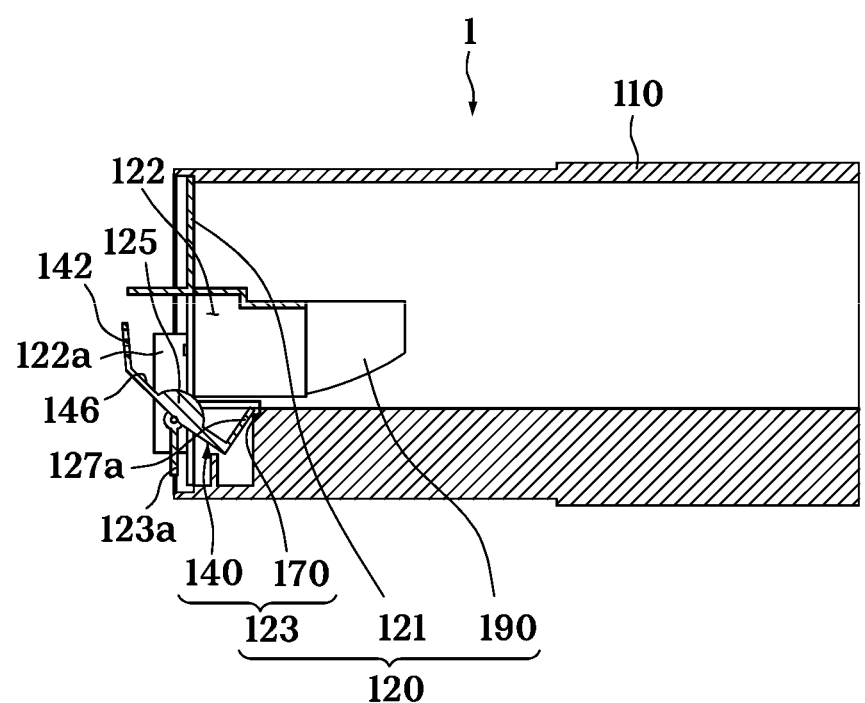
FIGS. 33 and 34 are cross-sectional views illustrating a use state of a containing apparatus or the contents moving apparatus including the valve according to the eighth embodiment of the present invention.
Figure 34:
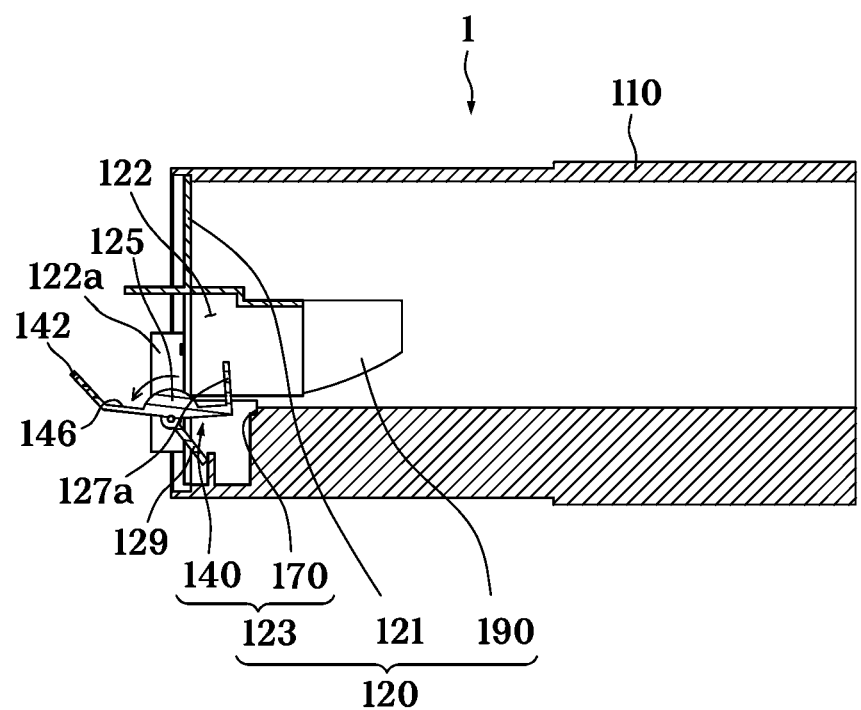

FIG. 31 is a perspective view of a contents moving apparatus including a valve according to an eighth embodiment of the present invention, FIG. 32 is an exploded perspective view of the contents moving apparatus including the valve according to the eighth embodiment of the present invention, and FIGS. 33 and 34 are cross-sectional views illustrating a use state of a containing apparatus or the contents moving apparatus including the valve according to the eighth embodiment of the present invention As in FIGS. 31 to 34, the valve 100 according to the eighth embodiment of the present invention may be embodied in a pipe shape by opening both sides of the housing 110 in the seventh embodiment.

That is, an outer shape of the valve 100 is formed by the housing 110, and the passing operation part 120 is disposed inside the housing 110 to control movement of the content 5.

Also, the passing operation part 120 includes the fixing member 121, the contents passing means 123, and the guide member 190, and the contents passing means 123 serves to control movement of the content 5 in the housing 110.

Here, the content 5 passing via the valve 100 may be any one of solid, powder, and liquid content 5. Particularly, the content 5 passing via the valve 5 may be solid.

Further, refer to the above description for descriptions of the fixing member 121, the contents passing means 123, and the guide member 190.

Refer to the above description for undescribed reference numerals.

Figure 35:
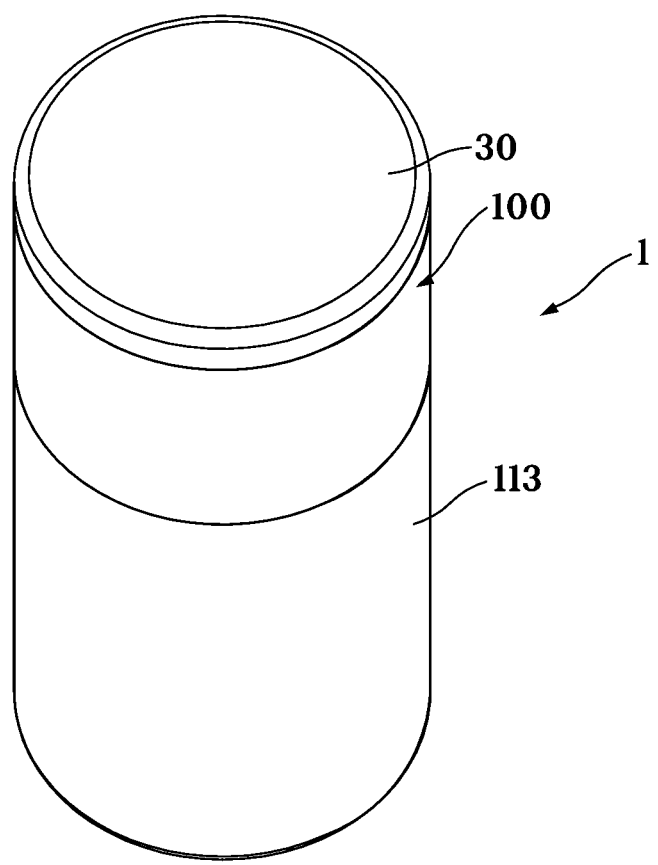
FIG. 35 is a perspective view of a containing apparatus or a contents moving apparatus including a dispensing device according to a ninth embodiment of the present invention.
Figure 36:
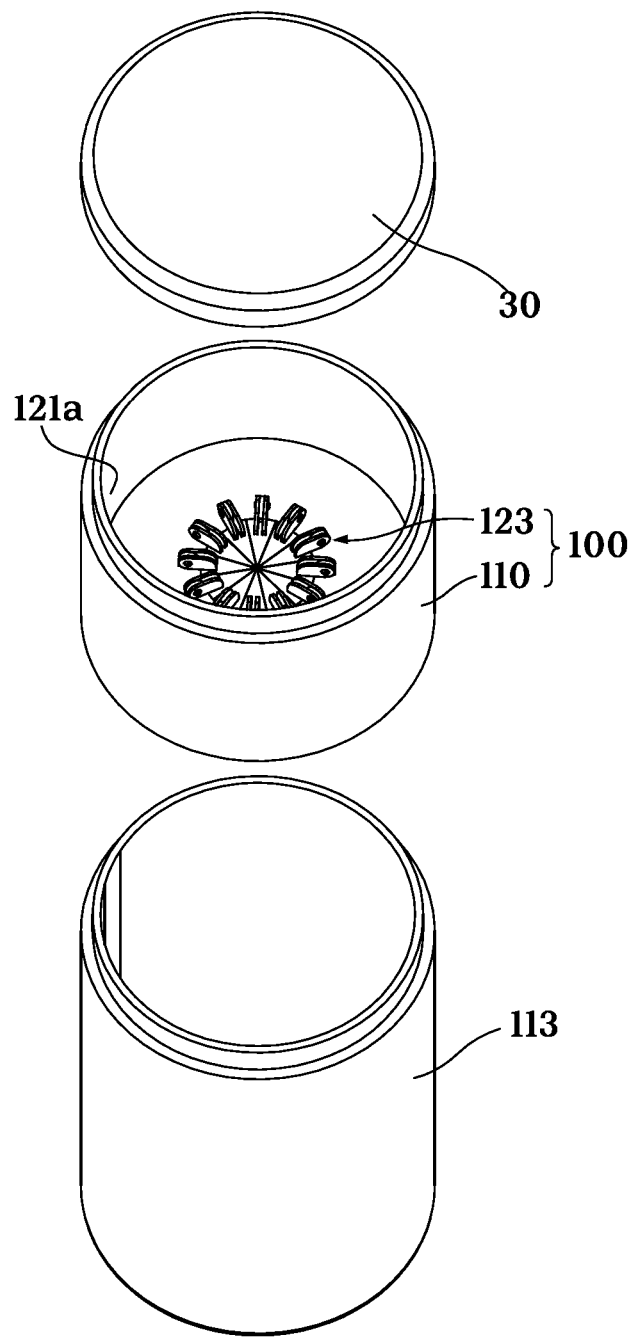
FIG. 36 is an exploded perspective view of the containing apparatus or the contents moving apparatus including the dispensing device according to the ninth embodiment of the present invention.

FIG. 35 is a perspective view of a containing apparatus or a contents moving apparatus including a dispensing device according to a ninth embodiment of the present invention, and FIG. 36 is an exploded perspective view of the containing apparatus or the contents moving apparatus including the dispensing device according to the ninth embodiment of the present invention.

Figure 37:
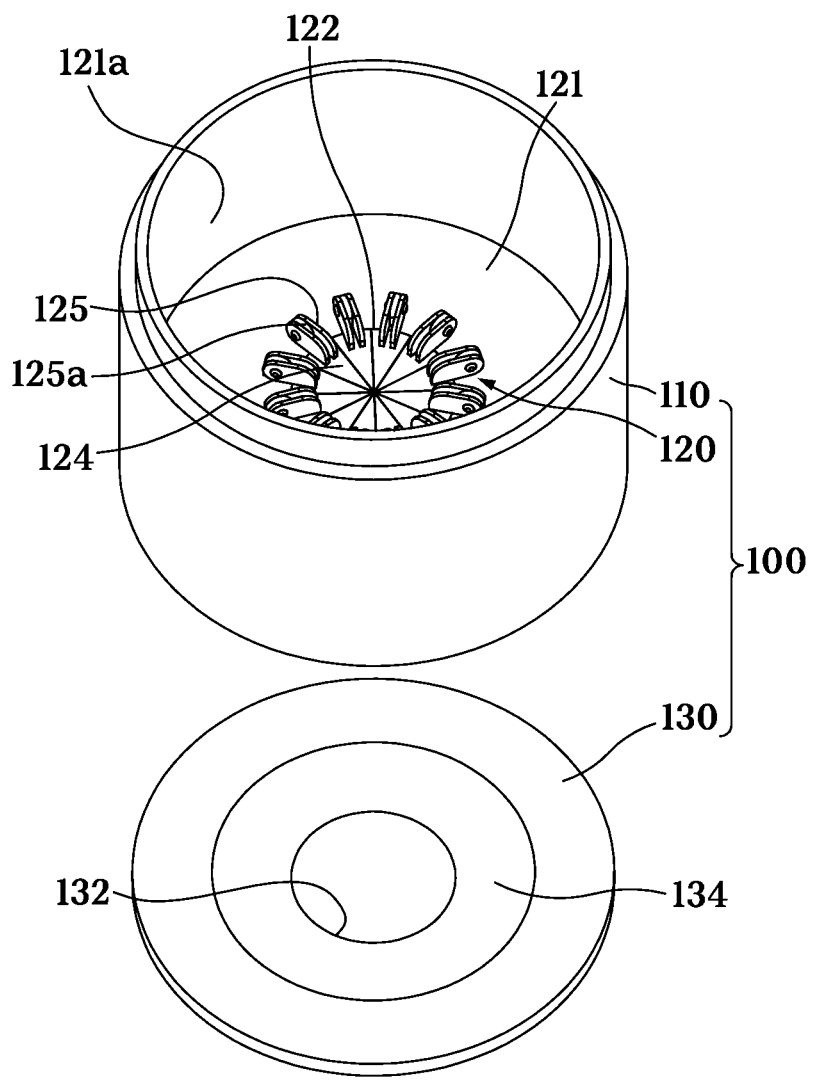
FIG. 37 is an exploded perspective view of the dispensing device according to the ninth embodiment of the present invention.
Figure 38:
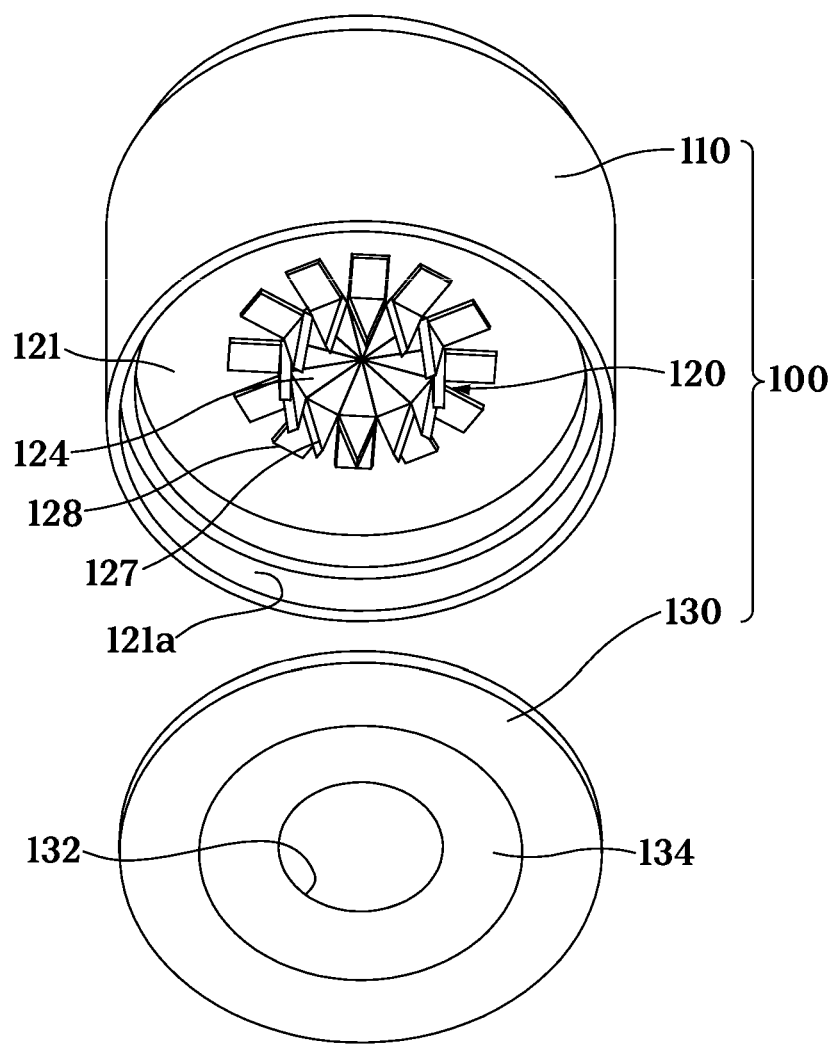
FIG. 38 is a bottom exploded perspective view of the dispensing device according to the ninth embodiment of the present invention.

FIG. 37 is an exploded perspective view of the dispensing device according to the ninth embodiment of the present invention, and FIG. 38 is a bottom exploded perspective view of the dispensing device according to the ninth embodiment of the present invention.

Figure 39:
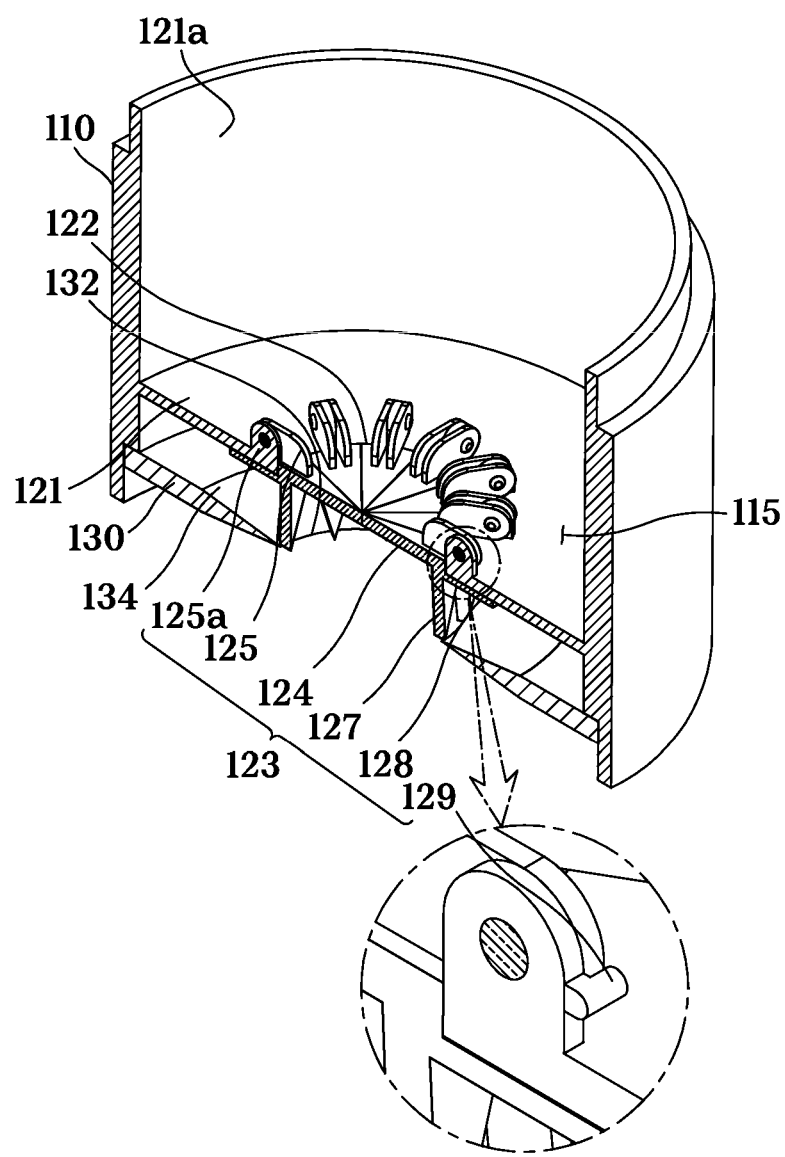
FIG. 39 is a cross-sectional view of the dispensing device according to the ninth embodiment of the present invention.
Figure 40:
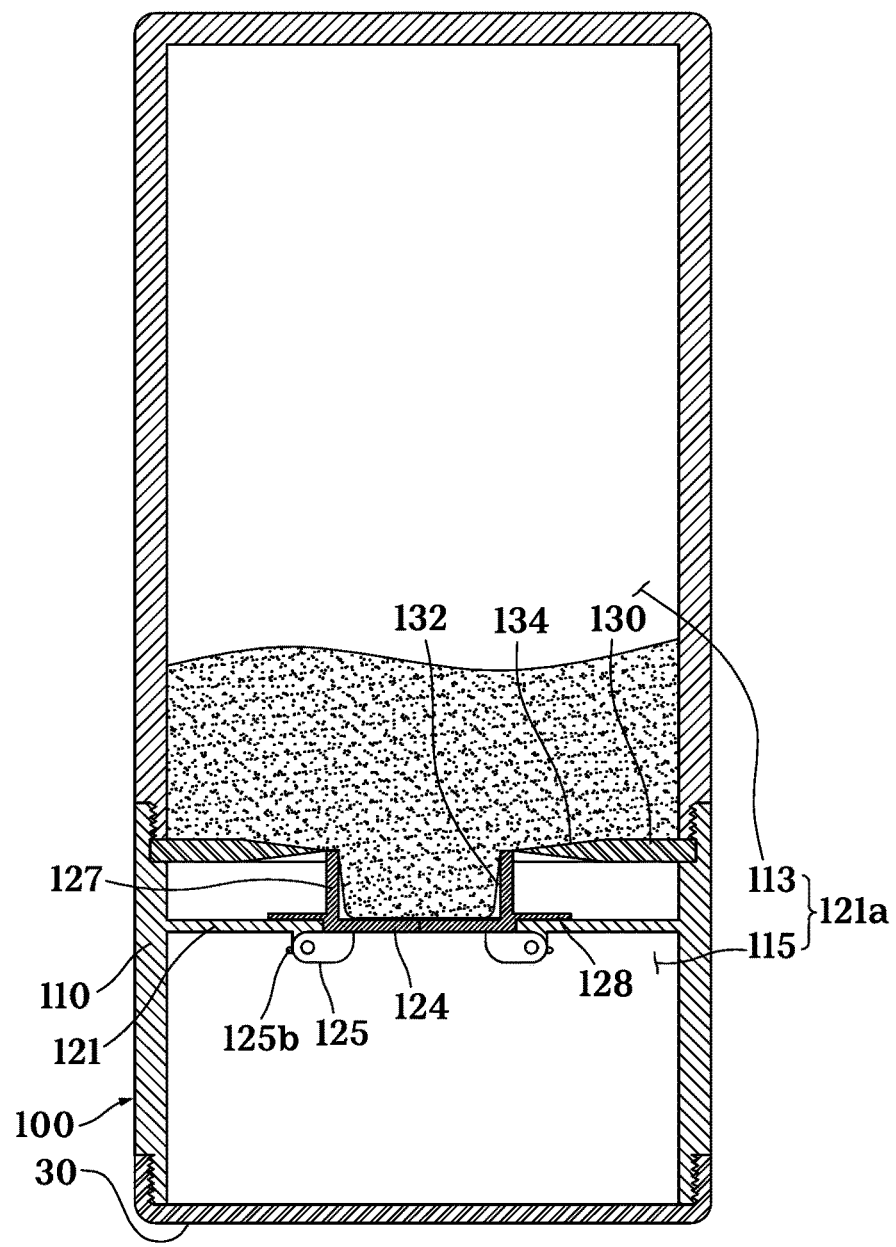
FIGS. 40 to 42 are cross-sectional views illustrating the containing apparatus or the contents moving apparatus including the dispensing device according to the ninth embodiment of the present invention.
Figure 41:
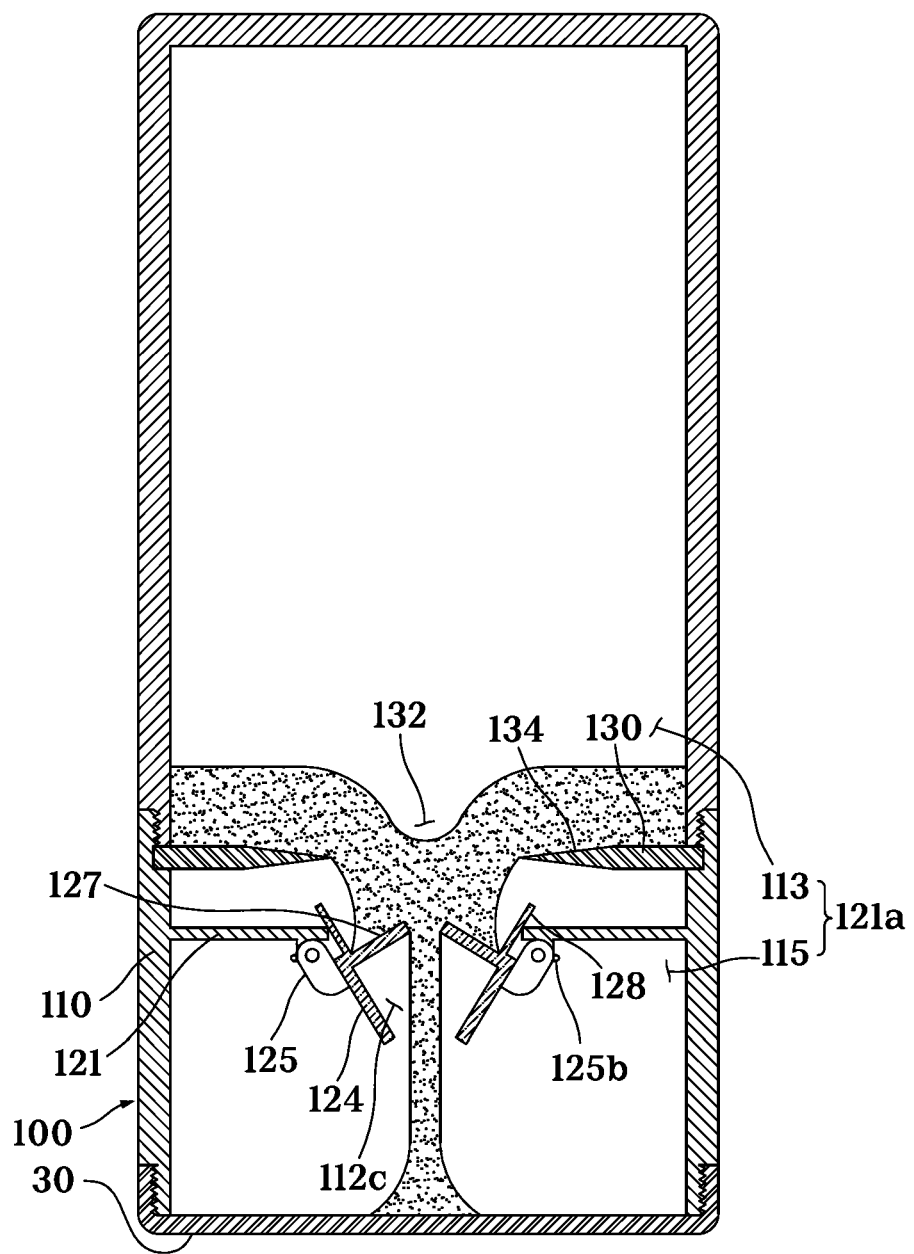
Figure 42:
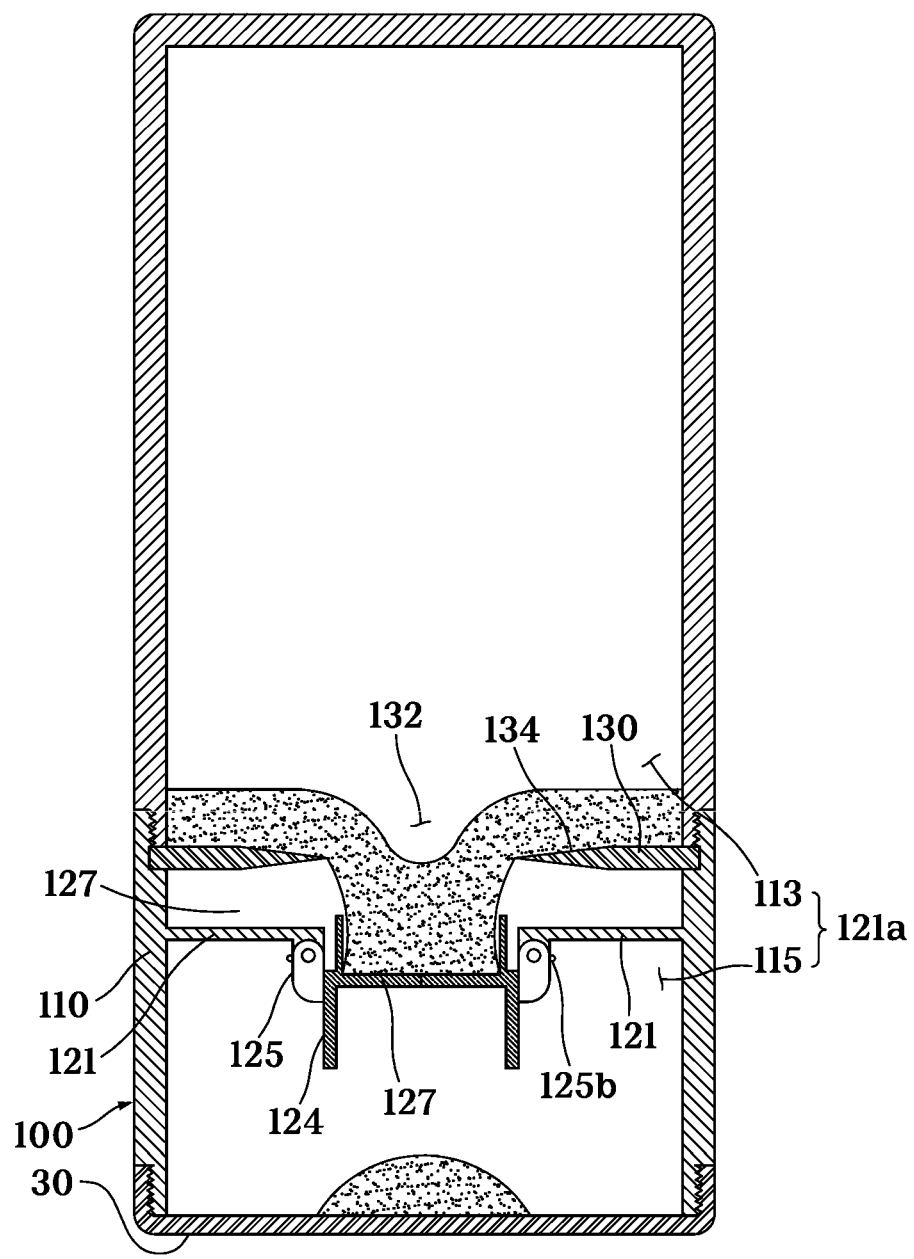

FIG. 39 is a cross-sectional view of the dispensing device according to the ninth embodiment of the present invention, and FIGS. 40 to 42 are cross-sectional views illustrating the containing apparatus or the contents moving apparatus including the dispensing device according to the ninth embodiment of the present invention.

As in FIGS. 35 to 42, the contents moving apparatus or the containing apparatus 1 having the dispensing device 100 according to the ninth embodiment of the present invention includes the storing part 113, the housing 110, and the passing operation part 120.

Refer to the above description for descriptions of the housing 110 and the storing part 113.

The passing operation part 120 includes the fixing member 121 and the contents passing means 123. The passing operation part 120 may be formed at a circumferential surface of the housing 110, i.e., an inner surface of a through-hole 121a.

The fixing member 121 may be disposed at the inner surface of the through-hole 121a. Therefore, the fixing member 121 partitions the inside of the housing 110, particularly, the through-hole 121a of the housing 110. Also, the fixing member 121 has the opening 122 provided with the passing operation part 120 penetrating therethrough. Here, the number and a diameter of the opening 122 are not limited.

Particularly, the fixing member 121 may be configured with the inner wall of the housing 110, may be integrally manufactured with the inside of the housing 110, or may be separably coupled to the housing 110. Further, the fixing member 121 may be changed to have various other shapes.

Also, the contents passing means 123 is disposed at the opening 122 to allow a demand amount of contents to pass therethrough at a time by a self-weight or a pressing force of the contents.

The contents passing means 123 includes the opening member 124, the movement member 125, a movement fixing part 126, and the blocking member 127.

A plurality of opening members 124 are disposed along the inner surface of the opening 122 or the edge of the opening 122. Also, in an initial state in which the storing part 113 is stood upright, the opening member 124 closes the opening 122 to prevent arbitrary passage of the contents and introduction of foreign matter from the outside. Further, in a use state in which the storing part 113 is lied down or is oppositely upright, the opening member 124 is tilted back by the self-weight or the pressing force of the contents so that the opening 122 is opened, and the contents pass therethrough. Here, when the opening 122 is opened, a fixed amount of the contents passes therethrough.

A single opening member 124 or a plurality of opening members 124 are arranged along the edge of the opening 122 to allow passage of contents by being tilted back due to the self-weight or the pressing force of the contents. Also, the opening member 124 may be changed to have various other shapes. For convenience, the opening member 124 is illustrated as having a triangular shape. The number and material of the opening member 124 are not limited.

Also, the movement fixing part 125a is connected to the movement member 125 or the opening member 124 to movably connect one or more opening members 124 to the fixing member 121. Alternatively, the movement fixing part 126 may be connected to each of the opening members 124 integrally formed with the movement member 125 and movably connect each of the opening members 124 to the fixing member 121.

For example, the fixing member 121 includes the movement fixing part 125a on an upper surface along the edge of the opening 122. Here, "upper surface" is a surface of the fixing member 121 facing the top when the storing part 113 is stood upright in an unused state.

Also, the movement member 125 is disposed at an upper surface of each of the opening members 124 closing the opening 122 and is connected to the movement fixing part 125a corresponding thereto. Therefore, the opening member 124 moves along the movement member 125. The movement member 125 and the movement fixing part 125a may be changed to have various other shapes, and a portion of the movement member 125 may have a protruding shape. Further, the movement member 125 may be integrally manufactured with the opening member 124 or may be separably disposed at the opening member 124. Likewise, the movement fixing part 125a may be separably disposed at the fixing member 121 or may be integrally manufactured with the fixing member 121.

Also, the blocking member 127 may be disposed at a portion of the opening member 124 or disposed at each of the opening members 124. Therefore, the blocking member 127 may move by being interlocked to the opening member 124 corresponding thereto.

Particularly, when the opening member 124 is closing the opening 122, the blocking member 127 opens the opening 122. Conversely, when the opening member 124 opens the opening 122, the blocking member 127 blocks the opening 122 so that contents cannot pass therethrough or only a portion of the contents can pass therethrough.

In a state in which the blocking member 127 is open and contents are introduced intoward the opening member 124, by the blocking member 127 blocking the opening 122 so that contents cannot pass therethrough or only a portion of the contents can pass therethrough and the opening member 124 being open, contents introduced intoward the opening member 124 can pass.

Preferably, the opening members 124 and the blocking members 127 corresponding one-to-one to each other may be integrally manufactured. Also, because the blocking member 127 only needs to close the space of the opening 122 to an extent that the contents cannot pass therethrough, the number of blocking members 127 corresponding to the opening members 124 may be smaller than the number of the opening members 124.

Consequently, when a certain amount (number) of contents press the opening members 124, the opening members 124 are tilted back and the opening 122 is opened. By being interlocked thereto, the blocking members 127 block the opening 122. Accordingly, only a fixed amount of contents passes via the opening 122 at a time.

Contents passed via the opening 122 are contained in the cover 30 or pass to the outside of the contents moving apparatus or the containing apparatus. Further, when the storing part 113 is tilted again toward an upright direction in an unused state, the opening members 124 close the opening 122 due to rotation by the self-weights of the opening members 124 and the blocking members 127. Therefore, contents contained in the cover 30 are not inserted into the storing part 113.

Each of the opening members 124 and the blocking members 127 may be stood upright or at an acute angle with respect to the surface of the fixing member 121 while the opening 122 is open. This is to improve closure responsiveness of each of the opening members 124 and the blocking members 127 while the opening 122 is open.

For example, the contents passing means 123 may include the stopper 129 to limit an opening angle when the opening members 124 open the opening 122. The stopper 129 has a protruding form to limit a movement angle of the movement member 125 connected to the opening member 124. The stopper 129 may be changed to have various other shapes. The movement member 125 may have a deformed shape to be resisted by the stopper 129 at a predetermined position when moving so that movement of the movement member 125 stops corresponding to the stopper 129 or may include the movement member protrusion 125b which is a portion protruding from the movement member 125.

Also, a weight size or a center of gravity of the passing movement part 140 including at least the opening member 124 or the balancing part 123b may be adjusted. By such adjustment, when the contents moving apparatus, the containing apparatus, or the passing operation part 120 is tilted and is about to rotate due to the self-weight of the opening member 124, rotation of the opening member 124 is suppressed by weights or centers of gravity of one or more of the blocking member 127, the movement control member 123a, and the movement member 125, the blocking member 127 interlocked to the opening member 124 is not rotated before a demand amount of contents pass, and passage of the contents via the opening 122 is not blocked before the demand amount of the contents pass.

Further, the blocking member 127 includes a support member 128 coming into contact with the fixing member 121 when the opening 122 is open to limit an opening angle of the blocking member 127 when the blocking member 127 is opened. The support member 128 prevents the blocking member 127 from being tilted back by a predetermined angle or more. Also, because the opening member 124 and the blocking member 127 are integrally manufactured, the support member 128 also serves to allow the opening member 124 to maintain a closed state. The support member 128 may be changed to have various other shapes.

The movement guide part 130 serves to guide contents in the storing part 113 to intensively move to an inside of the blocking member 127 that is stood upright along an inclined trajectory when the storing part 113 is tilted.

Therefore, the movement guide part 130 is disposed inside the housing 110 and has the guide hole 132 penetrating therethrough. Here, the movement guide part 130 has the guide hole 132 penetrating therethrough to correspond to the opening 122. Further, the movement guide part 130 forms the inclined surface 134 along the edge of the guide hole 132. Particularly, the inclined surface 134 is formed in the movement guide part 130 along the edge of the guide hole 132. The inclined surface 134 is a flat surface or a curved surface.

The inclined surface 134 serves to guide movement of the contents toward the contents passing means 123 when the storing part 113 is tilted.

The movement guide part 130 may be integrally formed with the fixing member 121 as a single configuration, may be integrally manufactured with the housing 110, or may be separably fitted into the housing 110.

Hereinafter, an effect of the contents moving apparatus or the containing apparatus 1 having the dispensing device 100 according to the ninth embodiment of the present invention will be described.

As in FIG. 40, when a user makes the storing part 113 to be in a use state by tilting the storing part 113 or making the storing part 113 to be oppositely upright, the contents inside the storing part 113 pass through the guide hole 132 along the inclined surface 134 of the movement guide part 130 of the housing 110 and come into contact with the opening member 124.

Here, the opening member 124 is blocking the opening 122 of the fixing member 121, and the blocking member 127 is opening the opening 122.

A fixed amount of the contents moves toward the opening member 124.

Refer to the above description for undescribed reference numerals.

As in FIG. 41, when a certain amount of the contents presses the opening member 124, the opening member 124 is tilted back to open the opening 122, and the passing space 112c is secured.

Here, the movement member 125 rotates in one direction until the movement member protrusion 125b comes into contact with the fixing member 121, and the opening member 124 opens the opening 122.

Particularly, in a state in which the blocking member 127 has received contents by being open, the blocking member 127 is interlocked to the opening member 124 opening the opening 122 and is closed so that contents cannot pass therethrough or only a portion of the contents can pass therethough. Therefore, passage of more contents via the opening 122 is prevented.

As in FIG. 42, by being interlocked to the opening member 124, the blocking member 127 that was opening the opening 122 closes the opening 122 so that contents cannot pass therethrough or only a portion of the contents can pass therethough.

Consequently, no more contents are introduced into the opening 122. Also, the contents that passed through the opening 122 may pass to the outside of the contents moving apparatus or the containing apparatus or may be contained in the cover 30 to be observed by a user, or the user may open the cover 30 to take out the contents.

Then, when the user makes the storing part 113 to stand upright as in the initial state, the blocking member 127 which is blocking the opening 122 returns to the initial state due to a self-weight. Here, the opening member 124 returns to its initial position by rotating in the other direction together with the movement member 125 by elastic restoration of a restoring member 304. Particularly, the movement member 125 rotates in the other direction until the opening member 124 comes into contact with a support block 302.

By adjusting a center of gravity using the movement control member 123a described above in the fifth embodiment, a return position of the initial state due to the self-weight of the opening member 124 or the blocking member 127 may be changed.

Refer to the above description for undescribed reference numerals.

Figure 43:
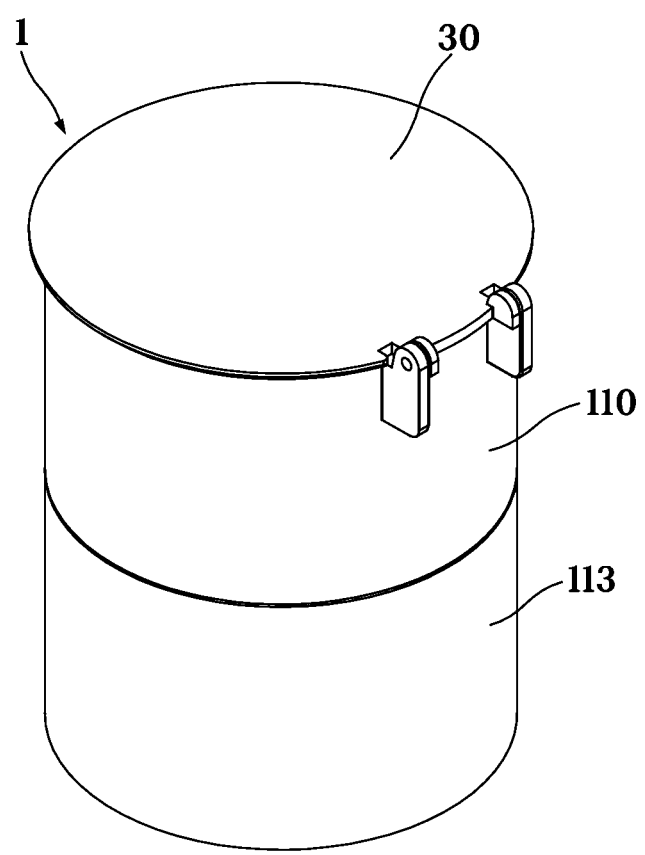
FIG. 43 is a perspective view of a containing apparatus or a contents moving apparatus including a dispensing device according to a tenth embodiment of the present invention.
Figure 44:
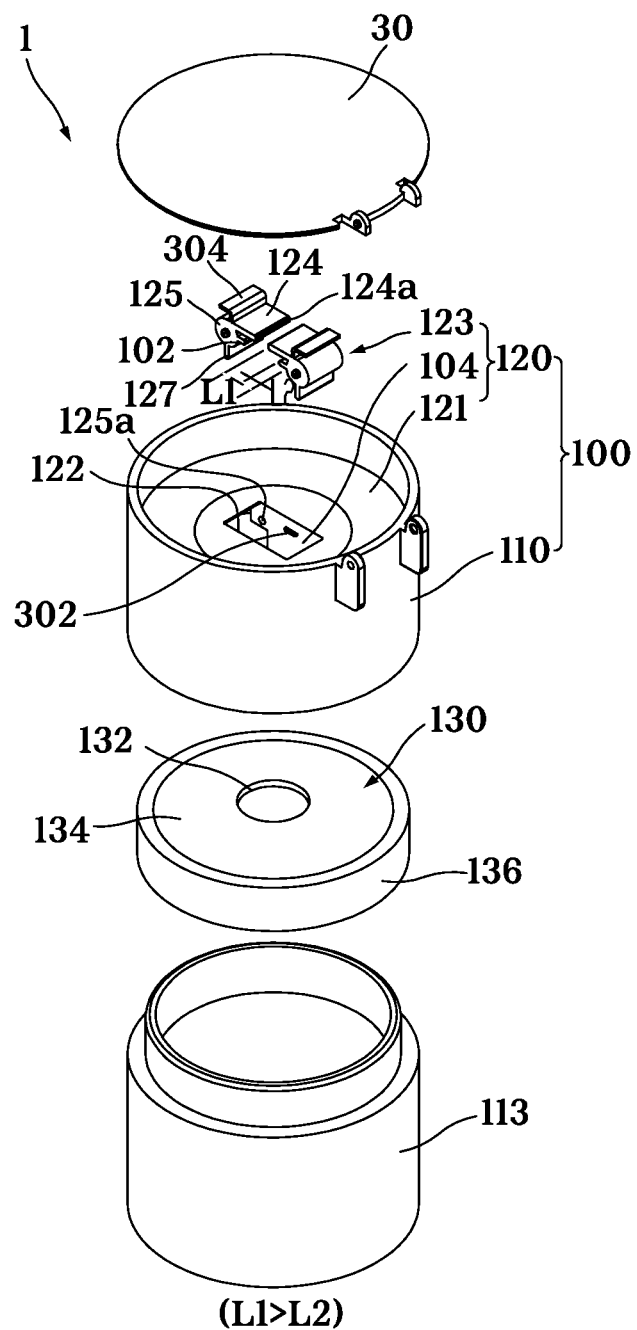
FIG. 44 is an exploded perspective view of the containing apparatus or the contents moving apparatus including the dispensing device according to the tenth embodiment of the present invention.
Figure 45:
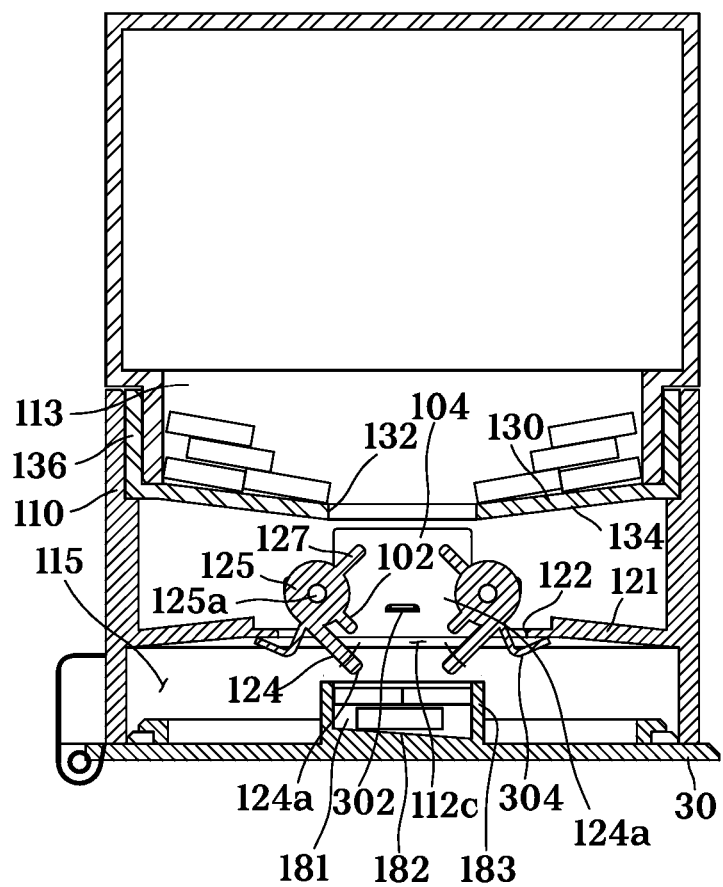
FIGS. 45 and 46 are cross-sectional views illustrating a use state of the containing apparatus or the contents moving apparatus including the dispensing device according to the tenth embodiment of the present invention.
Figure 46:
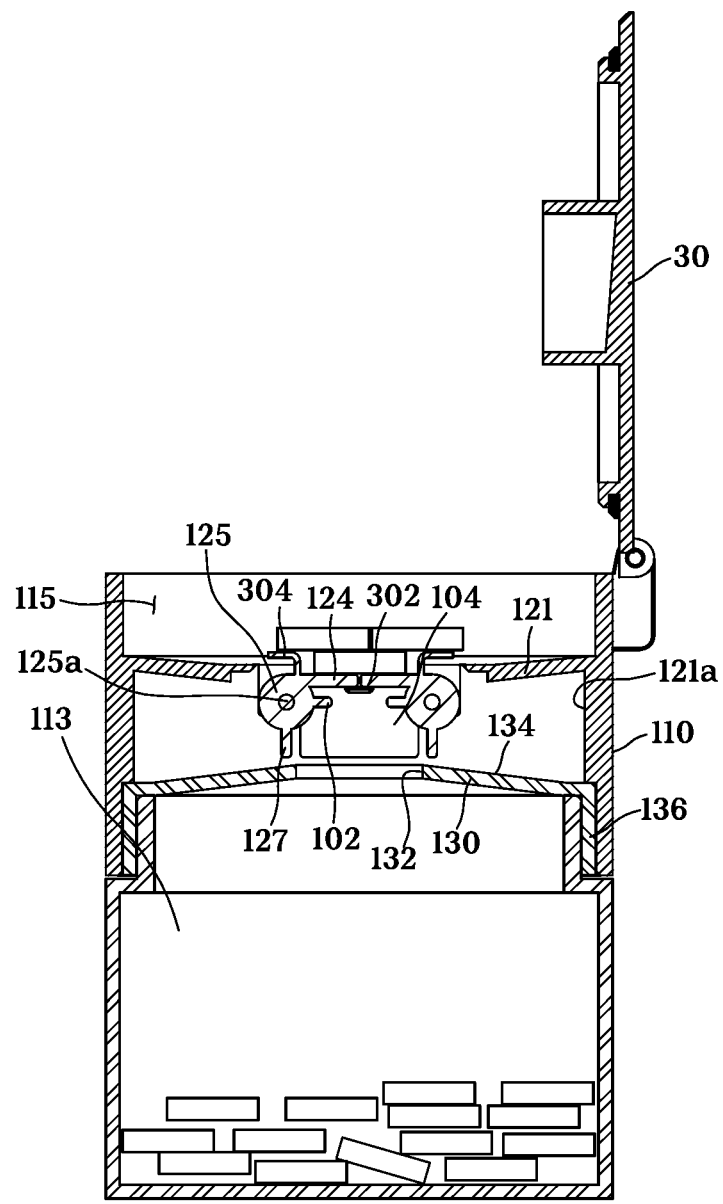

FIG. 43 is a perspective view of a containing apparatus or a contents moving apparatus including a dispensing device according to a tenth embodiment of the present invention, FIG. 44 is an exploded perspective view of the containing apparatus or the contents moving apparatus including the dispensing device according to the tenth embodiment of the present invention, and FIGS. 45 and 46 are cross-sectional views illustrating a use state of the containing apparatus or the contents moving apparatus including the dispensing device according to the tenth embodiment of the present invention.

As in FIGS. 43 to 46, the contents moving apparatus or the containing apparatus 1 having the dispensing device 100 according to the tenth embodiment of the present invention includes the storing part 113, the housing 110, and the passing operation part 120.

The storing part 113 serves to hold and store contents. Also, the storing part 113 has one open side to be able to hold the contents or allow the contents to pass therethrough. Various shapes and various materials may be applied to the storing part 113.

Also, the housing 110 is disposed at a passing side of the storing part 113 in which the contents are held. That is, a lower side of the housing 110 is connected to the storing part 113. Here, the contents may be solid, powder, or liquid.

Particularly, the housing 110 may be separably coupled to a contents passing side of the storing part 113 or may be integrally provided with the storing part 113. For convenience, the housing 110 is illustrated as being separably coupled to the storing part 113. Here, the housing 110 may be separably coupled to the storing part 113 by various methods such as screw coupling. An outer shape of the housing 110 may be formed in various ways, and various materials may be applied thereto.

Further, the housing 110 forms the through-hole 121a with both open sides.

Also, the passing operation part 120 is disposed inside the housing 110 to guide movement of a fixed amount or a demand amount of the contents held in the storing part 113. Here, "fixed amount" refers to the amount or the number moving differently from each other within the same number or amount and an error range. "Demand amount" is an amount (number) required by a user and belongs to the range of "fixed amount."

Further, the housing 110 has the cover 30 disposed at an upper side. The cover 30 receives contents moving via the passing operation part 120. The cover 30 is separably coupled to the housing 110.

When the housing 110 is a housing of an opening-closing apparatus that allows the storing part 113 of the main body of the contents moving apparatus or the containing apparatus to be opened and closed, the housing 110 may be separably opened and closed at the contents passing side.

The opening-closing apparatus 110 may be formed to have the standby containing part 115 formed therein which is a contents storing part separate from the storing part 113 in the main body of the contents moving apparatus or the containing apparatus, and the cover 30 serves as an opening-closing apparatus cap 30 that is engaged with an upper end of the opening-closing apparatus 110 and finished. The passing operation part 120 provided with the contents passing means 123 may be installed inside the opening-closing apparatus 110 or may be installed inside the storing part 113.

The housing 110 may not be an opening-closing apparatus and may be an element of the contents moving apparatus or the containing apparatus 1 that is integrally configured with the main body of the contents moving apparatus or the containing apparatus or is separated from the main body of the contents moving apparatus or the containing apparatus.

Also, the passing operation part 120 includes the fixing member 121 and the contents passing means 123.

The fixing member 121 is disposed at the inner surface of the through-hole 121a of the housing 110. Therefore, the fixing member 121 partitions the inside of the housing 110, particularly, the through-hole 121a. That is, the through-hole 121a of the housing 110 is divided by the fixing member 121. In other words, the through-hole 121a is divided into the storing part 113 in which contents are stored and the standby containing part 115 in which a fixed amount of contents passed through the storing part 113 stands by to be withdrawn. The storing part 113 is open toward an inside of the storing part 113, and the standby containing part 115 is open toward the cover 30.

Here, the fixing member 121 is disposed at the inside of the through-hole 121a, but a formation position thereof is not limited.

Also, the fixing member 121 has the opening 122 penetrating therethrough. The opening 122 serves to allow withdrawal of the contents by connecting the standby containing part 115 of the housing 110 to the storing part 113. Here, the number and the diameter of the opening 122 are not limited. That is, the passing operation part 120 forms the opening 122 communicating with the before-passing part 113, which corresponds to the storing part 113 and is a space before the contents pass through the passing operation part 120.

Particularly, the opening 122 may have various shapes such as a circular shape and a polygonal shape on a plane and is illustrated as having a quadrangular shape for convenience.

Also, the fixing member 121 may be integrally configured with the housing 110, integrally manufactured with the inside of the housing 110, or separably coupled to the housing 110. Further, the fixing member 121 may be changed to have various other shapes.

When a separate fixing member 121 attached to or protruding from the housing 110 is not present, the inner wall of the housing 110 may form the fixing member 121, and the through-hole 121a inside the housing 110 forms the opening 122.

The contents passing means 123 serves to guide passage of a demand amount of the contents via the opening 122. That is, the contents passing means 123 serves to pass a demand amount or a fixed amount of the contents by coming into contact with the opening 122.

The contents passing means 123 includes the opening member 124, the movement member 125, the movement fixing part 125a, the blocking member 127, and a guide plate member 102.

The movement member 125 movably connects the opening member 124 and the movement fixing part 125a to each other. Here, the movement member 125 is movably bound to the fixing member 121 and is coupled to the opening member 124 to support the opening member 124 to move together. The movement member 125 may have various shapes and a portion thereof may have a protruding shape.

Further, the movement member 125 may be integrally configured with the opening member 124 or disposed to be separable from the opening member 124.

The movement fixing part 125a is disposed at the fixing member 121. Particularly, the movement fixing part 125a is disposed at the fixing member 121 at the opening 122.

Also, the movement fixing part 125a movably connects the movement member 125 or the opening member 124. Therefore, the movement member 125 moves by being interlocked to the opening member 124 opening and closing the opening 122 by a self-weight or pressure of the contents. The movement member 125 may have various shapes but is illustrated as having a cylindrical shape for convenience.

Particularly, the opening member 124 serves to open the opening 122, and a single opening member 124 or a plurality of opening members 124 may be disposed. In the present embodiment, the opening members 124 move with respect to each other on the basis of both inner sides of the opening 122 facing each other and open a central portion of the opening 122. In other words, the opening 122 is opened due to movement of an unfixed free end 124a of the opening member 124 caused by at least one of pressing by the weight of the contents, pushing, contact, shaking of the housing 110, and the self-weight of the opening member 124, and the passing space 112c is formed.

Further, when a pair of opening members 124 and a pair of movement members 125 are present, when the opening member 124 is open, contents may be intensively biased via a side space, which is a portion at which the movement member 125 is not disposed along the edge of the opening 122, or a phenomenon in which the entered contents that fall may occur.

Consequently, a side plate member 104 is disposed at an entry side of the opening 122 at which the movement member 125 is not disposed. The side plate member 104 serves to prevent contents from being concentrated toward the opening member 124 via a portion between the movement members 125 along the edge of the opening 122 or falling after entering. That is, the side plate member 104 serves to guide contents so that a demand amount of the contents is introduced into the opening member 124 along the blocking member 127 and the contents do not fall.

Here, the side plate member 104 may be integrally manufactured with the fixing member 121 at an entry side of the opening 122 or may be separably installed at the fixing member 121. Various shapes and various materials may be applied to the side plate member 104. Further, the number and the size of the side plate member 104 are not limited. For convenience, it is assumed that a pair of side plate members 104 facing each other are present.

Particularly, the movement fixing part 125a may be integrally manufactured with the fixing member 121 at the opening 122 or may be separably installed at the fixing member 121. Various shapes and various materials may be applied to the side plate member 104. Further, the number and the size of the side plate member 104 are not limited. For convenience, it is assumed that a pair of side plate members 104 facing each other are present.

The movement member 125 is movably connected to the fixing member 121 or the side plate members 104. For convenience, the movement member 125 is assumed as being rotatably connected to the side plate members 104. Here, a pair of movement fixing parts 125*a* are disposed at any one side plate member 104 of the side plate members 104 facing each other. Also, each of the movement fixing part 125*a* may have the movement member 125 corresponding thereto movably axially inserted thereinto. Further, the other side of each of the movement fixing parts 125*a* is mounted on the other side plate member 104. Therefore, the movement member 125 and the opening member 124 move together on the basis of the movement fixing parts 125*a*, or only the opening member 124 solely moves on the basis of the movement fixing parts 125*a*. By this, the opening member 124 opens or closes the opening 122.

Alternatively, the movement fixing part 125*a* may be disposed at the movement member 125 and be axially inserted into the side plate member 104.

In the initial state in which the contents moving apparatus or the containing apparatus 1 is upright or contents do not pass therethrough, the opening member 124 should maintain a state of blocking the opening 122. That is, the pair of opening members 124 should remain located on the same plane. Therefore, the support block 302 configured to support the opening member 124 from a lower side is formed to stop movement of the opening member 124. The support block 302 serves to prevent the opening member 124 from arbitrarily moving downward from the initial state by supporting the opening member 124. Here, the support block 302 protrudes from the side plate member 104.

Further, when the contents moving apparatus, the containing apparatus 1 or the passing operation part 120 is tilted or oppositely upright and have contents passing therethrough, the opening member 124 is tilted back and opens the opening 122. Here, when the opening member 124 is tilted back too much, the opening member 124 does not return to the initial state or restoration responsiveness decreases when the contents moving apparatus or the containing apparatus 1 is made to stand upright as in the initial state. Therefore, a tilt-back angle of each of the opening members 124 for opening the opening 122 should be limited. That is, a rotation amount of the movement member 125 for opening the opening 122 should be limited by the opening member 124.

The blocking member 127 is disposed to be interlocked to the opening member 124. Therefore, the blocking member 127 moves by being interlocked to the opening member 124 corresponding thereto.

That is, the blocking member 127 is disposed at a circumferential surface of the movement member 125. Also, when the opening member 124 is blocking the opening 122 so that contents cannot pass therethrough or only a portion of the contents can pass therethrough, the blocking member 127 remains to be opened so that contents are introduced intoward the opening member 124. Conversely, when the opening member 124 is opening the opening 122, the blocking member 127 serves to block the opening 122 so that contents cannot pass therethrough or only a portion of the contents can pass therethrough to prevent more contents from completely passing through the opening 122. The blocking member 127 may be integrally manufactured with the movement member 125 and may have various sizes and shapes.

Also, each of the movement members 125 may include the guide plate member 102. The guide plate member 102 is located between the opening member 124 and the blocking member 127 along the circumferential surface of each of the movement members 125. Also, a length of the guide plate member 102 is formed shorter than the length of the opening member 124. Therefore, while the opening member 124 is blocking the opening 122, the guide plate member 102 is rotated by a pressing or colliding force of the contents due to tilting of the storing part 113 or the passing operation part 120, so that opening responsiveness of the opening member 124 is improved. Also, by a small amount of contents moving to the opening member 124 via a portion between guide plate members 102 facing each other, a fixed amount of the contents can pass.

The movement guide part 130 is disposed at the inside of the storing part 113 or the housing 110. For convenience, the movement guide part 130 is assumed as having a plate shape and being disposed inside the housing 110. Also, the movement guide part 130 has the guide hole 132 corresponding to the opening 122 penetrating therethrough. Particularly, when the storing part 113 or the passing movement part 120 is tilted for passage of contents, the movement guide part 130 serves to guide contents in the storing part 113 to intensively move to an inside between the blocking members 127 that are stood upright along an inclined trajectory.

Here, the movement guide part 130 has an edge member 136 extending along an edge thereof. An upper circumferential surface of the storing part 113 is inserted into the edge member 136. That is, the edge member 136 is assembled to the upper circumferential surface of the storing part 113. The edge member 136 may be screw-coupled to the storing part 113. Consequently, by the edge member 136 being separably coupled to the storing part 113, the storing part 113 may facilitate a task of supplementing contents after the edge member 136 is removed. Also, the housing 110 is fitted and assembled so that the lower side comes into contact with an outer circumferential surface of the edge member 136. Therefore, the movement guide part 130 is located at the inside of the housing 110.

Further, the movement guide part 130 has the inclined surface 134 formed so that contents stored in the storing part 113 are concentrated to the guide hole 132. Also, the movement guide part 130 is arranged to be spaced a predetermined distance apart from the blocking member 127 to prevent interfering with rotation of the blocking member 127. Also, the movement guide part 130 is arranged in the vicinity of the blocking member 127 so that contents passed through the guide hole 132 pass through the opening 122 when the opening 122 is not blocked by the blocking member 127, and contents do not pass through the guide hole 132 when the blocking member 127 rotates and blocks the opening 122 so that contents cannot pass therethrough or only a portion of the contents can pass therethrough. That is, the movement guide part 130 is located in the vicinity of the blocking member 127 which is upright and the side plate member 104 to prevent contents from passing through the opening 122 and falling via a portion between the movement guide part 130 and the fixing member 121.

The housing 110 includes the cover 30 to prevent contents passed through the opening 122 of the fixing member 121 from passing to the outside of the contents moving apparatus or the containing apparatus. A user takes out contents moved to a space of the standby containing part 115 by the cover 30 by opening the cover 30. The cover 30 is openably and closably formed at the housing 110 using various methods, and may be opened and closed by being hinge-connected to the housing 110 or may be opened and closed by being completely separated from the housing 110. The cover 30 may have various shapes.

Also, the housing 110 may be formed in a state in which one open side is substantially sealed by opening and closing of the cover 30 or may be formed to be in an unsealed state by including only the receiving part 181 without the cover 30. The cover 30 may be disposed to be able to open and close one open side of the housing 110 and may be formed in various ways.

Also, as described above, the passing operation part 120 includes the fixing member 121 and the contents passing means 123.

Particularly, the passing operation part 120 includes the contents passing means 123 configured to guide passage of contents to the outside of the storing part 113 by opening due to movement.

The dispensing device 100 includes the receiving part 181, separate from the contents passing means 123. The receiving part 181 resists introduction of more than a necessary demand amount of contents passed through the contents passing means 123 into the standby containing part 115 so that, as a result, an amount of remaining contents is a demand amount required by a user.

When the housing 110 is a housing of the opening-closing apparatus 110 of the main body of the contents moving apparatus or the containing apparatus, the opening-closing apparatus 110 may be separably coupled to the contents passing side of the storing part 113 and may open and close the storing part 113 of the main body of the contents moving apparatus or the containing apparatus.

The opening-closing apparatus 110 has the standby containing part 115 configured to contain contents formed therein to divide and contain contents stored in the contents moving apparatus or the containing apparatus 1 so that a user can use the contents.

The cover 30 serves as an opening-closing apparatus cap 30 that is engaged with an upper end of the opening-closing apparatus 110 and finished. The passing operation part 120 provided with the contents passing means 123 may be installed inside the opening-closing apparatus 110 or may be installed inside the storing part 113.

The housing 110 may have no function of an opening-closing apparatus and may be an element of the contents moving apparatus or the containing apparatus 1 that is integrally configured with the main body of the contents moving apparatus or the containing apparatus or is separated from the main body of the contents moving apparatus or the containing apparatus.

The receiving part 181 includes a resistive upper plate member 182 and a resistive side plate member 183 and may include a partitioning member 184, a blocking member 185, an introducing member 186, a standby step 187, and a standby part 188 which will be described below in description of a fifteenth embodiment.

Contents come into contact with one or more of the resistive upper plate member 182 and the resistive side plate member 183 included in the receiving part 181, and a remaining amount of contents passed through the opening 122 is limited.

The resistive upper plate member 182 may be disposed in the housing 110, and the resistive side plate member 183 may be disposed in the housing 110, the resistive upper plate member 182, the fixing member 121, or the cover 30.

Particularly, although the resistive side plate member 183 may be formed at a surface of the fixing member 121 facing the passing direction of contents, when the cover 30 which is opened is disposed, the resistive side plate member 183 may be formed at the cover 30 to move together with the cover 30 when the cover 30 is opened to not interfere with contents being picked up.

The resistive upper plate member 182 and the resistive side plate member 183 may be changed to have various other shapes in the passing direction of contents and a side direction of passing.

Further, as described above, the contents passing means 123 includes the opening member 124, the movement member 125, the movement fixing part 125a, the blocking member 127, and the guide plate member 102.

Also, the movement guide part 130 is disposed at the inside of the storing part 113 or the housing 110. For convenience, the movement guide part 130 is assumed as having a plate shape and being disposed inside the housing 110. Also, the movement guide part 130 includes the inclined surface 134 so that contents stored in the storing part 113 are concentrated to the guide hole 132. The movement guide part 130 is arranged to be spaced a predetermined distance from the blocking member 127 to not interfere with rotation of the blocking member 127. Also, the movement guide part 130 is arranged in the vicinity of the blocking member 127 so that contents passed through the guide hole 132 pass through the opening 122 when the opening 122 is not blocked by the blocking member 127, and contents do not pass through the guide hole 132 when the blocking member 127 rotates and blocks the opening 122 so that contents cannot pass therethrough or only a portion of the contents can pass therethrough. That is, the movement guide part 130 is located in the vicinity of the blocking member 127 which is upright and the side plate member 104 to prevent contents from passing through the opening 122 and falling via the portion between the movement guide part 130 and the fixing member 121.

In the initial state in which the contents moving apparatus or the containing apparatus 1 is upright or contents do not pass therethrough, the opening member 124 should maintain a state of blocking the opening 122. That is, the pair of opening members 124 should remain located on the same plane. Therefore, the support block 302 is formed at the inner surface of the side plate member 104 or the opening 122 to support the opening member 124 from the lower side. The support block 302 serves to prevent the opening member 124 from arbitrarily moving downward from the initial state by supporting each of the opening members 124. Here, the support block 302 protrudes from the side plate member 104.

Further, when the contents moving apparatus, the containing apparatus 1 or the passing operation part 120 is tilted or oppositely upright and have contents passing therethrough, the opening member 124 is tilted back and opens the opening 122. Here, when the opening member 124 is tilted back too much, the opening member 124 does not return to the initial state or restoration responsiveness decreases when the contents moving apparatus or the containing apparatus 1 is made to stand upright as in the initial state. Therefore, a tilt-back angle of each of the opening members 124 for opening the opening 122 should be limited. That is, a size of the opening 122 is adjusted so that the opening member 124 is tilted back by moving within an acute angle range with respect to the fixing member 121. In other words, the opening member 124 moves from the support block 302 by an acute angle to open the opening 122, comes into contact with the fixing member 121 corresponding to the edge of the opening 122, and stops.

Accordingly, when the storing part 113 is made to stand upright as in the initial state, responsiveness in which the blocking member 127 blocking the opening 122 returns to the initial state due to the self-weight is improved. Particularly, the movement member 125 rotates until the opening member 124 comes into contact with the support block 302.

Particularly, when the storing part 113 is flipped or tilted, contents move to (are introduced into) the standby containing part 115 after passing through the passing space 112c of the fixing member 121. Here, because the inner space of the standby containing part 115 is wider than the passing space 112c, a large amount of contents may be introduced into the standby containing part 115. To prevent such a phenomenon, the standby containing part 115 includes the receiving part 181 to correspond to the passing space 112c.

The receiving part 181 is formed to be open toward the passing space 112c, and contents passing through the passing space 112c are intensively introduced thereinto. Accordingly, excessive introduction of contents is prevented due to the narrowed inner space of the receiving part 181. The receiving part 181 may be changed to have various other shapes.

Hereinafter, an effect of the contents moving apparatus or the containing apparatus having the dispensing device according to the tenth embodiment of the present invention will be described.

When a user makes the storing part 113 to be in a use state by tilting the storing part 113 or making the storing part 113 to be oppositely upright, the contents inside the storing part 113 pass through the guide hole 132 along the inclined surface 134 of the movement guide part 130 of the housing 110 and come into contact with the guide plate member 102 and the opening member 124.

Here, the opening member 124 is blocking the opening 122 of the fixing member 121, the blocking member 127 is opening the opening 122, and the guide plate member 102 is located between the opening member 124 and the blocking member 127.

Only a certain amount (certain number) of contents moves toward the opening member 124 via the portion between the guide plate members 102 by ends of the contents colliding with or pressing the guide plate members 102 whose ends are spaced a predetermined distance apart from each other. Particularly, because the contents first push the guide plate member 102, opening responsiveness of the opening member 124 is improved.

When the certain amount of contents press the guide plate member 102 and the opening member 124, the opening member 124 is tilted back, and the opening 122 is opened.

Here, the restoring member 304 elastically resists the fixing member 121, the movement member 125 rotates in one direction, and the opening member 124 opens the opening 122.

Particularly, in a state in which the blocking member 127 has received contents by being open, the opening member 124 opens the opening 122 by being interlocked to the blocking member 127 being closed so that contents cannot pass therethrough or only a portion of the contents can pass therethrough. Therefore, passage of more contents via the opening 122 is prevented.

When a user makes the storing part 113 upright as in the initial state, the blocking member 127 blocking the opening 122 returns to the initial state due to the self-weight. Alternatively, even when the user does not make the storing part 113 upright, the opening member 124 rotates in the other direction together with the movement member 125 by elastic restoration of the restoring member 304 and returns to its initial position. Particularly, the movement member 125 rotates in the other direction until the opening member 124 comes into contact with the support block 302. Various configurations and shapes may be applied for the elastic restoration of the restoring member 304.

By adjusting a center of gravity using the movement control member 123a described above in the fifth embodiment, a return position of the initial state due to the self-weight of the opening member 124 or the blocking member 127 may be changed.

The user may receive contents passed through the contents moving apparatus or the containing apparatus, observe the contents passed through the contents moving apparatus or the containing apparatus, and take out the contents by opening the cover 30.

Refer to the above description for undescribed reference numerals.

Figure 47:
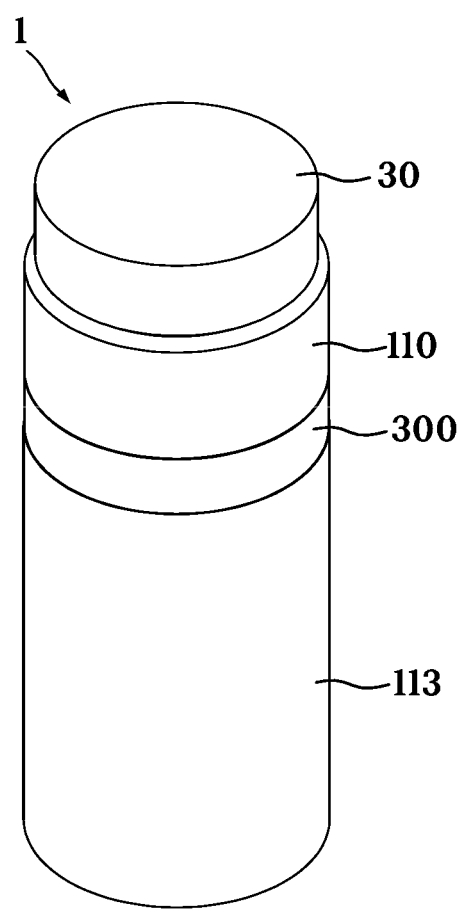
FIG. 47 is a perspective view of a containing apparatus or a contents moving apparatus including a dispensing device according to an eleventh embodiment of the present invention.
Figure 48:
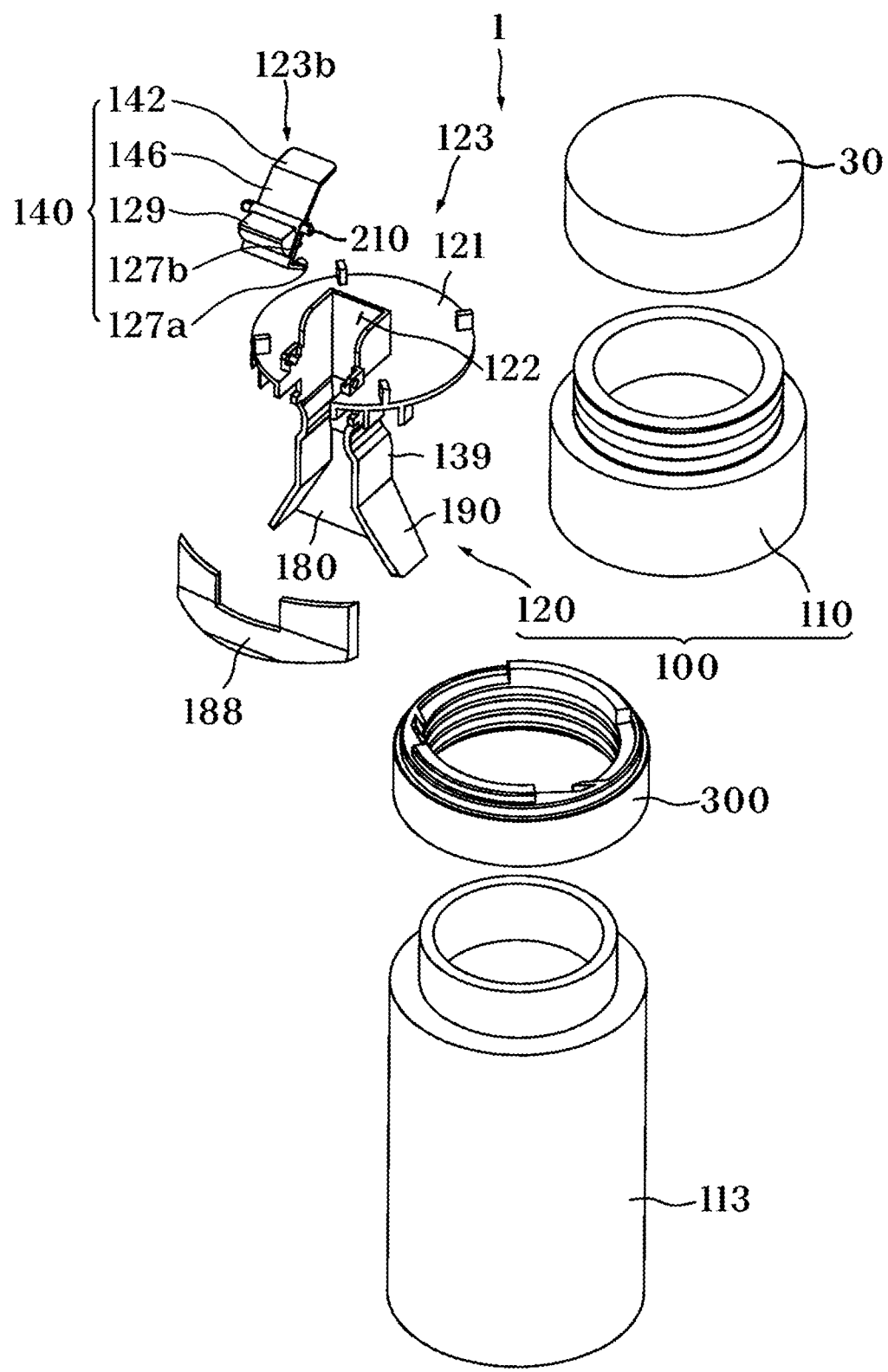
FIG. 48 is an exploded perspective view of the containing apparatus or the contents moving apparatus including the dispensing device according to the eleventh embodiment of the present invention.
Figure 49:
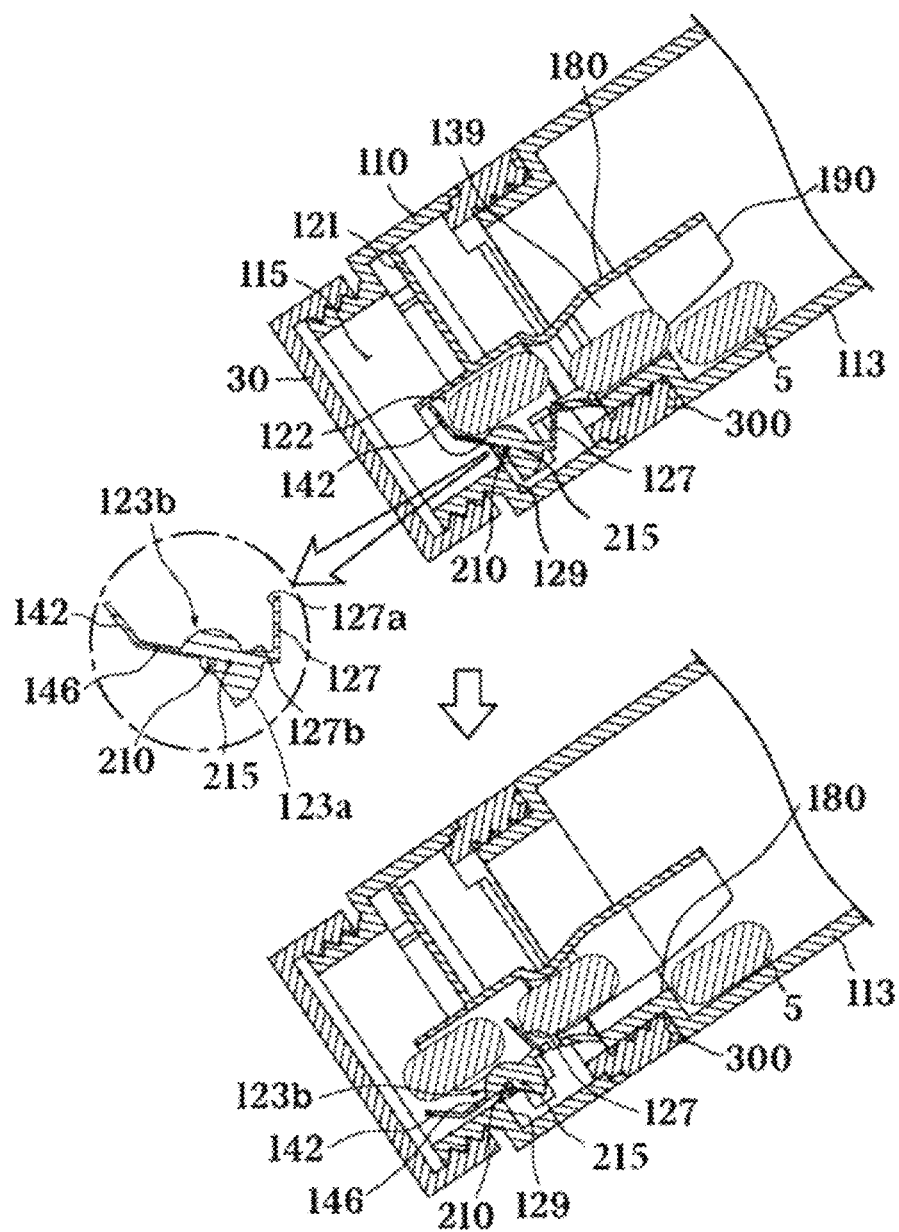
FIG. 49 is a cross-sectional view illustrating a use state of the containing apparatus or the contents moving apparatus including the dispensing device according to the eleventh embodiment of the present invention.

FIG. 47 is a perspective view of a containing apparatus or a contents moving apparatus including a dispensing device according to an eleventh embodiment of the present invention, FIG. 48 is an exploded perspective view of the containing apparatus or the contents moving apparatus including the dispensing device according to the eleventh embodiment of the present invention, and FIG. 49 is a cross-sectional view illustrating a use state of the containing apparatus or the contents moving apparatus including the dispensing device according to the eleventh embodiment of the present invention.

As in FIGS. 47 to 49, a contents moving apparatus or the containing apparatus 1 having a dispensing device according to the eleventh embodiment of the present invention includes the housing 110, the passing operation part 120, and a main body 113.

The housing may be an element of the contents moving apparatus or the containing apparatus 1 that is integrally configured with the main body of the contents moving apparatus or the containing apparatus or is separated from the main body of the contents moving apparatus or the containing apparatus.

In the present embodiment, the housing 110 is an element of the dispensing device 100, and the dispensing device 100 includes the passing operation part 120 and the housing 110 which is separable from an apparatus main body 113.

Here, the passing operation part 120 includes the fixing member 121, the contents passing means 123, the movement guide part 180, and the guide member 190.

The fixing member 121 is disposed at the inside of the housing 110. Here, a formation position of the fixing member 121 in the housing 110 is not limited.

Also, the housing 110 may be formed in a cylindrical shape with both open sides, coupled to a connector 300, and coupled to the storing part 113 configured to hold and store the content 5.

Particularly, the passing operation part 120 is coupled to the connector 300 and fixed. The passing operation part 120 may be coupled to the connector 300 using various methods.

Here, because the connector 300 provided with the passing operation part 120 is disposed to be compatible with various storing parts 113, a user may increase usability of the dispensing device 100 by replacing only the connector 300 or both the connector 300 and the housing 110.

The housing 100 may be integrally formed with the connector 300 and directly coupled to the storing part 113.

Also, the fixing member 121 has the opening 122 penetrating therethrough. The opening 122 serves to allow withdrawal of the content 5 by connecting the receiving part 115 of the housing 110 to the storing part 113.

Also, the contents passing means 123 serves to move a single content 5 (one pill) or a set amount of the content 5 at a time toward the receiving part 115 and is disposed at the inside of the opening 122 and the movement guide part 180.

Further, the movement guide part 180 serves to guide movement of the content 5 when the housing 110 or the passing operation part 120 is tilted.

Here, the movement guide part 180 serves to guide movement of the content 5 by guiding along a surface of the movement guide part 180 due to a self-weight or an inertia of the content 5 while the movement guide part 180 is tilted. Although the movement guide part 180 may be fixed in contact with the inner surface of the housing 110, the movement guide part 180 extends from the fixing member 121 to correspond to the opening 122.

Particularly, the movement guide part 180 may be the inner surface itself of the housing 110 or may be a separate guide member disposed inside the housing 110.

The movement guide part 180 may be changed to have various other shapes.

Also, the guide member 190 extends from the movement guide part 180 to allow the content 5 stored in the storing part 113 to intensively move toward the opening 122. Here, the guide member 190 may be formed in various other shapes.

The contents passing means 123 includes the passing movement part 140.

The passing movement part 140 is movably connected to the fixing member 121 corresponding to the inner surface of the opening 122 and serves to allow withdrawal of the content 5 by opening the opening 122 and block the withdrawal of the content 5 by blocking the opening 122.

Particularly, the passing movement part 140 moves due to one or more of tilting of the housing 110 or the passing operation part 120, a self-weight, a self-weight of the content 5, and a pressing force and inertia of the content 5. That is, when the housing 110 or the passing operation part 120 is tilted or is oppositely stood upright, the passing movement part 140 moves due to the self-weight and the pressing force of the content 5 to be withdrawn and opens the opening 122.

Also, the passing movement part 140 includes one or more of the opening member 142, the containing member 127a, a bottom part 146, the movement control member 123a, the movement increase control member 123c, and the stopper 129.

Particularly, the opening member 142 serves to open the opening 122, and a single opening member 142 or a plurality of opening members 142 may be provided.

The opening member 142 serves to open or close the opening 122 by a self-weight and a pressing force of the content 5. In other words, the opening member 142 moves in the same direction as the contents 5 passing through the opening 122 and serves to allow passage of the content 5.

Also, the containing member 127a extends from the opening member 142, moves in the same direction as the opening member 142, and serves to contain a fixed amount of the content 5 by being interlocked to the opening member 142. The containing member 127a may be changed to have various other shapes.

When the housing 110 or the passing operation part 120 is tilted, the content 5 in the storing part 113 passes through the containing member 127a by being interlocked to movement of the opening member 142 and the containing member 127a in one direction.

Also, the containing member 127a may move further to block introduction of a following content 5, a leading content 5 may pass through the opening member 142, or the content 5 located on the opening member 142 may be taken out.

Conversely, when the housing 110 is stood upright as in the initial state, the opening member 142 and the containing member 127a move in the other direction, and the opening member 142 blocks the opening 122.

Further, the bottom part 146 is formed between the opening member 142 and the containing member 127a to contain the content 5 passing through the containing member 127a and serves to support a lower portion of the content 5 in the passing movement part 140. Accordingly, the bottom part 146 may connect the containing member 127a and the opening member 142 and may be formed in the shape of a flat plate.

Particularly, the bottom part 146 has a length capable of accommodating the longitudinal length of the content 5.

Also, the stopper 129 serves to limit an angle of rotation of the opening member 142. By extending from a center of rotation of the passing movement part 140 and being locked to the movement guide part 180, the guide member 190, or the inner surface of the housing 110, the stopper 129 prevents the opening member 142 from moving further after the opening 122 is completely opened.

The stopper 129 may be changed to have various other shapes.

The dispensing device includes the passing operation part 120 configured to guide movement of contents, and the passing operation part 120 includes the contents passing means 123 that allows the contents to move. The contents passing means 123 includes the passing movement part 140 configured to form a passing space of contents by movement.

The passing movement part 140 includes the opening member 142 moving in the same direction as the contents passing through the opening 122 and configured to allow passage of the contents. The opening member 142 may move to be opened due to a self-weight or a pressing force of the contents and guide passage of the contents via a passing space formed due to the opening of the passing movement part. When the passing operation part 120 is tilted and rotation is about to happen due to the self-weight of the opening member 142, the rotation of the opening member 142 may be restrained by weights and positions of centers of gravity of two or more of the opening member 142, the blocking member 127, and the movement member 125 so that blockage of passage of the contents is prevented before a demand amount of the contents passes, and the opening member 142 rotates together with the passage of the contents. Here, the passing movement part 140 includes the balancing part 123b configured to maintain balance by preventing the passing movement part 140 from tilting more than the slope of the contents moving apparatus or the containing apparatus 1 when the contents moving apparatus or the containing apparatus 1 is tilted. Particularly, the movement control member 123a may be included in the passing movement part 140 to balance the center of gravity of the passing movement part 140.

The movement member 125 may include or be connected to the containing member 127a or the movement control member 123a.

The movement guide part 180 configured to guide movement of contents when the passing operation part 120 is tilted is included, and the contents may move over the inclined surface in the direction of gravity of the movement guide part 180 due to the self-weight or inertia of the contents.

The passing movement part 140 moves corresponding to movement of contents due to gravity action and opens the passing operation part 120 so that the contents pass therethrough. The passing movement part 140 may move due to one or more of a self-weight of the passing movement part 140, an inertia of the passing movement part 140, and a force of the contents pressing the passing movement part 140 when the passing operation part 120 is tilted or moves.

Rotation of the passing movement part 140 that allows the contents to pass therethrough may be performed by gravitational motion of the contents due to tilting, flipping, or shaking of the passing operation part 120 or transmission of movement force of the contents to the passing movement part 140.

The rotation of the passing movement part 140 may be performed by movement force caused by the contents pressing the contents pressing means 123 by the self-weight of the contents.

The passing movement part 140 may include the blocking member 127.

The blocking member 127, separate from the opening member 142, is near the passing passage part 139 or the fixing member 121 to block an opening side of the movement guide part 180 to allow a fixed amount or a set amount of the content 5 to move toward the opening 122 or prevent excess content 5 beyond the set amount from being withdrawn at a time.

Consequently, by the rotation of the passing movement part 140, passage of excess contents beyond the necessary amount of contents may be prevented after the contents pass through the passing movement part 140.

In the passing movement part 140, the position of the movement part center-of-gravity 215 of the passing movement part 140 and the position of the movement part center-of-rotation 210 of the passing movement part 140 may be different from each other. When the position of the movement part center-of-gravity 215 of the passing movement part 140 is disposed in the opposite direction of the external passing direction of the dispensing device, which is behind the position of the movement part center-of-rotation 210 of the passing movement part 140, and the passing operation part 120 is tilted or shaken, rotation of the passing movement part 140 may be restrained or delayed due to a difference between the position of the movement part center-of-gravity 215 and the position of the movement part center-of-rotation 210.

Consequently, when the passing operation part 120 is tilted or shaken, the passing movement part 140 may not perform rotation which results in opening the opening 122 so that contents may pass therethrough or rotation of the passing movement part 140 may be suppressed by the self-weight of only the passing movement part 140. Before the contents resist the passing movement part 140 and open the opening 122, the passing movement part 140 may not open the opening 122 to the extent in which contents may pass therethrough by the self-weight of the passing movement part 140.

In this way, deformation of the contents passing means 123 that occurs when at least a portion of a constituent member of the contents passing means 123 rotates and is deformed may be prevented from occurring before contact with contents or may be delayed until a close time point before the contact by the self-weight and the movement part center-of-gravity 215 of the passing movement part 140.

Consequently, the deformation of the contents passing means 123 may not occur before contact with the contents due to the self-weight of the contents and may occur as rotation due to the self-weight of the passing movement part 140 occurs together with the contact with the contents due to the self-weight of the contents.

The position of the balancing part 123b or the movement part center-of-gravity 215 of the passing movement part 140 may be set using the shape and size of the balancing part 123b when all constituent members of the balancing part 123b or the passing movement part 140 are manufactured with materials having the same density, and the position of the balancing part 123b or the movement part center-of-gravity 215 of the passing movement part 140 may be set using the shape and size of the balancing part 123b and density configuration thereof when one or more of the constituent members of the balancing part 123b or the passing movement part 140 are manufactured with materials having a different density.

The containing member 127a moves in the same direction as the opening member 142 and contains a demand amount of contents and moves by being interlocked to the opening member 142.

The passing movement part 140 includes the bottom part 146 for containing contents, and the bottom part 146 may support a lower portion in the direction of gravity of contents in the passing movement part 140.

Deformation of the contents passing means 123 may operate in the opening direction of the dispensing device 100, and the contents passing means 123 may guide passage of the contents in a direction of opening thereof by a passing space formed due to the deformation of the contents passing means 123 in an open state or a state in which there is no opening-closing apparatus or the cover 30 and the housing 110 provided with the contents passing means 123 is allowed to be opened or closed at the passing operation part 120 of the housing 110.

The contents passing means 123 may guide passage of contents by the deformation of the contents passing means 123 due to resistance with the contents without coming into contact with or being resisted by an opening-closing apparatus at the passing operation part 120 of the housing 110 provided with the contents passing means or a member fixed to the opening-closing apparatus.

The contents passing means 123 may guide passage of contents while the housing 110 provided with the contents passing means 123 is open in the contents passing direction of the contents passing means 123.

Contents may pass through the contents passing means 123 just by tilting, flipping, or shaking of the passing operation part 120 provided with the contents passing means 123.

Contents may pass through the contents passing means 123 by rotation and deformation of the contents passing means 123. Passage of the excess contents beyond necessary contents may be blocked by rotation and deformation of the contents passing means 123. The rotation and deformation of the contents passing means 123 can be performed just by the passing operation part 120 being tilted, flipped, or shaken. The rotation and deformation of the contents passing means 123 may be performed by the contents passing means 123 being pressed due to the self-weight of the contents.

Deformation of the contents passing means 123 may be deformation due to movement of a movement part.

The contents may pass through the contents passing means 123 by sliding in contact with a surface disposed in the housing 110 or the passing means.

When the passing operation part 120 is tilted or shaken, the contents passing means 123 may rotate in the direction of gravity about a hinge shaft of the passing operation part 120 due to the self-weight of the contents passing means 123 or a self-weight of at least one portion of the passing operation part 120 connected to the contents passing means 123, and the contents passing means 123 that moved in the direction of gravity may form a passing space of contents.

When the contents passing means 123 rotates about the shaft of the housing 110, rotation of the contents passing means 123 may be performed in contact with the inner surface of the housing 110 or may be performed in contact with the shaft member of the movement fixing part 125a.

The passing passage part 139 may have the shape that resists to prevent the excess contents beyond the demand amount from completely passing through the passing passage part 139 when contents beyond the demand amount enter the passing passage part 139.

The passing passage part 139 may have a resistive member or a resistive shape that resists to prevent the excess contents beyond the demand amount or the entire contents including the demand amount from passing through the passing passage part 139 when contents beyond the demand amount enter the passing passage part 139, and may prevent the contents beyond the demand amount from passing through the contents passing means 123. The resistive member or the resistive shape of the passing passage part 139 may come into contact with or resist the contents that enter the passing passage part 139 to interfere with passage of contents beyond the demand amount.

The opening member 142 may be rotatably provided, and the contents passing means 123 may open and close the opening 122 by deformation of the contents passing means 123.

Contents passed by the contents passing means 123 may be at least one of solid, powder, and liquid contents. The solid may be at least one of a solid medicine, a food, an apparatus, a tool, a material, a food material, an industrial material, and a general material, and the power may be at least one of a powder medicine, a food, an apparatus, a tool, a material, a food material, an industrial material, and a general material.

Refer to the above description for undescribed reference numerals.

Figure 50:
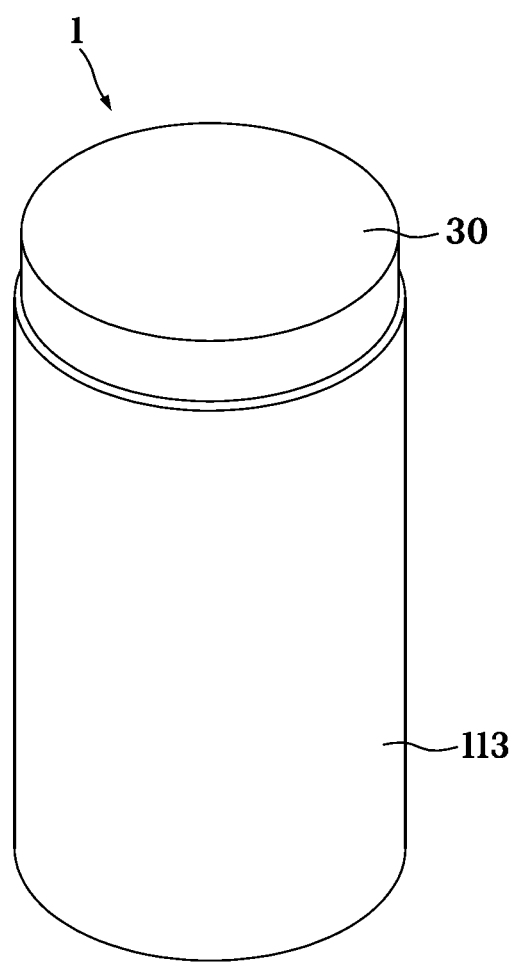
FIG. 50 is a perspective view of a containing apparatus or a contents moving apparatus including a dispensing device according to a twelfth embodiment of the present invention.
Figure 51:
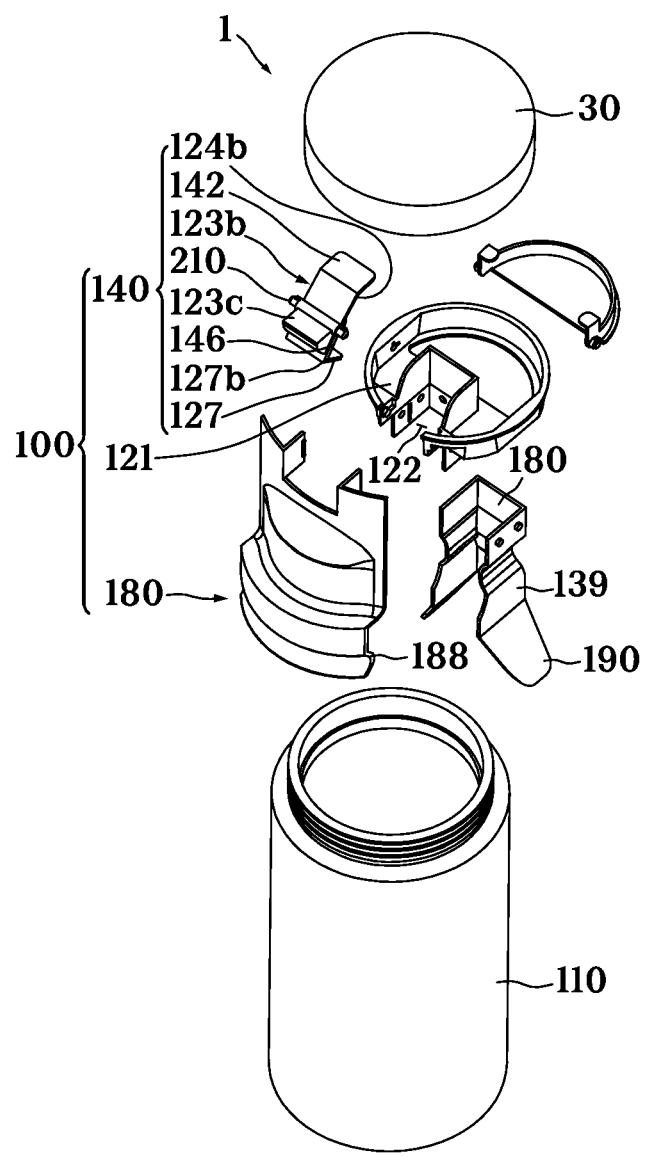
FIG. 51 is an exploded perspective view of the containing apparatus or the contents moving apparatus including the dispensing device according to the twelfth embodiment of the present invention.
Figure 52:
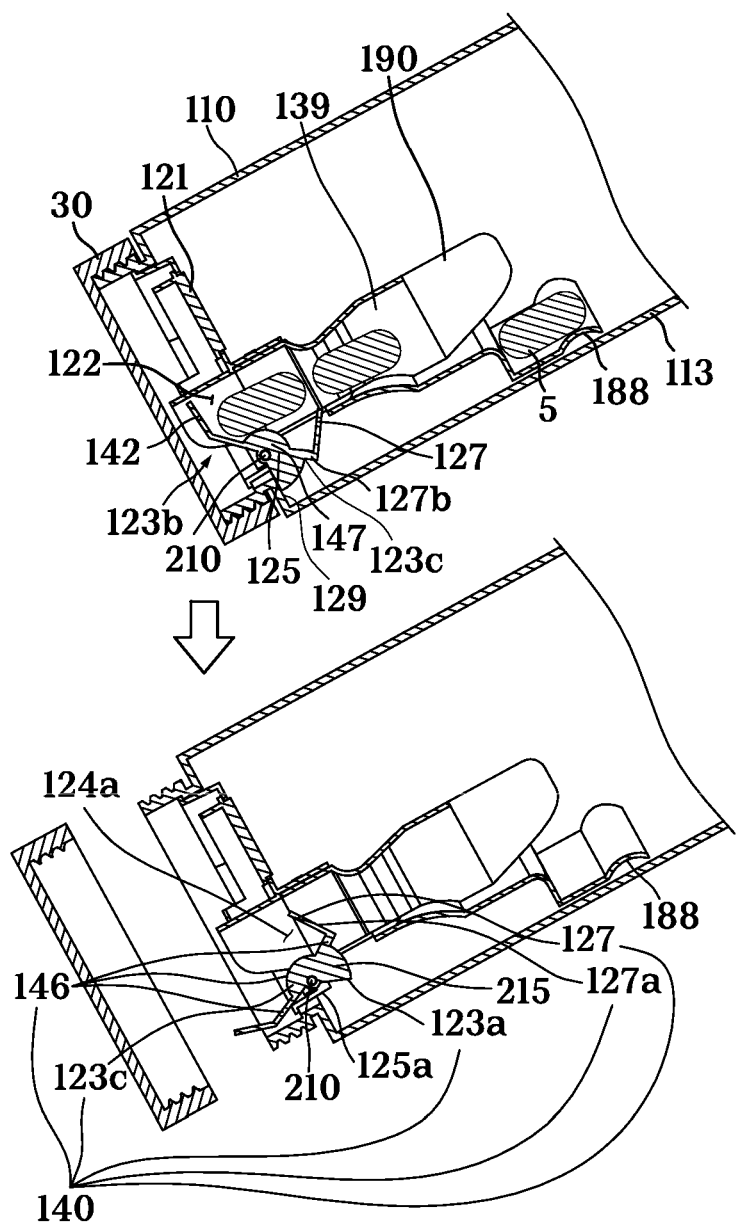
FIG. 52 is a cross-sectional view illustrating a use state of the containing apparatus or the contents moving apparatus including the dispensing device according to the twelfth embodiment of the present invention.

FIG. 50 is a perspective view of a containing apparatus or a contents moving apparatus including a dispensing device according to a twelfth embodiment of the present invention, FIG. 51 is an exploded perspective view of the containing apparatus or the contents moving apparatus including the dispensing device according to the twelfth embodiment of the present invention, and FIG. 52 is a cross-sectional view illustrating a use state of the containing apparatus or the contents moving apparatus including the dispensing device according to the twelfth embodiment of the present invention.

As in FIGS. 50 to 52, the contents moving apparatus or the containing apparatus 1 having a dispensing device according to the twelfth embodiment of the present invention includes the housing 110 and the passing operation part 120.

Refer to the above description for descriptions of the housing 110 and the passing operation part 120.

Here, the passing operation part 120 includes the fixing member 121, the contents passing means 123, the movement guide part 180, and the guide member 190.

Refer to the above description for descriptions of the fixing member 121, the contents passing means 123, the movement guide part 180, and the guide member 190.

The contents passing means 123 includes the passing movement part 140.

Refer to the above description for description of the passing movement part 140.

Particularly, the passing movement part 140 includes one or more of the opening member 142, the containing member 127a, the bottom part 146, the movement control member 123a, the movement increase control member 123c, and the stopper 129. Refer to the above description for descriptions of the opening member 142, the containing member 127a, the bottom part 146, and the stopper 129.

A position of contents which are currently passing and moving may be lifted in the opposite direction of the direction of gravity by the bottom-height changing member 147, which is a lifted or protruding portion of the bottom part 146 of the movement member 125. Here, due to the narrowed space of the opening 122, passage of contents beyond a containable amount may be prevented from passing through the passing movement part 140.

As in the present embodiment, in the case in which the passing movement part 140 includes the bottom-height changing member 147 and the bottom part 146 is formed in a protruding shape such as a curved surface, when contents move in contact with a surface of the bottom-height changing member 147, the bottom-height changing member 147 moves in the moving direction of the contents along the bottom part 146 due to resistance caused by the self-weight of the contents, the center of gravity of the balancing part 123b may be biased in the passing direction of the contents, and the passing movement part 140 may increase a force of the passing movement part 140 moving in the passing direction of the contents.

The position of the balancing part 123b or the movement part center-of-gravity 215 of the passing movement part 140 may be set using the shape and size of the balancing part 123b when all constituent members of the balancing part 123b or the passing movement part 140 are manufactured with materials having the same density, and the position of the balancing part 123b or the movement part center-of-gravity 215 of the passing movement part 140 may be set using the shape and size of the balancing part 123b and density configuration thereof when one or more of the constituent members of the balancing part 123b or the passing movement part 140 are manufactured with materials having a different density.

Here, the bottom-height changing member 147 is the movement increase control member 123c configured to increase movement of the passing movement part 140 in the passing direction of contents and may allow contents to promptly pass through the passing operation part 120.

The bottom-height changing member 147 may have various friction materials or a curved shape.

Also, the movement guide part 180 has a height guiding member 188 formed at an entry side for the content 5. The height guiding member 188 divides a height difference generated during movement of the contents to the contents passing means 123 into a plurality of stages or configures the height difference as an inclined surface to prevent the height difference from blocking movement of contents and guide movement of the contents so that contents in the storing part 113 are guided to be stably moved to the passing passage part 139. The height guiding member 188 may be changed to have various other shapes.

Refer to the above description for undescribed reference numerals.

Figure 53:
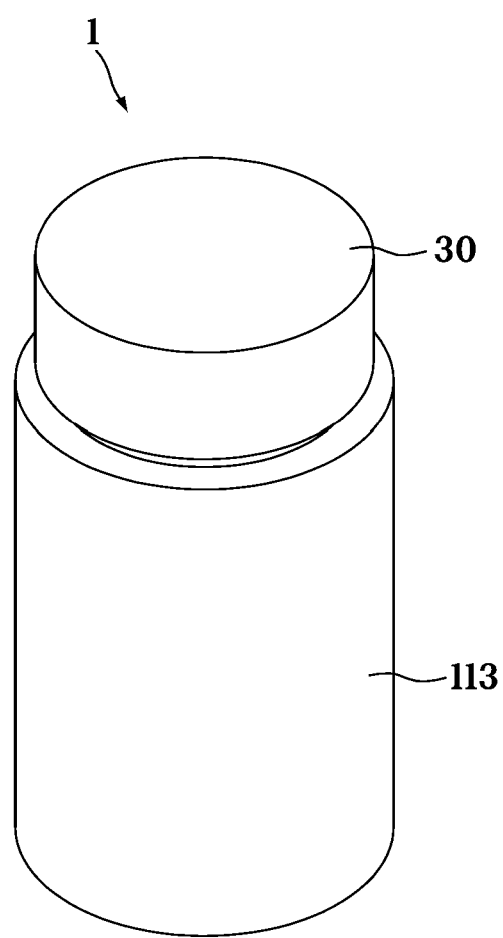
FIG. 53 is a perspective view of a containing apparatus or a contents moving apparatus including a dispensing device according to a thirteenth embodiment of the present invention.
Figure 54:
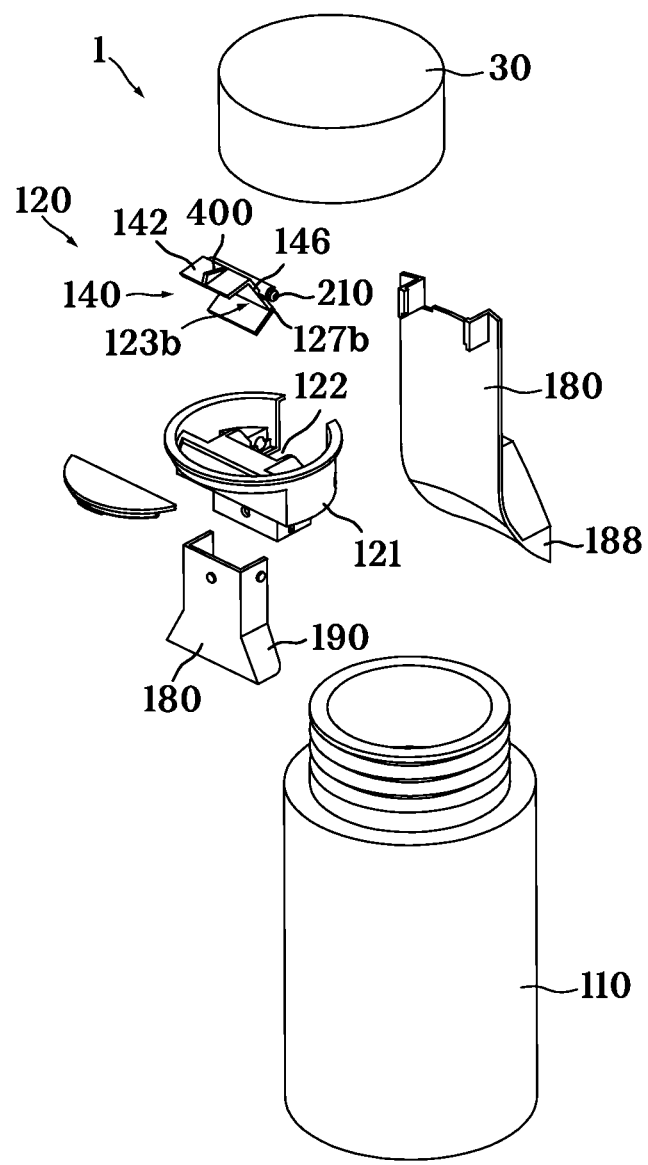
FIG. 54 is an exploded perspective view of the containing apparatus or the contents moving apparatus including the dispensing device according to the thirteenth embodiment of the present invention.
Figure 55:
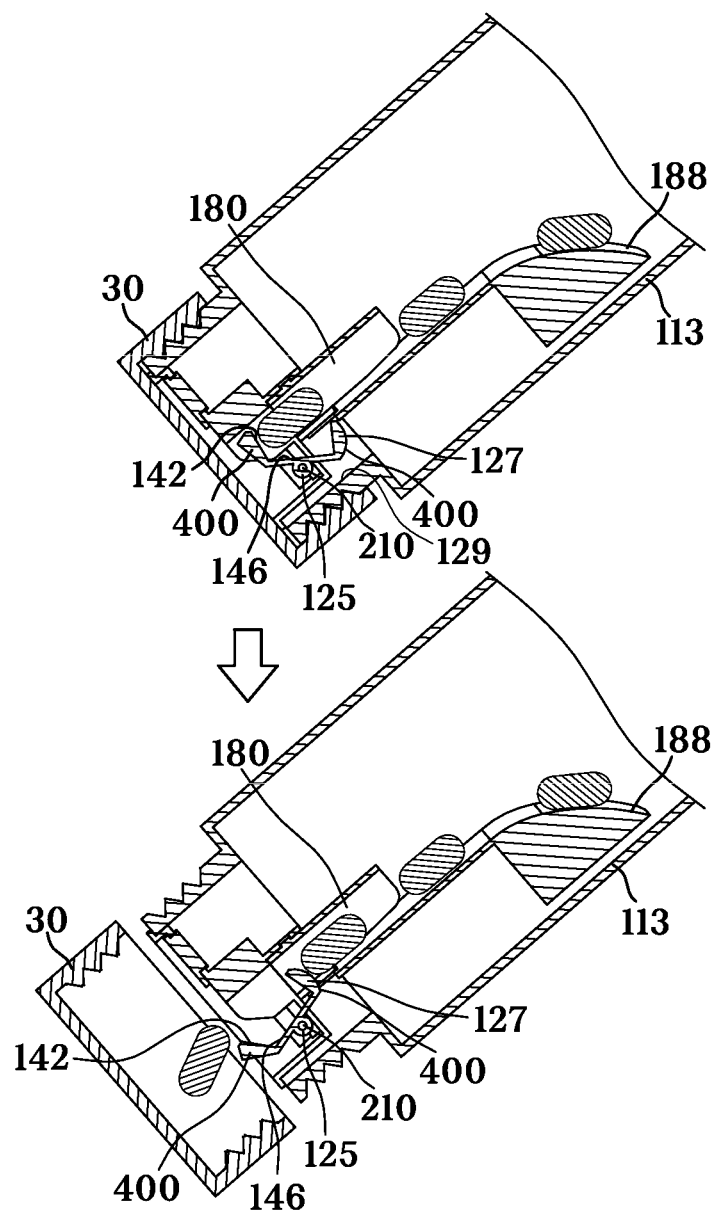
FIG. 55 is a cross-sectional view illustrating a use state of the containing apparatus or the contents moving apparatus including the dispensing device according to the thirteenth embodiment of the present invention.

FIG. 53 is a perspective view of a containing apparatus or a contents moving apparatus including a dispensing device according to a thirteenth embodiment of the present invention, FIG. 54 is an exploded perspective view of the containing apparatus or the contents moving apparatus including the dispensing device according to the thirteenth embodiment of the present invention, and FIG. 55 is a cross-sectional view illustrating a use state of the containing apparatus or the contents moving apparatus including the dispensing device according to the thirteenth embodiment of the present invention.

As in FIGS. 53 to 55, the contents moving apparatus or a containing apparatus 1 having the dispensing device 100 according to the thirteenth embodiment of the present invention includes the housing 110.

Particularly, in the dispensing device 100, the fixing member 121 is fixed and coupled to an inside of a discharge side for the content 5 of the storing part 113.

A position of contents which are passing may be lifted in the opposite direction of the direction of gravity by the bottom-height changing member 147, which is a lifted or protruding portion of the bottom part 146 of the movement member 125. Here, a space of the opening 122 being opened may be narrowed so that the contents pass therethrough.

As in the present embodiment, in the case in which the movement member 125 includes the bottom-height changing member 147 and the bottom part 146 is formed in a protruding shape such as a curved surface, when contents move in contact with a surface of the bottom-height changing member 147, the bottom-height changing member 147 moves in the moving direction of the contents along the bottom part 146 due to resistance caused by the self-weight of the contents, the center of gravity of the balancing part 123b may move in the passing direction of the contents, and the passing movement part 140 may increase a force of the passing movement part 140 moving in the passing direction of the contents.

Here, the bottom-height changing member 147 is the movement increase control member 123c configured to increase movement of the passing movement part 140 in the passing direction of contents and may allow contents to promptly pass through the passing operation part 120 by the passing movement part 140 promptly opening the passing operation part 120.

The bottom-height changing member 147 may have various friction materials or a curved shape.

Also, the movement guide part 180 has the height guiding member 188 formed at the entry side for the content 5. The height guiding member 188 divides a height difference generated during movement of the contents to the contents passing means 123 into a plurality of stages or configures the height difference as an inclined surface to prevent the height difference from blocking movement of contents and guide movement of the contents so that contents in the storing part 113 are guided to be stably moved to the passing passage part 139. The height guiding member 188 may be changed to have various other shapes.

Refer to the above description for undescribed reference numerals.

Figure 56:
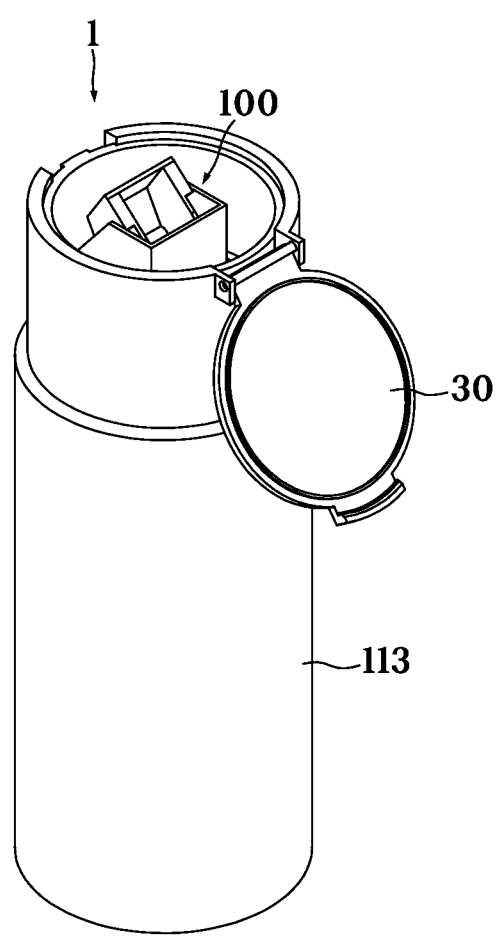
FIG. 56 is a perspective view of a containing apparatus or a contents moving apparatus including a dispensing device according to a fourteenth embodiment of the present invention.
Figure 57:
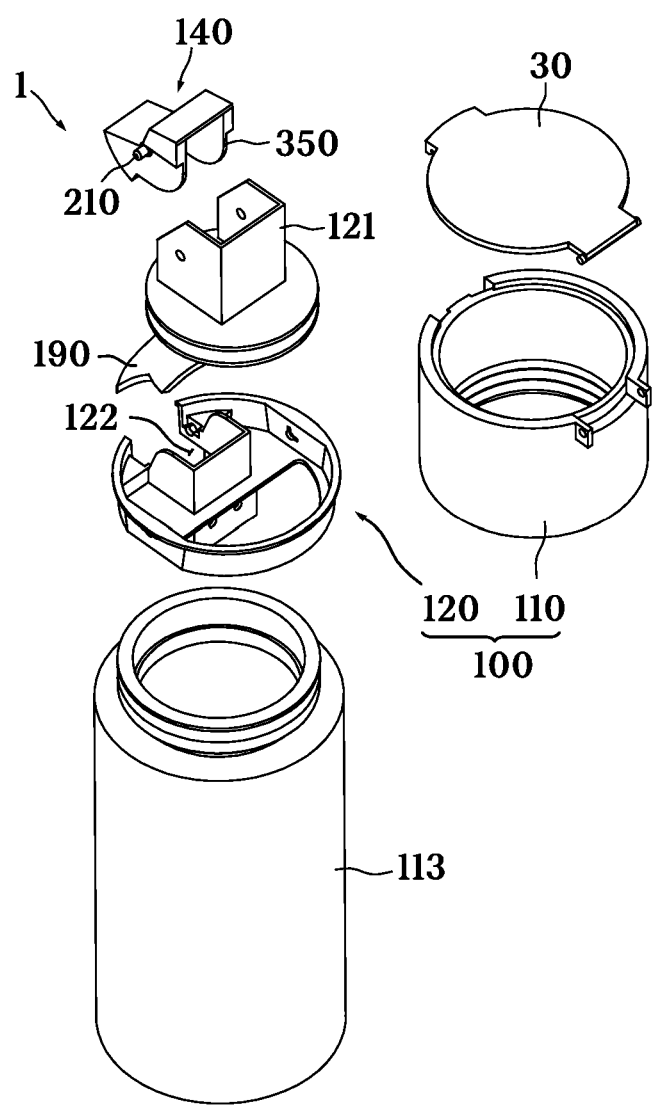
FIG. 57 is an exploded perspective view of the containing apparatus or the contents moving apparatus including the dispensing device according to the fourteenth embodiment of the present invention.
Figure 58:
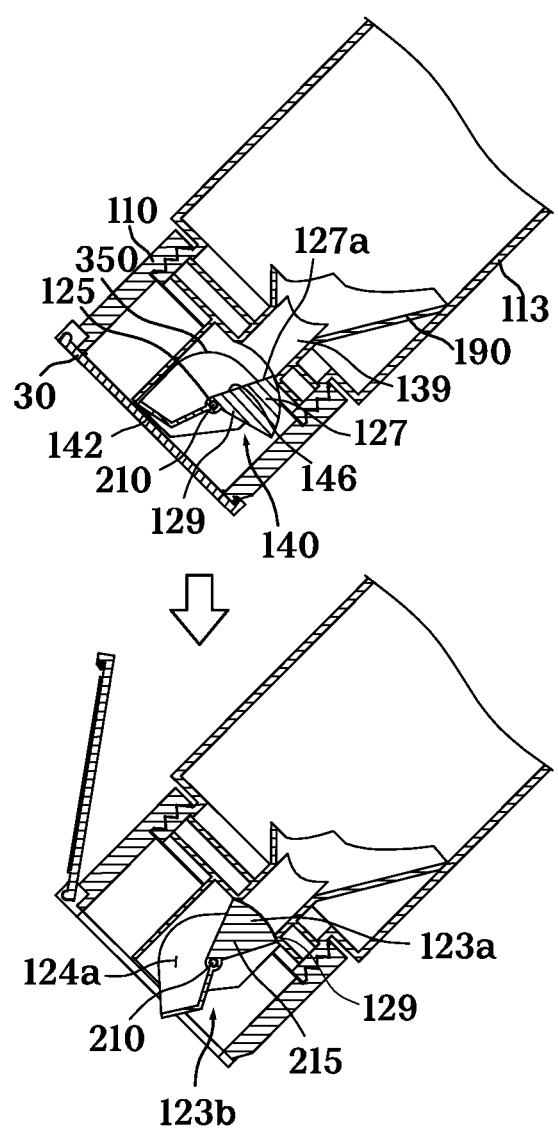
FIG. 58 is a cross-sectional view illustrating a use state of the containing apparatus or the contents moving apparatus including the dispensing device according to the fourteenth embodiment of the present invention.

FIG. 56 is a perspective view of a containing apparatus or a contents moving apparatus including a dispensing device according to a fourteenth embodiment of the present invention, FIG. 57 is an exploded perspective view of the containing apparatus or the contents moving apparatus including the dispensing device according to the fourteenth embodiment of the present invention, and FIG. 58 is a cross-sectional view illustrating a use state of the containing apparatus or the contents moving apparatus including the dispensing device according to the fourteenth embodiment of the present invention.

As in FIGS. 56 to 58, the contents moving apparatus or the containing apparatus 1 having the dispensing device 100 according to the fourteenth embodiment of the present invention includes the housing 110.

Particularly, in the dispensing device 100, the housing 110 is coupled to the discharge side for the content 5 of the storing part 113.

Further, the passing movement part 140 has a flange 350 formed along both side edges to guide discharge of contents. Here, powder which is prevented from leaking to the outside of the passing movement part 140 by the flange 350 may be applied as the contents.

Refer to the above description for undescribed reference numerals.

Figure 59:
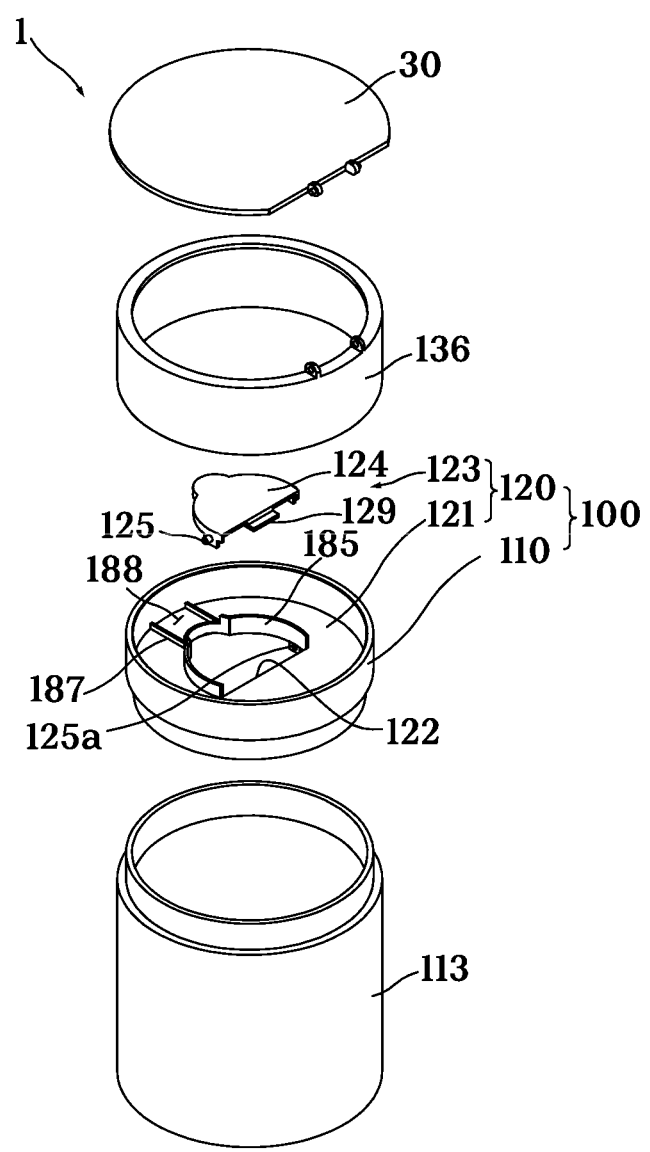
FIG. 59 is an exploded perspective view of a containing apparatus or a contents moving apparatus including a dispensing device according to a fifteenth embodiment of the present invention.
Figure 60:
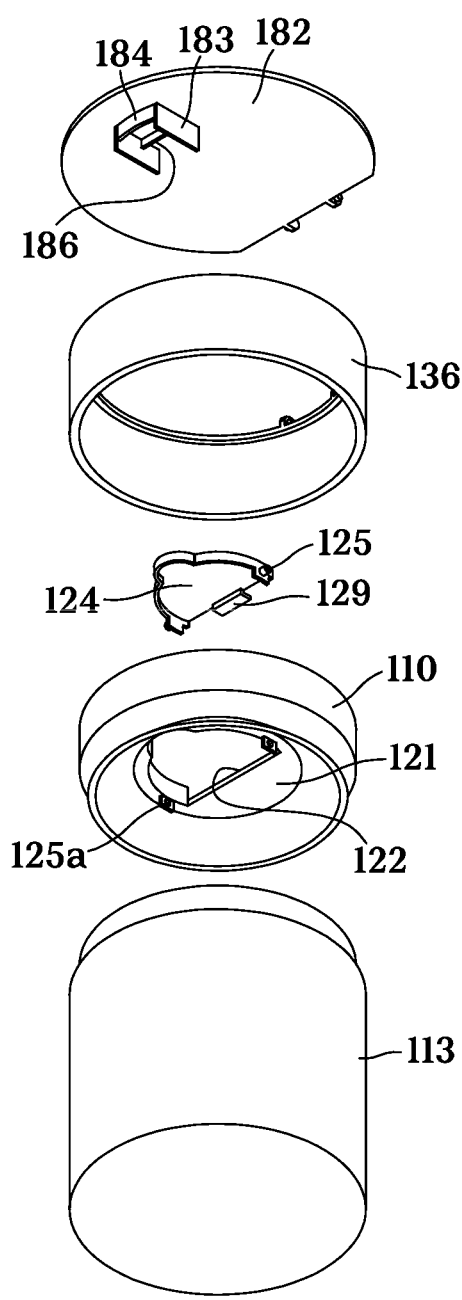
FIG. 60 is a bottom exploded perspective view of the containing apparatus or the contents moving apparatus including the dispensing device according to the fifteenth embodiment of the present invention.
Figure 61:
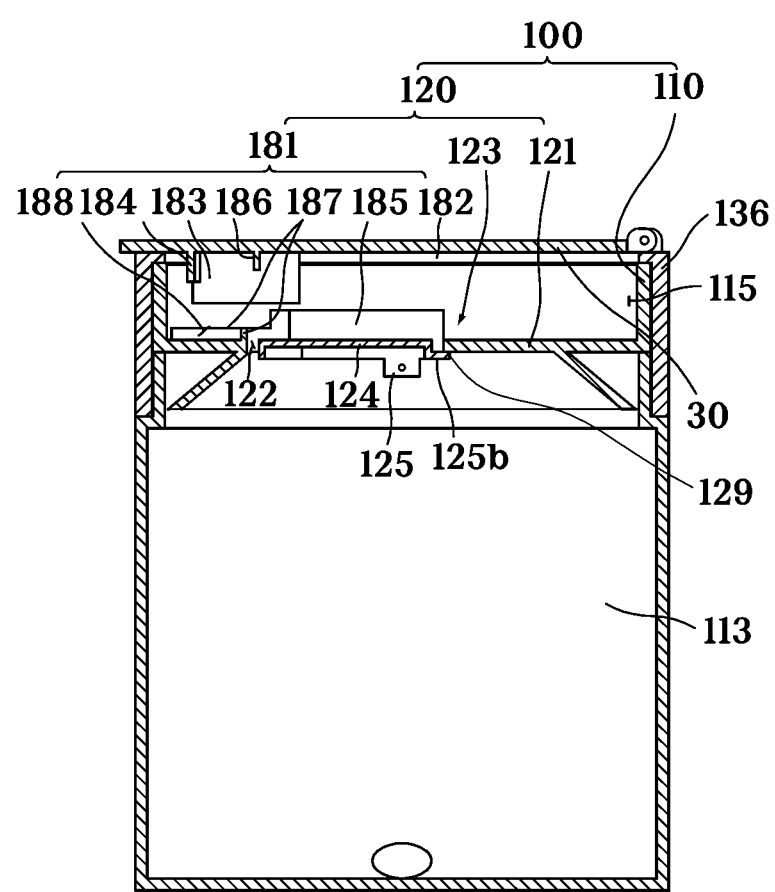
FIG. 61 is a cross-sectional view of the containing apparatus or the contents moving apparatus including the dispensing device according to the fifteenth embodiment of the present invention.
Figure 62:
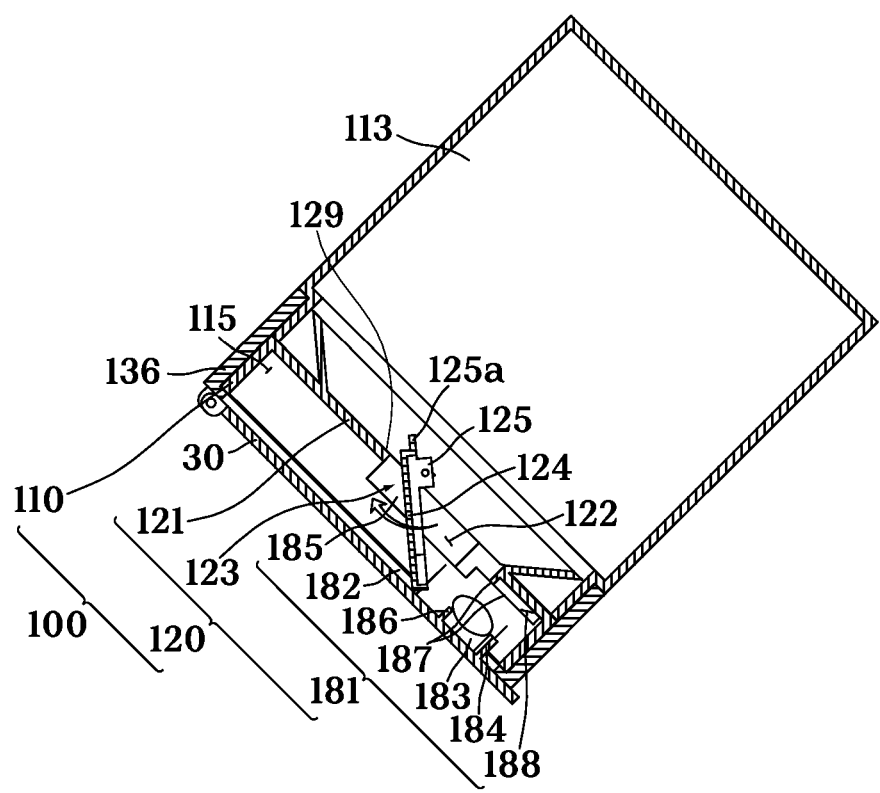
FIG. 62 is a cross-sectional view illustrating a use state of the containing apparatus or the contents moving apparatus including the dispensing device according to the fifteenth embodiment of the present invention.

FIG. 59 is an exploded perspective view of a containing apparatus or a contents moving apparatus including a dispensing device according to the fifteenth embodiment of the present invention, FIG. 60 is a bottom exploded perspective view of the containing apparatus or the contents moving apparatus including the dispensing device according to the fifteenth embodiment of the present invention, FIG. 61 is a cross-sectional view of the containing apparatus or the contents moving apparatus including the dispensing device according to the fifteenth embodiment of the present invention, and FIG. 62 is a cross-sectional view illustrating a use state of the containing apparatus or the contents moving apparatus including the dispensing device according to the fifteenth embodiment of the present invention.

A contents moving apparatus or the containing apparatus 1 having the dispensing device 100 according to the fifteenth embodiment of the present invention includes the storing part 113, the housing 110, the receiving part 181, and the passing part 120.

Refer to the above description for descriptions of the housing 110, the storing part 113, and the passing part 120.

Here, the housing 110 may be formed in a state in which one open side is substantially sealed by opening and closing of the cover 30 or may be formed to be in an unsealed state by including only the receiving part 181 without the cover 30. The cover 30 may be disposed to be able to open and close one open side of the housing 110 and may be formed in various ways.

Particularly, the passing part 120 includes the contents passing means 123 configured to guide passage of contents to the outside of the storing part 113 by opening due to movement.

The dispensing device 100 includes the receiving part 141, separate from the contents passing means 123. The receiving part 141 resists introduction of more than a necessary demand amount of contents passed through the contents passing means 123 into the standby containing part 115 so that, as a result, an amount of remaining contents is a demand amount required by a user.

When the housing 110 is a housing of the opening-closing apparatus 110, the housing 110 is the opening-closing apparatus 110 and may be separably coupled to the contents passing side of the storing part 113 and may open and close the storing part 113 of a main body of a container apparatus.

The opening-closing apparatus 110 has the standby containing part 115 configured to contain contents formed therein to divide and contain contents stored in the container apparatus 1 so that a user can use the contents.

The cover 30 serves as the opening-closing apparatus cap 30 that is engaged with the upper end of the opening-closing apparatus 110 and finished. The passing operation part 120 provided with the contents passing means 123 may be installed inside the opening-closing apparatus 110 or may be installed inside the storing part 113.

The housing 110 may not be an opening-closing apparatus and may be an element of the container apparatus 1 that is integrally configured with the main body of the container apparatus or is separated from the main body of the container apparatus.

The receiving part 181 includes the resistive upper plate member 182, the resistive side plate member 183, the partitioning member 184, the blocking member 185, the introducing member 186, the standby step 187, and the standby part 188.

Contents come into contact with one or more of the resistive upper plate member 182 and the resistive side plate member 183 included in the receiving part 181, and a remaining amount of contents passed through the opening 122 is limited.

The resistive upper plate member 182 may be disposed in the housing 110, and the resistive side plate member 183 may be disposed in the housing 110, the resistive upper plate member 182, the fixing member 121, or the cover 30.

Particularly, although the resistive side plate member 183 may be formed at a surface of the fixing member 121 facing the passing direction of contents, when the cover 30 which is opened is disposed, the resistive side plate member 183 may be formed at the cover 30 to move together with the cover 30 when the cover 30 is opened to not interfere with contents being picked up.

The resistive upper plate member 182 and the resistive side plate member 183 may be changed to have various other shapes in the passing direction of contents and a side direction of passing.

Also, the partitioning member 184 serves to limit the remaining amount of the contents passing through the opening 122 by partitioning a space of the receiving part 181.

The partitioning member 184 serves to limit the amount of contents received in the receiving part 181 by adjusting a substantial contents receiving space of the receiving part 181. The partitioning member 184 may be formed in a direction of the fixing member 121 at the cover 30 or may be changed to be formed in various other shapes and directions in which the receiving part is partitioned.

Further, the blocking member 185 protrudes from an upper surface of the fixing member 121. Specifically, the blocking member 185 protrudes from a surface of the fixing member 121 facing the passing direction of contents. Here, the blocking member 185 serves to prevent introduction of contents into portions other than the receiving part 181 after the contents pass through the opening 122.

Here, the standby part 188 corresponds to a portion of the standby containing part 115.

Also, the receiving part 181 includes the introducing member 186.

The introducing member 186 is included in the receiving part 181 to guide contents passed through the opening 122 to the receiving part 181 and prevent introduction of the contents into portions other than the portion to which the contents are guided. The introducing member 186 may protrude from the cover 30 to be spaced apart from the partitioning member 184. The introducing member 186 may be changed to have various other shapes.

Also, an upper surface of the fixing member 121, i.e., a surface of the fixing member 121 facing the cover 30, serves to support contents, and the standby step 187 disposed on the upper surface serves to concentrate the contents to the standby part 188. The contents are located in the standby part 188 to stand by for withdrawal inside the standby containing part 115.

The standby step 187 protrudes toward the cover 30 along the edge of the opening 122 of the fixing member 121. The standby step 187 may be changed to have various other shapes.

Here, the contents passing means 123 includes the opening member 124 and the movement member 125.

The opening member 124 serves to open the opening 122 of the fixing member 121.

When the housing 110 is tilted, the opening member 124 opens the opening 122 due to a self-weight and a pressing force of the contents. Conversely, when the housing 110 is stood upright, the opening member 124 closes the opening 122 due to the self-weight.

Also, the movement member 125 serves to allow the opening member 124 to rotate inside the opening 122. Here, the movement member 125 may be changed to have various other shapes and a portion thereof may have a protruding shape.

Further, the stopper 129 is included to maintain a state in which the opening member 124 closes the opening 122 while the housing 110 is stood upright. The movement member 125 may have a shape formed to be resisted by the stopper 129 at a predetermined position when moving so that movement of the movement member 125 stops corresponding to the stopper 129 or may include the movement member protrusion 125*b* which is a portion protruding from the movement member 125.

That is, the opening member 124 rotates in one direction based on the movement member 125 due to the self-weight and a pressing force of contents and opens the opening 122.

Conversely, the opening member 124 rotates in the other direction based on the movement member 125 due to the self-weight and blocks the opening 122. Here, by the movement member protrusion 125*b* coming into contact with the surface of the fixing member 121 that serves as a stopper, further rotation of the opening member 124 in the other direction is prevented.

Figure 63:
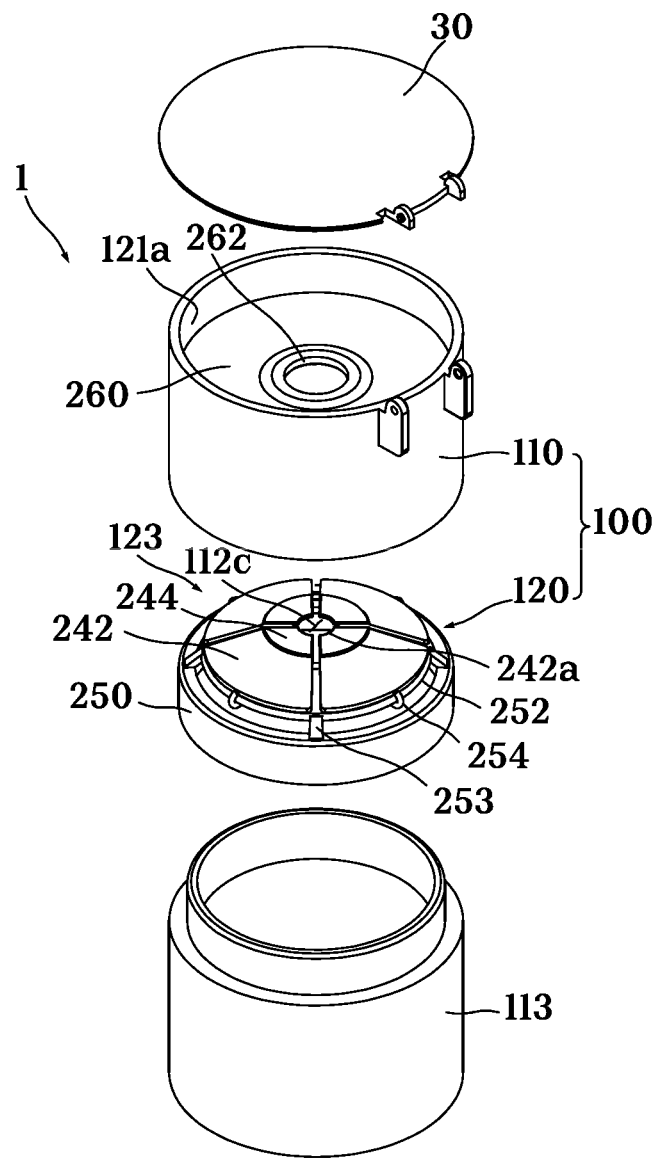
FIG. 63 is an exploded perspective view of a containing apparatus or a contents moving apparatus including a dispensing device according to a sixteenth embodiment of the present invention.
Figure 64:
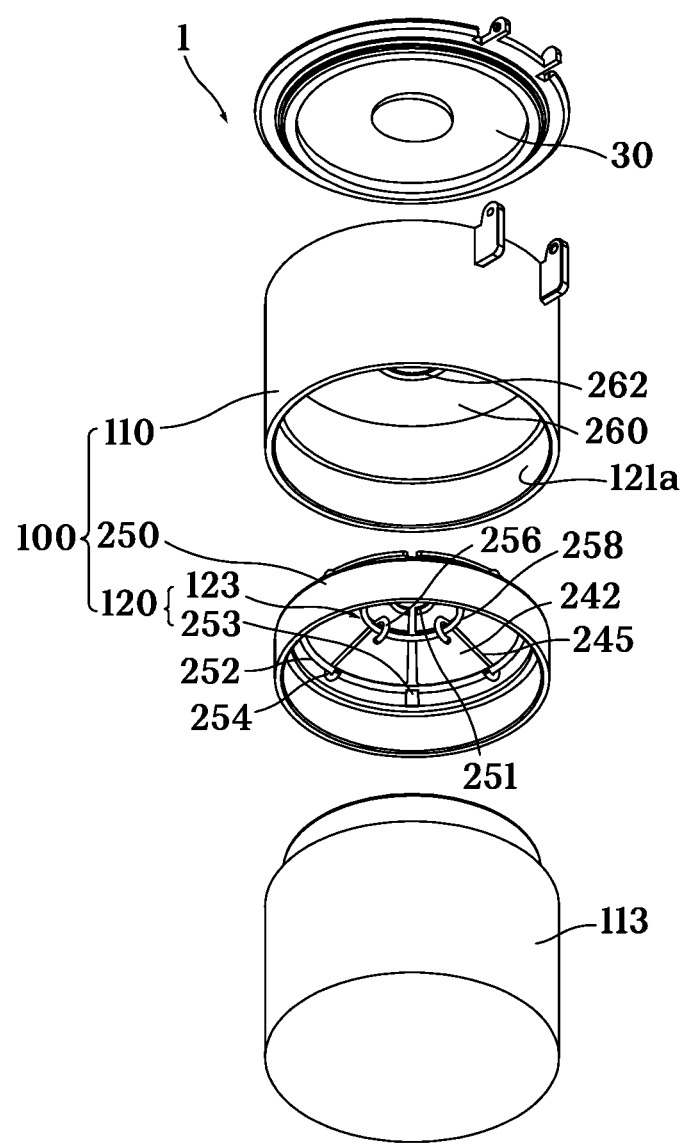
FIG. 64 is a bottom exploded perspective view of the containing apparatus or the contents moving apparatus including the dispensing device according to the sixteenth embodiment of the present invention.

FIG. 63 is an exploded perspective view of a containing apparatus or a contents moving apparatus including a dispensing device according to a sixteenth embodiment of the present invention, and FIG. 64 is a bottom exploded perspective view of the containing apparatus or the contents moving apparatus including the dispensing device according to the sixteenth embodiment of the present invention.

Figure 65:
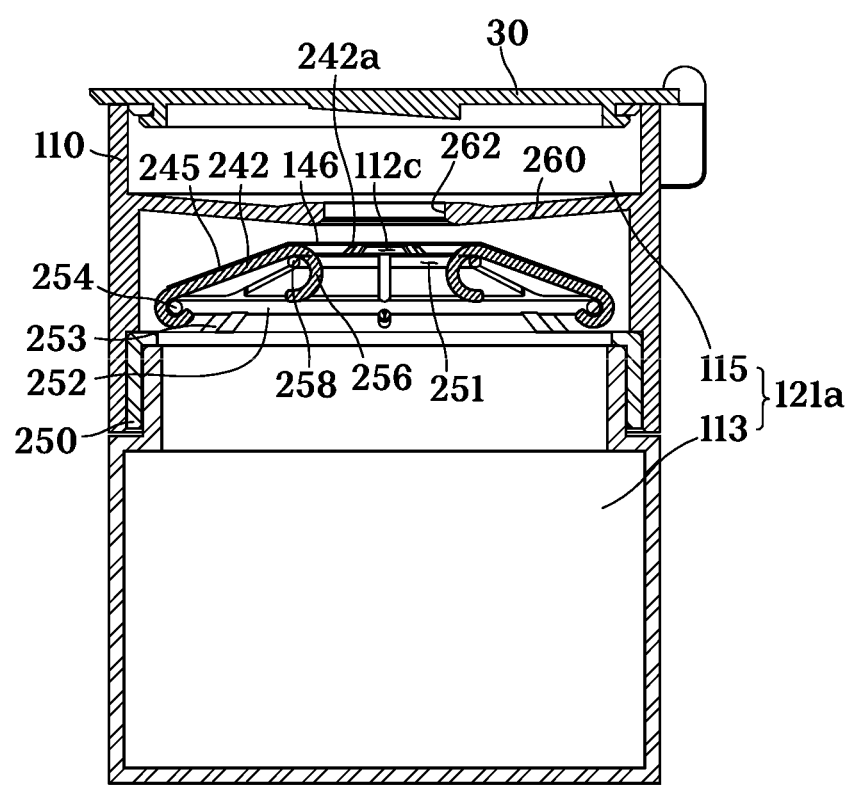
FIG. 65 is a cross-sectional view of the containing apparatus or the contents moving apparatus including the dispensing device according to the sixteenth embodiment of the present invention.
Figure 66:
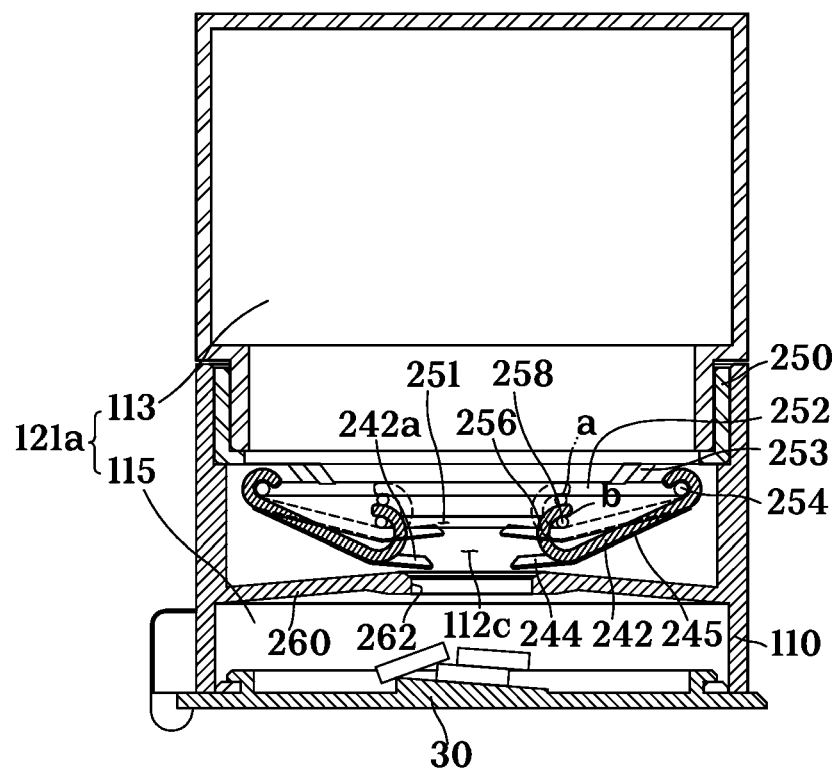
FIGS. 66 and 67 are cross-sectional views illustrating a use state of the containing apparatus or the contents moving apparatus including the dispensing device according to the sixteenth embodiment of the present invention.
Figure 67:
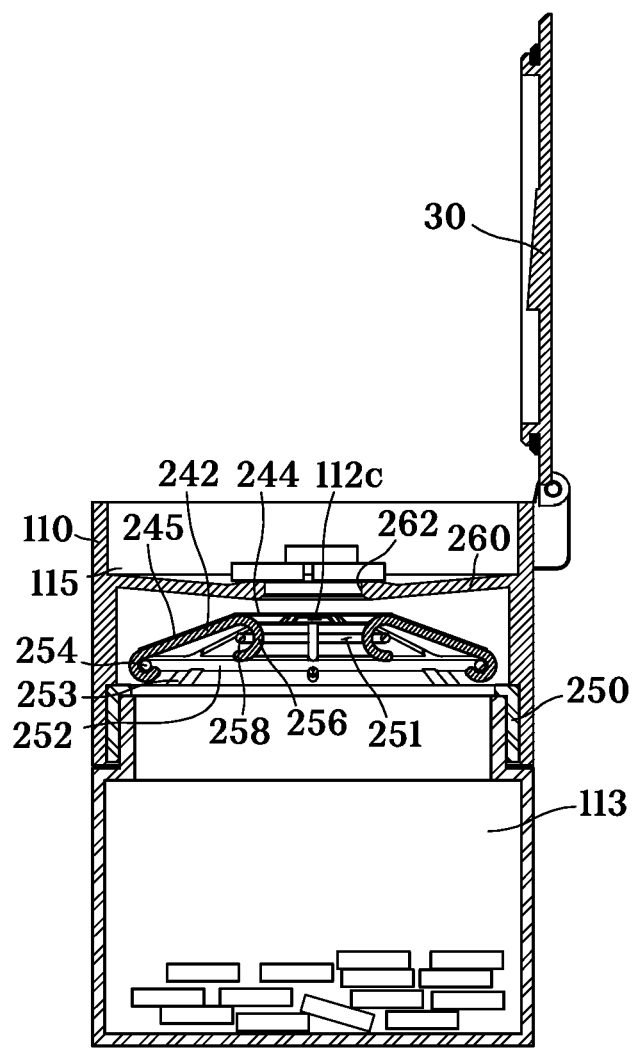

FIG. 65 is a cross-sectional view of the containing apparatus or the contents moving apparatus including the dispensing device according to the sixteenth embodiment of the present invention, and FIGS. 66 and 67 are cross-sectional views illustrating a use state of the containing apparatus or the contents moving apparatus including the dispensing device according to the sixteenth embodiment of the present invention.

As illustrated in FIGS. 63 to 67, a contents moving apparatus or the containing apparatus 1 having the dispensing device 100 according to a sixteenth embodiment of the present invention includes the passing part 120, a passing part housing 250, and the housing 110.

Also, the passing part 120 includes the contents passing means 123 and a fixing member 253

Refer to the above description for description of the housing 110 separably coupled to the storing part 113.

The contents passing means 123 is disposed inside the housing 110 and serves to guide movement of a fixed amount or a demand amount of contents held in the storing part 113 at a time.

Further, the housing 110 has the cover 30 at an upper side. The cover 30 receives contents moved through the passing part 120. The cover 30 is separably coupled to the housing 110.

Particularly, the contents passing means 123 includes an opening member 242, a movement member 145, a movement fixing part 252, and a passing frame 258.

The passing part housing 250 is disposed at a circumferential surface of an opening side of the housing 110. Also, the passing part housing 250 is formed in a ring shape. Further, the passing part housing 250 is separably coupled to the housing 110 for replacement thereof and may be changed to have various other shapes and various materials. The passing part housing 250 covers the outside of the storing part 113, and the housing 110 covers the passing part housing 250.

The passing frame 258 is connected to the opening member 242 and has an opening 251 having an open central portion. Also, an unfixed free end 242a of the opening member 242 is movably connected to the passing frame 258, and the passing space 112c for contents is formed corresponding to the opening 251.

The movement member 245 supports the opening member 242, and a movement locking part 254 is disposed at one side of the movement member 245.

Each of the movement locking parts 254 serves as a pivot during movement of the opening member 242 by being locked to the movement fixing part 252. That is, the movement locking part 254 is disposed at one side of each of the movement members 245 to hinge-connect the opening member 242 to be moved in a self-weight direction and a pressing direction of contents while being locked to the movement fixing part 252. Here, the movement locking part 254 is integrally or separably formed in various shapes at each of the movement members.

Also, the movement fixing part 252 is connected to the fixing member 253. Here, although the movement fixing part 252 may have various shapes the movement fixing part 252 is illustrated as having a ring shape for convenience.

Further, the movement fixing part 252 may be connected to the fixing member 253 using various methods. For example, the movement fixing part 252 is connected to the fixing member 253, which includes connecting ribs configured to be spaced a predetermined distance apart from each other along the circumferential direction. Consequently, the movement fixing part 252 is fixed and connected to the fixing member 253. Various materials may be applied to the movement fixing part 252.

The movement fixing part 252 is fixed to any one place of an upper edge, a circumferential surface, an inner surface, and a lower edge at an arrangement position of the fixing member 253.

Particularly, one or more opening members 242 may be disposed and connected to the movement fixing part 252 to form the passing space 112c, thereby securing a space through which a fixed amount or a demand amount of contents can pass.

That is, each of the movement members 245 connected to the opening member 242 has one side movably connected to the movement fixing part 252. Therefore, when the housing 110 is shaken for passage of contents, the other sides of the opening members 242 are spaced apart from each other, and the passing space 112c is secured. Consequently, contents pass through the passing space 112c that is secured from the storing part 113 of the housing 110. For convenience, a plurality of opening members 242 which are separated from each other are assumed as being present.

Further, the other sides of the opening members 242 should be restrained by each other so that an opening amount of the passing space 112c is adjusted. This is to prevent the opening member 242 from being tilted too much and not returning to an initial position and to guide passage of a fixed amount of contents by adjusting the opening amount of the passing space 112c.

Therefore, the contents passing means 123 includes an opening guiding part 256 and the passing frame 258.

The opening guiding part 256 is disposed at the other side of each of the movement members 245. The opening guiding part 256 is integrally or separably formed in various shapes at each of the movement members 245. Also, the opening guiding part 256 and the movement member 245 may be integrally manufactured to be coupled to the opening member 242.

The opening member 242 may be integrally formed with the movement member 245.

Also, the passing frame 258 is formed to have each of the opening guiding parts 256 hung thereon. Therefore, the passing frame 258 is moved while is in contact with the opening guiding part 256 when the opening member 242 moves. That is, in a process in which the opening member 242 moves from an initial state and secures the passing space 112c, the opening guiding part 256 moves from a position "a" to a position "b" along the passing frame 258 (see FIG. 22). Accordingly, the other sides of the opening members 242 are spaced apart from each other. Consequently, the passing frame 258 adjusts a movement amount of each of the opening members 242 and secures the passing space 112c for passage of contents.

The opening member 142 has a blocking part 146 formed at an inside of the passing space 112c.

Further, when returning to the initial state from the state in which the opening member 242 is open and the passing space 112c is secured, each of the opening members 242 should return to a closing position as in the initial state and should maintain a predetermined size of the passing space 112c for rapid opening. Here, the passing space 112c has a size through which contents cannot arbitrarily pass. Therefore, the passing frame 258 serves to maintain a closing position restoring force of each of the opening members 242.

Here, although the passing frame 258 may have various shapes, for convenience, the passing frame 258 is illustrated as having a ring shape. The passing frame 258 and the opening guiding part 256 restrain each other.

Each of the opening members 242 may have a convex part 244 formed at an edge adjacent to the passing space 112c so that movement responsiveness due to a self-weight is improved while being restrained to the passing frame 258. That is, when the housing 110 is stood upright as in the initial state, the convex part 244 includes a weight 400 for improving responsiveness for returning the opening member 242 to the initial state. The convex part 244 may be changed to have various other shapes.

Content passed through the passing space 112c in which a sufficient space is secured are stored in the standby containing part 115 while discharge of the contents to the outside is prevented by the cover 30.

Here, a contents guiding member 260 is disposed at the inside of the housing 110 to be close to the opening member 242 to not come into contact with the opening member 242 when a space of the passing space 112c is sufficiently secured. This is to prevent the contents guiding member 260 from interfering with movement of the opening member 242 and to prevent contents passed through the passing space 112c from leaking through a portion between the opening member 242 and the contents guiding member 260 via an inlet hole 262.

Particularly, the contents guiding member 260 has a surface that is formed to be gradually inclined from the inlet hole 262 toward the center. More specifically, a surface of the contents guiding member 260 near the cover 30 is formed to be inclined so that the height of the surface gradually decreases from the inlet hole 262 toward the center. This is to allow a user to easily pick up contents by hand by making contents being passed to be located at a central portion of the contents guiding member 260, which is close to the inlet hole 262, when the storing part 113 is stood upright as in the initial state.

Hereinafter, an effect of the container apparatus 1 having the dispensing device 100 according to the fifth embodiment of the present invention will be described.

As in FIG. 66, when a user makes the storing part 113 to be in a use state by tilting the storing part 113 or making the storing part 113 to be oppositely upright, contents inside the storing part 113 move along the inclined surface of the opening member 242 and push the opening member 242 in the passing direction of the contents. Here, the opening members 242 are promptly spaced apart from each other due to a self-weight of the weight 400 of the convex part 244.

In this way, the passing space 112c for passage of contents is sufficiently secured.

The contents pass through the opening member 242 via the passing space 112c and then falls to the cover 30.

As in FIG. 67, when the user makes the storing part 113 to stand upright as in the initial state, the opening members 242 spaced apart from each other promptly approach each other due to the self-weight of the weight 400 of the convex part 244 and narrow the passing space 112c. In this way, contents do not arbitrarily pass through the passing space 112cc.

A user may observe contents passed through the container apparatus or open the cover 30 and take out the contents.

Refer to the above description for undescribed reference numerals.

When introducing elements of aspects of the disclosure or the embodiments thereof, the articles "a", "an", "the" and "said" are intended to mean that there are one or more of the elements. The terms "comprising", "including", and "having" are intended to be inclusive and mean that there may be additional elements other than the listed elements.

Although the present invention has been described above with reference to embodiments illustrated in the drawings, the embodiments are merely illustrative, and one of ordinary skill in the art to which the disclosure pertains should understand that various modifications and other equivalent embodiments are possible from the above-described embodiments. Therefore, an actual technical scope of the present invention should be defined based on the claims below.

What is claimed is:

1. A dispensing device, comprising:
a passing operation part configured to guide movement of contents,
wherein the passing operation part includes a contents passing means configured to allow the contents to move and a passing passage part,
wherein the contents passing means includes a passing movement part configured to allow the contents to be passed by pivoting movement of the passing movement part,
wherein the passing movement part includes:
an opening member configured for pivotal movement to form a passing space for a demand amount of the contents to pass therethrough when the dispensing device is tilted, and
a blocking member corresponding to the opening member and configured for pivotal movement in association with the corresponding opening member for preventing the contents exceeding the demand amount from being introduced into the passing space,
wherein a movement guide part is disposed at a lower portion of the passing passage part and configured to introduce the contents into the passing passage part when the dispensing device is tilted, and
wherein the passing space, the passing passage part and the movement guide part are arranged in a line to form a linear passage for the contents towards an outside of the dispensing device, and a center of gravity of the passing movement part is positioned more upstream of the linear passage than a center of rotation of the passing movement part so that pivotal movement of the opening member is restrained when the dispensing device is tilted until the opening member is pushed by a weight of the content.

2. The dispensing device of claim 1,
wherein the passing movement part is rotated in a direction in which the contents are passed by self-weight of the contents to be contacted and allows the contents of a set amount to pass.

3. The dispensing device of claim 1, wherein the passing movement part includes a bottom part connecting the opening member and the blocking member and the bottom part includes a protrusion which constitutes a balancing part configured to suppress being tilted together with the passing operation part by a force for balancing the weight by the center of gravity of the passing movement part when the passing operation part is tilted.

4. The dispensing device of claim 1, wherein when the contents are moved to press the opening member, the contents pressing the opening member pass through passing operation part as the opening member is turned.

5. The dispensing device of claim 3, wherein, when the passing operation part is tilted, a shape of the passing movement part is formed so that rotation due to a self-weight of the passing movement part is not performed before a demand amount of contents come into contact with the opening member or a constituent member of the passing movement part is coupled to the passing operation part to form a weight or the center of gravity of the balancing part.

6. The dispensing device of claim 1, wherein the passing operation part includes a fixing member forming an opening to allow the contents to pass therethrough, and the opening member allows the contents to pass therethrough by opening the opening by movement of an unfixed free end thereof.

7. The dispensing device of claim 1, wherein the passing movement part further includes a movement control member for controlling movement of the passing movement part by action of balancing force of the center of gravity of the passing movement part.

8. The dispensing device of claim 1, wherein:
at least a portion of the movement guide part is formed as an inclined surface; and when the passing operation part is tilted, the contents move over the inclined surface in a direction of gravity of the movement guide part.

9. The dispensing device of claim 1, wherein:
a demand amount of contents that entered the passing space between the opening member and the blocking member push the opening member so that the opening member rotates together with the blocking member;
the rotating blocking member does not interfere with the demand amount of contents that pushed the opening member; and
the blocking member blocks excess contents when contents beyond the demand amount enter the passing operation part.

10. The dispensing device of claim 1 further comprising a movement control member, when the passing operation part is tilted, controls the blocking member to not block passage of a demand amount of contents by rotation due to a self-weight of the opening member or a member moving together with the opening member before the demand amount of contents push the opening member wherein corresponding to a weight of the opening member or a weight of one or more members moving together with the opening member, the movement control member is configured to have a weight and a position for controlling movement due to a self-weight of the passing movement part or the balancing part including the opening member.

11. The dispensing device of claim 1, further comprising a housing with at least one open side, wherein:
the passing operation part is included in the housing; and
the passing movement part guides passage of the contents to one side of the housing by opening due to movement in a contents moving direction.

12. The dispensing device of claim 1, wherein, in the passing movement
part, a movement part center-of-gravity position of the passing movement part and a movement part center-of-rotation position, which is the center of rotation of the passing movement part, are different from each other.

13. The dispensing device of claim 1, wherein the passing movement part moves to be open due to a self-weight of the passing movement part or a pressing force of contents and guides passage of the contents.

14. The dispensing device of claim 1, wherein the passing movement part is rotatably provided, allows dispense of the contents by opening the passing space, and blocks the opening to prevent dispense of the contents.

15. The dispensing device of claim 1, wherein the center of rotation of the passing movement part is positioned closer to the opening member than the center of gravity of the passing movement part so that pivotal movement of the opening member is restrained when the dispensing device is tilted until the opening member is pushed by the weight of the content that passes through the passing space.

16. A dispensing device to be coupled with a housing comprising:
a passing operation part configured to guide movement of contents,
wherein the passing operation part includes a contents passing means configured to allow the contents to move and a passing passage part positioned spaced apart from an inner surface of the housing and forming a first passing space to prevent from passage of contents beyond a demand amount of contents,
wherein the contents passing means includes a passing movement part configured to allow the contents to be passed by pivoting movement of the passing movement part,
wherein the passing movement part includes:
an opening member configured for pivotal movement to form a second passing space for the demand amount of the contents to pass therethrough when the dispensing device is tilted,
a movement control member, and
a blocking member corresponding to the opening member and configured for pivotal movement in association with the corresponding opening member for preventing contents exceeding the demand amount from being introduced into the second passing space, and
wherein the movement control member is configured to restrain pivotal movement of the opening member when the dispensing device is tilted by a center of gravity of the passing movement part until the opening member is pushed by a weight of the content that passes through the second passing space,
wherein a movement guide part is disposed at a lower portion of the passing passage part and configured to introduce the contents into the passing passage part when the dispensing device is tilted, and
wherein the passing passage part and the movement guide part are arranged in a line to form a linear passage for the contents towards an outside of the dispensing device, and the center of gravity of the passing movement part is position more upstream of the linear passage than a center of rotation of the passing movement part so that pivotal movement of the opening member is restrained when the dispensing device is tilted until the opening member is pushed by a weight of the content.

* * * * *